(12) United States Patent
Whiteman et al.

(10) Patent No.: US 10,543,710 B2
(45) Date of Patent: Jan. 28, 2020

(54) SECURITY DEVICES

(71) Applicant: DE LA RUE INTERNATIONAL LIMITED, Basingstoke (GB)

(72) Inventors: Robert Whiteman, Reading (GB); Alice Smith, Glasgow (GB); Adam Lister, Andover (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 15/869,784

(22) Filed: Jan. 12, 2018

(65) Prior Publication Data
US 2018/0215187 A1 Aug. 2, 2018

Related U.S. Application Data

(62) Division of application No. 14/412,058, filed as application No. PCT/GB2013/051784 on Jul. 5, 2013, now Pat. No. 9,902,186.

(30) Foreign Application Priority Data

Jul. 6, 2012 (GB) .................................. 1212046.5

(51) Int. Cl.
*B42D 25/342* (2014.01)
*B42D 25/20* (2014.01)
(Continued)

(52) U.S. Cl.
CPC ............. *B42D 25/20* (2014.10); *B42D 25/00* (2014.10); *B42D 25/29* (2014.10); *B42D 25/342* (2014.10);
(Continued)

(58) Field of Classification Search
CPC .................................................. B42D 25/342
See application file for complete search history.

(56) References Cited

U.S. PATENT DOCUMENTS

| 4,652,015 A | 3/1987 | Crane |
| 6,089,614 A | 7/2000 | Howland et al. |

(Continued)

FOREIGN PATENT DOCUMENTS

| DE | 3906695 A1 | 9/1989 | |
| DE | 102010035313 A1 * | 3/2012 | ............ B41M 3/148 |

(Continued)

OTHER PUBLICATIONS

JP-2002254790-A English Translation (Year: 2002).*

(Continued)

*Primary Examiner* — Kyle R Grabowski
(74) *Attorney, Agent, or Firm* — Oliff PLC

(57) ABSTRACT

A security device is provided including a first pattern of elements and a second, overlapping, pattern of elements spaced by a transparent layer, the first and second patterns in combination obstructing the passage of light transmitted to a viewer through the device to a varying degree depending on the viewing position. The first and second patterns of elements are configured such that a first region of the device exhibits a maximum change in the degree of obstruction when the device is tilted relative to the viewer about a first tilt axis, and a second region of the device exhibits a maximum change in the degree of obstruction when the device is tilted relative to the viewer about a second tilt axis which is not parallel to the first tilt axis.

24 Claims, 23 Drawing Sheets

(51) Int. Cl.
  *G02B 5/124* (2006.01)
  *B42D 25/355* (2014.01)
  *B42D 25/43* (2014.01)
  *B42D 25/378* (2014.01)
  *B42D 25/369* (2014.01)
  *B42D 25/391* (2014.01)
  *B42D 25/387* (2014.01)
  *B42D 25/373* (2014.01)
  *B42D 25/435* (2014.01)
  *B42D 25/29* (2014.01)
  *B42D 25/00* (2014.01)
  *B42D 25/351* (2014.01)

(52) U.S. Cl.
  CPC ......... *B42D 25/351* (2014.10); *B42D 25/355* (2014.10); *B42D 25/369* (2014.10); *B42D 25/373* (2014.10); *B42D 25/378* (2014.10); *B42D 25/387* (2014.10); *B42D 25/391* (2014.10); *B42D 25/43* (2014.10); *B42D 25/435* (2014.10); *G02B 5/124* (2013.01)

(56) References Cited

U.S. PATENT DOCUMENTS

| | | | |
|---|---|---|---|
| 6,176,522 | B1 | 1/2001 | Jackson |
| 6,329,040 | B1 * | 12/2001 | Oshima ............... B44F 5/00 428/156 |
| 6,494,491 | B1 * | 12/2002 | Zeiter ............... B42D 25/342 283/91 |
| 7,326,504 | B2 | 2/2008 | Graham et al. |
| 2008/0018097 | A1 | 1/2008 | Wicker et al. |
| 2010/0194091 | A1 | 8/2010 | Heim et al. |
| 2012/0025514 | A1 * | 2/2012 | Camus ............... B42D 25/355 283/67 |
| 2012/0174447 | A1 * | 7/2012 | Vincent ............... B42D 25/342 40/453 |
| 2012/0205905 | A1 | 8/2012 | Degott et al. |

FOREIGN PATENT DOCUMENTS

| | | |
|---|---|---|
| EP | 0 059 056 A1 | 9/1982 |
| EP | 0 860 298 A2 | 8/1998 |
| EP | 1 398 174 A1 | 3/2004 |
| EP | 2 484 455 A1 | 8/2012 |
| GB | 2 387 812 A | 10/2003 |
| GB | 2 387 813 A | 10/2003 |
| GB | 2 480 227 A | 11/2011 |
| JP | 2002-254790 A | 9/2002 |
| JP | 2002254790 A * | 9/2002 |
| WO | 83/000659 A1 | 3/1983 |
| WO | 95/10419 A1 | 4/1995 |
| WO | 95/010420 A1 | 4/1995 |
| WO | 00/009391 A1 | 2/2000 |
| WO | 00/039391 A1 | 7/2000 |
| WO | 03/054297 A2 | 7/2003 |
| WO | 03/095188 A2 | 11/2003 |
| WO | 08/029128 A2 | 3/2008 |
| WO | 08/080619 A1 | 7/2008 |
| WO | 10/089703 A2 | 8/2010 |
| WO | 11/007344 A1 | 1/2011 |
| WO | 11/076361 A1 | 6/2011 |
| WO | 13/054117 A1 | 4/2013 |

OTHER PUBLICATIONS

DE-102010035313-A1 English Translation (Year: 2010).*
Jun. 7, 2018 Office Action issued in Australian Application No. 2017203551.
Jan. 20, 2014 International Search Report issued in International Application No. PCT/GB2013/051784.
Jan. 20, 2014 Written Opinion of the International Searching Authority issued in International Application No. PCT/GB2013/051784.
Jun. 13, 2014 Written Opinion of the International Preliminary Examining Authority issued in International Application No. PCT/GB2013/051784.
Aug. 19, 2014 International Preliminary Report on Patentability issued in International Application No. PCT/GB2013/051784.
May 9, 2013 Search Report issued in Great Britain Application No. GB1212046.5.
May 16, 2013 Search Report issued in Great Britain Application No. GB1212046.5 for claims 103-115.
May 16, 2013 Search Report issued in Great Britain Application No. GB1212046.5 for claims 14-75 and 112-115.
Oct. 30, 2012 Search Report issued in Great Britain Application No. GB1212046.5.
Jan. 7, 2014 Search Report issued in Great Britain Application No. GB1312115.7.
Jun. 13, 2014 Written Opinion of the International Searching Authority issued in International Application No. PCT/GB2013/051784.
Mar. 15, 2017 Office Action Issued in U.S. Appl. No. 14/412,058.

* cited by examiner

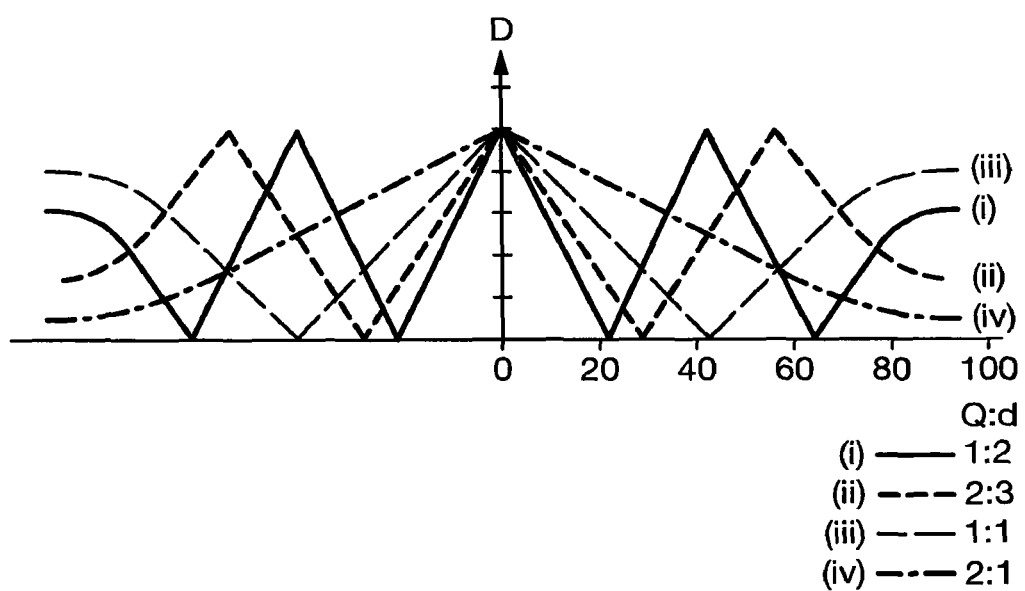

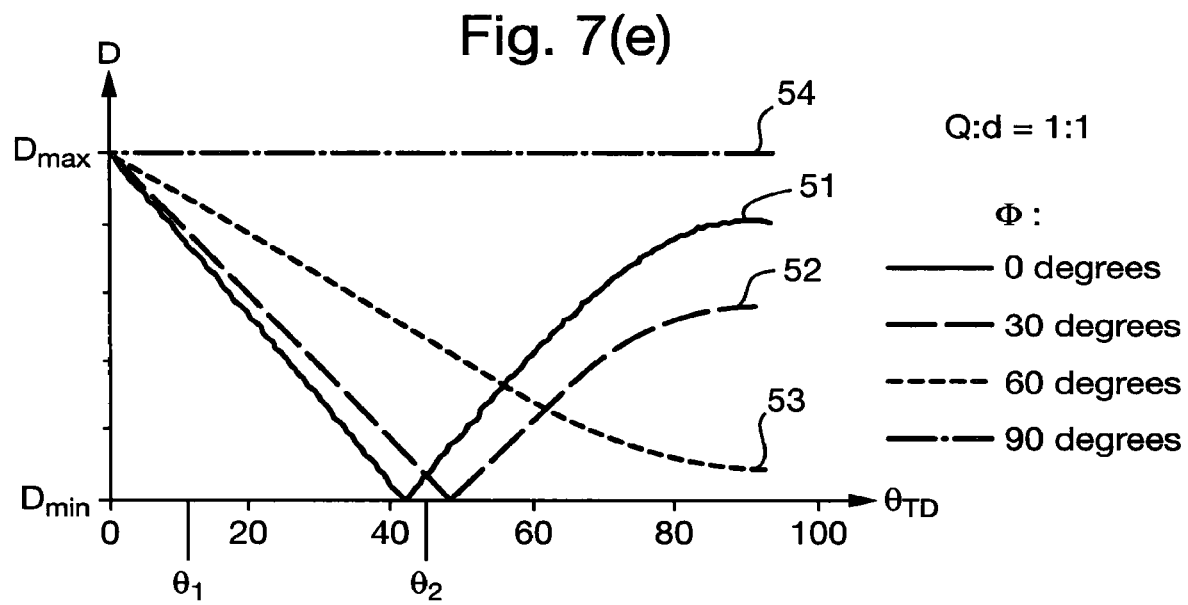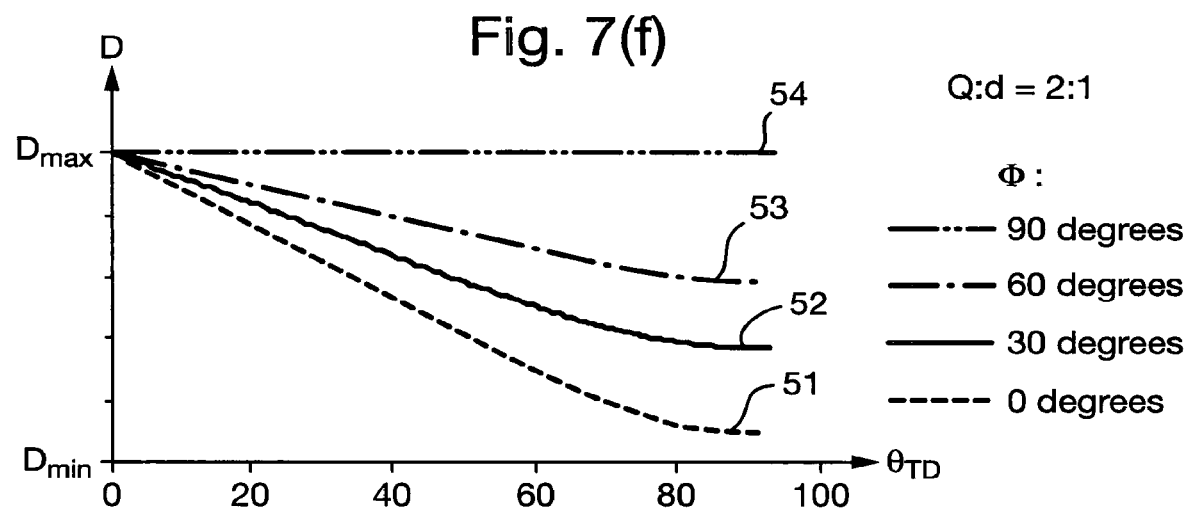

SECURITY DEVICES

This is a Divisional of application Ser. No. 14/412,058 filed Dec. 30, 2014, which is a National Stage Application of PCT/GB2013/051784 filed Jul. 5, 2013, which in turn claims the benefit of GB 1212046.5, filed Jul. 6, 2012. The entire disclosures of the prior applications are hereby incorporated by reference herein their entirety.

This invention relates to security devices such as may be used as a mark of authenticity associated with an object of value, such as a security document including banknotes, passports, certificates, licences and the like.

Objects of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

Security devices which have an optically variable appearance—i.e. their appearance is different at different angles of view—have been found to be particularly effective since the authenticity of the device can be readily checked by tilting or rotating the device and observing the expected change in appearance. Photocopies of such devices will, on the other hand, have a static appearance which does not change as the viewing position is altered.

Various different mechanisms for forming optically variable devices are known and one example is the venetian blind device already mentioned above. This comprises two patterns, e.g. printed line patterns, arranged on either side of a transparent spacer layer. The line patterns are aligned along substantially the same direction as one another. When the device is viewed in transmission, at some angles (between the device normal and the observer), the two sets of lines will appear to tessellate with one another, obstructing the passage of light through the device and causing it to appear dark. At other angles, the two sets of lines will become aligned with one another to a greater or lesser extent, allowing the passage of light through the device and causing it to appear relatively bright. The result is a security device which appears to switch between a dark appearance and a bright appearance as the viewing angle changes. This effect will not be reproducible by photocopying and hence the device provides a reasonable degree of security. However, its visual impact is relatively low and hence on a quick evaluation of an object carrying such a feature, its presence (or lack thereof) may be overlooked. Further, a similar dark/light switching effect could be imitated using a metallic ink for example.

There is a constant need therefore to develop new security devices and visual effects in order to stay ahead of would-be counterfeiters.

In accordance with a first aspect of the present invention, a security device is provided, comprising a first pattern of elements and a second, overlapping, pattern of elements spaced by a transparent layer, the first and second patterns in combination obstructing the passage of light transmitted to a viewer through the device to a varying degree depending on the viewing position, wherein the first and second patterns of elements are configured such that a first region of the device exhibits a maximum rate of change in the degree of obstruction with tilt angle when the device is tilted relative to the viewer about a first tilt axis, and a second region of the device exhibits a maximum rate of change in the degree of obstruction with tilt angle when the device is tilted relative to the viewer about a second tilt axis which is not parallel to the first tilt axis.

As discussed in detail below, the degree of obstruction exhibited by the device at any viewing angle can manifest itself in a number of different ways. Generally, the pattern elements will be of greater optical density than the transparent layer. For example, the pattern elements may be substantially opaque in which case the degree of obstruction would correspond to an apparent darkness level of the region. Alternatively, the pattern elements could be semi-transparent and coloured, in which case a greater degree of obstruction could appear as an increase in colour intensity or as a change in tone or hue if elements of more than one colour are present. For brevity, the description below will often refer to the "darkness" of the device or a region thereof, and it should be understood that this is only one example of how the degree of obstruction may affect the device's appearance.

It should also be noted that the light "transmitted through" the device need not be transmitted from a light source on one side of the device through to a viewer on the other side. This is the case in many preferred embodiments, but in alternative advantageous implementations, discussed below, one side of the device may be provided with a reflective surface such that light from a light source on one side of the device can be transmitted through the device and reflected back through the device to an observer on the same side as the light source.

The rate of change in a region's obstruction level with tilt angle determines how much the appearance of a region will change when the device is tilted (i.e. the viewing position moves towards or away from the normal) by a certain amount. The rate of change is affected by various factors including the arrangement of the patterns as will be described below. By providing two regions of the device which are configured to show the greatest rate of change in their appearance with tilt angle when the device is tilted about different axes (i.e. in different directions), a distinctive change in contrast between the two regions can be viewed as the device is moved. In particular, when the device is tilted about the first tilt axis, the first region will display a significant change in appearance, e.g. changing from dark to light, whilst over the same change in tilt angle, the second region will remain relatively unchanged in appearance. When the device is tilted about the second tilt axis, the behaviour of the two regions will be reversed. Thus, the visual effects exhibited by the device will be different depending on the direction of tilt, which increased complexity enhances the security level of the device. Further, the contrast between the two regions that will be apparent at many angles of view additionally enables the device to be used to convey information, e.g. numbers, text, graphics, etc.

Preferably, the regions are configured such that when the device is tilted about the first tilt axis, the second region of the device exhibits substantially no change in the degree of obstruction. In other words, one region remains substantially static and unchanged in appearance when the device is tilted in such a way that the other region displays it maximum rate of variation. This enables the two regions to be most clearly distinguished from one another, visually. However, this is not essential and in other embodiments both regions could display some variation when the device is tilted about the first tilt axis, although the variation rate of the second region is preferably very slow in comparison. The same considerations apply when the device is tilted about the second tilt axis: preferably, the first region of the device will now show substantially no variation in its appearance, or very little.

The two tilt axes could be at any non-zero angle to one another, but preferably the intervening angle is sufficiently large such that when the device is tilted about the first axis, any component of tilt about the second tilt axis resulting from the movement is small. For instance, the angle between the axes may be around 45 degrees or greater. In particularly preferred embodiments, the first and second tilt axes are substantially perpendicular to one another (e.g. 85 to 95 degrees).

The two regions of the device could have different pattern configurations such that their appearance is different from one another when the device is viewed normally. However, it is preferred that the first and second regions exhibit substantially no contrast between them when the device is viewed from the normal position. Thus, any boundary between the regions can be substantially concealed such that the presence of the two different regions is not readily apparent when the device is viewed from the normal but is revealed when the device is tilted.

One manner by which this can be achieved is by configuring the region such that the lateral offset between the first and second patterns is the same in each of the first and second regions. In particularly preferred examples, the lateral offset between the first and second patterns is such that the elements of the first pattern are complementary to those of the second pattern, being located in between the elements of the second pattern, whereby from the normal viewing position, the first and second regions each exhibit their maximum degree of obstruction. Thus, for example, the two regions of the device appear dark when viewed normally.

In other preferred implementations, the lateral offset between the first and second patterns is such that the elements of the first pattern are non-complementary to those of the second pattern, being located directly in line with the elements of the second pattern, whereby from the normal viewing position, the first and second regions each exhibit their minimum degree of obstruction. Thus, for example, the two regions of the device appear light when viewed normally.

Of course, some intermediate offset between the two patterns could be implemented instead, in which case both regions would exhibit some intermediate obstruction level.

Advantageously, for each region, the tilt axis about which the region exhibits a maximum rate of change in the degree of obstruction exhibited with tilt angle is determined by a pattern direction of the region, lying in the plane of the device, which pattern direction is defined by the first and second patterns in combination, arising from anisotropy of the first and/or second pattern or from the lateral positioning of the elements of the first pattern relative to the elements of the second pattern, the pattern direction of the first region being non-parallel to that of the second region. A pattern direction can be attributed to any overlapping pair of patterns, resulting either from features intrinsic to either or both patterns (e.g. the long axis of line elements, or the relative positioning of dot elements arranged on a grid), or from the position of features in one pattern relative to those in another. In order for each region to exhibit a maximum rate of change in obstruction with tilt angle when tilted about a different axis, therefore, in this implementation, the pattern direction must be different in each of the two regions.

Preferably, the pattern direction of the first region makes an angle of between 5 and 90 degrees with that of the second region, preferably between 45 and 90 degrees, more preferably between 75 and 90 degrees, most preferably around 90 degrees. The closer the angle to 90 degrees, the better the contrast between the two regions when the device is tilted.

The two regions of the device could have any position relative to one another, but in preferred embodiments, the first and second regions abut one another or are spaced from one another by no more than 1 cm, preferably no more than 0.5 cm. This assists the viewer in perceiving the changing contrast between the two regions as the device is tilted.

The two regions could take any desirable shape, but in preferred examples, the first region or the second region, or both in combination, define one or more items of information, preferably a letter, digit, symbol, image, graphic or alphanumerical text. In particularly advantageous examples, the first region surrounds at least a part, preferably all, of the second region, the first region preferably appearing as a background to the first region.

Each region could constitute a single, continuous area of the device. However, in other preferred examples, the first and/or second region comprises a plurality of sub-regions, each sub-region forming part of one region exhibiting the same variation in degree of obstruction as the device is tilted. The sub-regions forming part of the first region could be spaced from one another by portions of the second region, or vice versa.

According to a second aspect of the invention, a security device is provided comprising a first pattern of elements and a second, overlapping, pattern of elements spaced by a transparent layer, the first and second patterns in combination obstructing the passage of light transmitted to a viewer through the device to a varying degree depending on the viewing position, wherein the first and second patterns of elements are configured so as to define at least three regions of the device, constituting a first group of regions, each region of the first group exhibiting a maximum degree of obstruction when observed by a viewer from at least one maxima viewing position, and a minimum degree of obstruction when observed by a viewer from at least one minima viewing position, the at least one maxima viewing position and the at least one minima viewing position constituting a set of peak viewing positions for each region, and wherein the sets of peak viewing positions associated with each of the regions of the first group respectively are different from one another.

Since the sets of peak viewing positions are different for each region—i.e. each region displays its maximum obstruction level when viewed from one or more positions which are not (all) the same as those at which any one of the other regions of the group do so and/or displays its minimum obstruction level when viewed from one or more positions which are not (all) the same as those at which any one of the other regions of the group exhibits minima—each region changes in appearance differently as the device is tilted and/or rotated. It should be noted that the sets of peak viewing positions associated with two or more of the regions could share one or more maxima viewing positions, or one or more minima viewing positions, but the full sets of maxima and minima viewing positions for any two regions will not be coincident with one another (since in this case the behaviour of the two regions during tilting/rotation would be identical). If one region exhibits a maximum at one viewing position and another region exhibits a minimum at the same viewing position, these are not coincident peak viewing positions, since one is a maximum whilst the other is a minimum and so the regions will have opposite appearances at that viewing position.

It will be appreciated that the term "obstruction" here has the same meaning as discussed in relation to the first aspect of the invention and the pattern elements are generally of higher optical density than the transparent layer, e.g. coloured and/or opaque. Thus a change in "obstruction" could for example be perceived as a change in darkness and/or colour of the region.

The terms "minimum/minima" and "maximum/maxima" refer to, respectively, the lowest and highest obstruction levels exhibited by the region in question, taking all viewing positions into account. Depending on the construction of the device, for example, one or more of the regions may never exhibit 100% obstruction at any rotational or tilt angle, and the maxima viewing positions are therefore those locations at which the greatest level of obstruction achievable by the region in question is seen. Likewise, a region need not exhibit the lowest obstruction level theoretically possible for the two patterns (e.g. 50% where the ratio of pattern elements to gaps in each of the patterns is 50%) at any viewing angle—the minima viewing positions are those at which the lowest achievable obstruction level is shown. The actual values of maximum and/or minimum obstruction could be different for different regions (e.g. if the pattern elements differ between regions), but in preferred implementations are substantially equal for each region of the group.

By providing at least three regions of the device which exhibit different behaviours in this manner as the device is tilted and/or rotated, the result is a dynamic visual effect. As the viewing position undergoes certain changes from one location to another, a different one of the at least three regions displays the highest obstruction level or, analogously, the highest transmission level. Thus, for example, the darkest part of the device appears to move from one region to another. Depending on the construction of the device, tilting and/or rotation in a particular direction or about a particular axis may be required to perceive the apparent "motion". Nonetheless, this striking effect is straightforward to test for and observe, and hence provides a particularly high security level. It should be noted that the device may comprise additional regions which may or may not form part of the first group, as discussed further below.

The regions of the first group could be arranged in any order and at any locations across the device. For instance, as the device is tilted and/or rotated, the darkest part of the device could appear to jump from one region to another, either in a recognisable sequence or in a pseudo-random manner. However, in particularly preferred examples, the first and second patterns are configured such that, as the viewing position is changed, a respective maxima viewing position or a respective minima viewing position for each of the at least three regions of the first group is reached in the same order as that in which the corresponding regions are arranged spatially across the device in a first continuous direction. That is, for example, consecutive regions of the first group may exhibit their maximum or minimum darkness level one after the other in sequence so that the darkest or brightest part of the device appears to move in a continuous direction (e.g. along a straight or curved line, or towards the centre or outside of a 2D shape) as the device is tilted or rotated. This provides the device with a particularly strong visual impact since the eye is led along the direction of motion. It is not essential for this to hold true for all changes in tilt/rotation angle; for example, at very high tilt angles (e.g. more than 60 degrees from the normal), the order in which the regions display maximum obstruction may change. However the desired order is preferably maintained at least at smaller tilt angles (e.g. less than 30 degrees from the normal).

In some preferred embodiments, the regions of the first group are arranged spatially on the device adjacent one another, such that as the device is tilted and/or rotated adjacent regions exhibit their maximum or minimum obstruction in sequence. This provides a smooth and instinctive movement effect. However, in other advantageous embodiments, the regions of the first group may be spaced from one another, optionally by other regions of the device, as will be discussed further below.

Preferably, at least when viewed from a position away from the normal, each of the at least three regions of the first group exhibits a different degree of obstruction. This gives the device a multi-tonal or greyscale appearance. However at certain viewing positions, two or more of the regions may exhibit the same obstruction level.

In particularly preferred embodiments where the regions of the first group are adjacent one another, the degrees of obstruction exhibited by the regions of the first group at least when viewed from a static position away from the normal increase from one region to the next adjacent region in series such that in combination the regions exhibit a spatially graduated degree of obstruction across the device. That is, the darkness level (for instance) increases or decreases gradually in steps from one region to the next across the device. This can be used to give the device the impression of three dimensional depth and assists in creating the illusion of smooth movement of dark and light areas across the device.

In order that the change in appearance of the regions can be fully appreciated by the viewer, the first and second patterns should be configured in each region such that sufficient variation can be perceived at the available range of viewing positions. Hence, advantageously, each of the regions has an associated maxima viewing position at a non-zero tilt angle which is less than 90 degrees, preferably less than 60 degrees, more preferably less than 45 degrees, most preferably less than 30 degrees. Each of the regions may alternatively or in addition have a minima viewing position (i.e. a viewing position at which the minimum obstruction level will be observed) at a non-zero tilt angle within these ranges. The closer the maxima and/or minima viewing positions are to the normal (i.e. the greater the rate of change in obstruction level with tilt angle), the smaller the amount of tilt that will be necessary in order to observe the full visual effect of the device and the faster the dynamic visual effect will appear to "move" as tilting takes place.

There are two primary mechanisms which, in preferred embodiments, may be used either individually or in combination to implement the above-described effects, resulting in devices which are responsive to tilting or rotating or both.

In a first preferred implementation, each of the at least three regions of the first group exhibits a maximum rate of change in the degree of obstruction with tilt angle when the device is tilted relative to the viewer about different respective tilt axes, whereby as the tilt direction is changed relative to the viewer, a different one of the at least three regions of the first group exhibits its maximum or minimum degree of obstruction in turn. Thus, as the device is tilted in any one direction, the at least three regions will display different behaviour, and as the tilted device is rotated (i.e. the tilt direction/tilt axis is progressively changed), different ones of the regions will become optimised to exhibit maximum rate of variation.

In particularly preferred embodiments, the tilt axes about which each respective region of the first group exhibits its maximum rate of change in degree of obstruction with tilt angle lie at angles which successively increase relative to a reference direction from one region to the next region of the first group in series, whereby as the tilt direction is changed relative to the viewer, regions of the first group exhibit maximum or minimum obstruction in sequence along a continuous direction. Thus, as the device is rotated, the darkest or lightest area of the device appears to move in an identifiable direction (e.g. along a straight or curved line, or towards the interior or exterior of the device), when viewed from an off-axis location. Preferably, the regions of the first group are adjacent one another such that the movement appears to take place smoothly from one region to the immediately adjacent region. However, this is not essential and the regions of the group could be spaced, e.g. by other regions of the device as discussed below.

Advantageously, the at least three regions of the first group exhibit substantially no contrast between them when the device is viewed from the normal position. That is, each of the regions displays substantially the same obstruction level to a viewer positioned on the device normal. In this way, the boundaries between the regions are not distinguishable to the naked eye when viewed from the normal, such that any information defined by the regions is hidden but will be revealed when the device is tilted.

In a particularly preferred example, the amount of lateral offset between the first and second patterns is the same in each of the at least three regions of the first group. For instance, in certain advantageous embodiments, the lateral offset between the first and second patterns is such that the elements of the first pattern are complementary to those of the second pattern, being located in between the elements of the second pattern, whereby from the normal viewing position, the at least three regions of the first group each exhibit their maximum degree of obstruction. Thus, the three regions may all appear dark when viewed from the normal.

In other preferred cases, the lateral offset between the first and second patterns is such that the elements of the first pattern are non-complementary to those of the second pattern, being located directly in line with the elements of the second pattern, whereby from the normal viewing position, the at least three regions of the first group each exhibit their minimum degree of obstruction. In this case, the three regions may all appear light when viewed from the normal.

The regions could have some intermediate offset value (i.e. in-between complementary and non-complementary), in which case when viewed from the normal each would exhibit an intermediate level of obstruction.

Advantageously, for each region of the first group, the tilt axis about which the region exhibits a maximum rate of change in the degree of obstruction exhibited with tilt angle is determined by a pattern direction of the region, lying in the plane of the device, which pattern direction is defined by the first and second patterns in combination, arising from anisotropy of the first and/or second pattern or from the lateral positioning of the elements of the first pattern relative to the elements of the second pattern, the pattern direction of each region of the first group being different. As already mentioned above, a pattern direction can be attributed to any pair of first and second patterns based either on directional features in one or both patterns, or on the relative positioning of the two. By selecting a different pattern direction for each region, the respective regions will exhibit their maximum rate of variation in obstruction level when tilted in different directions, as described above.

The angular difference in pattern direction between one region and another in the first group determines how "quickly" the area showing the maximum obstruction level will appear to move from one region to another as the device is rotated: the greater the angular difference, the more rotation is required before the region exhibiting maximum obstruction will appear to change and hence the slower the motion effect (although the large step-change between regions may result in a "flashy" or sudden dynamic effect). If the angular difference is small, successive regions in the series may display similar behaviour to one another making them less distinguishable from one another. This may be beneficial in certain implementations but generally a greater visual distinction between regions is preferred into order to define the dynamic effect more clearly. It has been found particularly effective if the respective pattern directions of the at least three regions of the first group form a set of pattern directions which are angularly spaced from one another by between 5 and 45 degrees, preferably between 15 and 40 degrees, more preferably around 30 degrees.

Further, whilst not essential, if it advantageous if the respective pattern directions of the at least three regions of the first group form a set of pattern directions which are angularly spaced from one another by substantially the same amount between each angularly adjacent pair of pattern directions. This causes the apparent motion effect to move between regions at a substantially constant rate as the device is rotated. In other cases, the amount of change in pattern direction between sequential regions could be varied in different areas of the device to provide the illusion of acceleration and/or deceleration.

As mentioned above, the at least three regions of the group could be arranged in any order so that the motion appears to "jump" from one part of the device to another. However, in particularly preferred embodiments, each respective pattern direction of the at least three regions of the first group makes an angle with a reference direction which successively increases from one region to the next region of the first group in series, preferably by a substantially constant increment, whereby as the tilt direction is changed relative to the viewer (i.e. the tilted device is rotated), regions of the first group exhibit maximum or minimum obstruction in sequence along a continuous direction, the regions of the first group preferably being adjacent one another. Thus, the motion appears to move in a continuous direction and preferably at a continuous rate.

Any assortment of regions could be provided. For instance, the at least three regions could be configured to display their maximum rate of obstruction variation when tilted about tilt axes which lie within less than 90 degrees of each other, e.g. between 30 and 60 degrees of each other. However, it is advantageous if the at least three regions of the first group include a first region and a second region, the tilt axes about which the first and second regions respectively exhibit their maximum rate of change in degree of obstruction with tilt angle lying at approximately 90 degrees to one another. In this way whichever direction the device is tilted in, at least the first or the second region (or both) will display a variation in obstruction level and the device will not appear static. Further as the device is rotated and/or tilted, both the maximum and minimum levels of obstruction will be visible in different regions of the device. Advantageously, at least one, preferably a plurality, of the at least three regions of the first group is located between the first and second regions. Since these in-between regions will operate best (fastest) on different tilt axes from the orthogonal axes for which the first and second regions are optimised, they will provide intermediate obstruction levels.

Advantageously, the change in pattern direction between the first and second regions is spread evenly across the in-between regions. That is, preferably, the first group comprises N regions, of which (N−2) regions are located between the first and second regions, the respective tilt axes about which each of the N regions exhibits its maximum rate of change in obstruction with tilt angle being angularly separated from one another by approximately 90/(N−1) degrees.

As before, the in-between regions could be in any order, but preferably, the angle of the respective tilt axes about which each of the N regions of the first group exhibits its maximum rate of change in obstruction with tilt angle, relative to that of the first region, increases from each region to the next region of the first group towards the second region. Thus, the movement will appear to move in a continuous manner from one region to the next, and the device will have a graduated appearance when viewed away from the normal.

The second primary mechanism for obtaining the described dynamic visual effect is to vary the lateral offset between the two patterns from one region to another. Thus, in further preferred implementations, the lateral offset of the first pattern relative to the second pattern is different in each of the at least three regions of the first group, whereby when viewed from the normal viewing position, contrast is exhibited between each of the regions of the first group and when the tilt angle is changed relative to the viewer along at least one tilt direction, the contrast exhibited between each of the regions of the first group changes. Typically, the at least one tilt direction which reveals the change in contrast may be parallel to the direction of lateral offset, but this is not essential depending on the patterns in question. The at least one tilt direction which reveals the change in contrast is preferably the tilt direction along which the patterns exhibit fastest change in obstruction level, as discussed above—e.g. perpendicular to the elongate direction of a line pattern. The change in contrast may take any form but typically, as the device is tilted in the at least one direction, different ones of the regions will exhibit their maximum or minimum obstruction level, one after the other. Hence, preferably, at different tilt angles along the at least one tilt direction, different ones of the at least three regions of the first group exhibit maximum obstruction.

In particularly advantageous embodiments, the lateral offset between the first and second patterns in a constant offset direction increases successively from one region to the next region of the first group, preferably by a substantially constant increment, whereby, at any viewing position, in combination the regions of the first group exhibit a spatially graduated degree of obstruction across the device and as the tilt angle is changed along the at least one tilt direction, regions of the first group in series along a continuous direction exhibit maximum obstruction in sequence. This produces a particularly strong visual effect since the eye is led in a continuous direction by the apparent movement.

As before, it is preferred that the regions of the first group are adjacent one another so that the movement appears smooth. However this is not essential and the regions could be spaced (e.g. by 1 cm or less), optionally by other regions of the device.

Advantageously, the lateral offset between the first and second patterns increases from one region of the first group to another, preferably the next region of the first group in series, by an amount less than Q/4, where Q is the pitch of the pattern in the lateral offset direction, preferably less than or equal to Q/6, more preferably less than or equal to Q/8. This results in a multitonal or greyscale appearance of multiple obstruction levels and if the increase is from one region of the device to the next in series, this appears as a gradation across the device and, when the device is tilted, the "darkest" part of the device appears to move in a continuous direction. It should be noted that these shift amounts are based on the assumption that the shift is in the direction parallel to the tilt direction in which the patterns exhibit the fastest change in obstruction level (e.g. the direction perpendicular to the elongate direction of a line pattern). If the shift takes place in another direction, the component of the shift in this direction parallel to the tilt direction in which the patterns exhibit the fastest change in obstruction level is key and preferably takes the values mentioned above.

Preferably, the at least three regions of the first group include a first region and a second region, the first region having a lateral offset of approximately zero, whereby the first and second patterns are non-complementary, and the second region having a lateral offset of Q/2, where Q is the pitch of the pattern in the lateral offset direction, and at least one, preferably a plurality, of the at least three regions of the first group is located between the first and second regions. Thus, in the second region the first and second patterns are complementary to one another. Hence when viewed from the normal, the first region will exhibit its minimum level of obstruction and the second its maximum, with the in-between region(s) displaying intermediate obstruction level(s). This ensures that the maximum degree of contrast can be seen in the device.

Advantageously, the difference in the lateral offset between sequential regions is approximately equal. Hence in a preferred example, the first group comprises N regions, of which (N−2) regions are located between the first and second regions, and the respective lateral offsets for each of the N regions differ from one another by approximately Q/(2(N−1)). In a particularly preferred embodiment, the respective lateral offset for each of the N regions, relative to that of the first region, increases from each region to the next region of the first group in series towards the second region.

The variation in lateral offset can be implemented in various ways. In a first preferred embodiment, in only one of the first and second patterns, the elements in the second and third regions of the first group are laterally shifted relative to those in the first region to provide the change in lateral offset between regions. That is, the elements of one pattern have a constant periodicity and spacing across the first, second and third regions whilst the other pattern incorporates shifts at the region boundaries.

In a second preferred embodiment, in each of the first and second patterns, the elements in the second and third regions of the first group are laterally shifted relative to those in the first region to provide the change in lateral offset between regions, the lateral shift of the elements in the first pattern being opposite in direction to the lateral shift of the elements in the second pattern. That is, the offset variation is "shared" between the two patterns. The amount of offset shift may be equal or different in the two patterns.

In one advantageous embodiment, at least a pair of the at least three regions of the first group have a lateral offset (relative to that in the first region) substantially equal in magnitude but opposite in direction, whereby when the device is viewed from the normal position, the pair of regions exhibits substantially equal degrees of obstruction whilst when the device is tilted relative to the viewer along the tilt direction parallel to the offset direction, one of the pair of regions exhibits an increased degree of obstruction whilst the other of the pair of regions exhibits a reduced degree of obstruction. This produces a particularly striking visual effect since the two regions will exhibit opposite behaviours when the device is tilted.

As already discussed, a dynamic effect between the regions can also be achieved by varying the pattern direction between regions. Where the lateral offset is varied, in certain preferred embodiments, the pattern direction is not varied between regions. Hence, advantageously, a pattern direction, lying in the plane of the device, is defined in each region by the first and second patterns in combination, arising from anisotropy of the first and/or second pattern or from the lateral positioning of the elements of the first pattern relative to the elements of the second pattern, the pattern direction of each of the at least three regions of the first group preferably being parallel. In a particularly effective embodiment, the device further comprises a fourth region in which the pattern direction makes a non-zero angle, preferably approximately 90 degrees, with that of the at least three regions of the first group, whereby as the device is tilted in the tilt direction parallel to the offset direction, the fourth region exhibits a lower rate of change in the degree of obstruction with tilt angle than the at least three regions of the first group, preferably substantially no change. Thus, the fourth region exhibits a different behaviour to that of the first group, drawing a clear contrast between it and the first group. If desired, the fourth region could be configured to define information (e.g. be provided in the shape of a number, letter, symbol or graphic), with the first group of regions acting as a dynamic background, or vice versa.

As mentioned above, the device may comprise one or more further regions in addition to those of the first group. Thus, in a preferred embodiment, the first and second patterns of elements are further configured so as to define a second group of regions comprising at least two (preferably at least three) further regions of the device, each region of the second group exhibiting a maximum degree of obstruction when observed by a viewer from at least one maxima viewing position, and a minimum degree of obstruction when observed by a viewer from at least one minima viewing position, the at least one maxima viewing position and the at least one minima viewing position constituting a set of peak viewing positions for each region, and wherein the sets of peak viewing positions associated with each of the regions of the second group respectively are different from one another, the first and second patterns being configured such that, as the viewing position is changed, the second group of regions displays a change in obstruction levels which is different from that exhibited by the first group of regions. The second group of regions could be implemented using any of the techniques described above for the first group. For instance, the second group could comprise regions of different pattern direction or of varying lateral offset. The chosen technique may be different for the first and second groups. The second group may alternatively be "static", without any dynamic variation between regions, if desired. Any number of groups of regions could be provided.

In a particularly preferred implementation, the first and second patterns are configured such that, as the viewing position is changed, a respective maxima viewing position or a respective minima viewing position for each of the at least two regions of the second group of regions is reached in the same order as that in which the corresponding regions are arranged spatially across the device in a second continuous direction, different from the first continuous direction. This produces a strong visual impact which is extremely difficult to mimic using other means.

The various groups of regions could be isolated from one another or arranged adjacent one another in the device. However, it is advantageous if the regions of the first and second groups are interleaved with one another across the device. This increases the complexity and hence the security level of the device, and can also be used to improve the overall visual effect.

In a particularly advantageous embodiment, the lateral offset of the first pattern relative to the second pattern is different in each of the at least two regions of the second group, whereby when viewed from the normal viewing position, contrast is exhibited between each of the regions of the second group and when the tilt angle is changed relative to the viewer along at least a tilt direction, the contrast exhibited between each of the regions of the second group changes, wherein the offset direction within the first group is not parallel to that within the second group. Thus, the two groups of regions are optimised to exhibit a dynamic visual effect when the device is tilted in different directions. This assists in ensuring that, whichever direction the device is tilted in, at least some of the regions will exhibit the desired dynamic effect.

However many groups of regions are provided, preferably either the pattern direction defined by the first and second patterns in combination or the lateral offset between the first and second patterns, or both, varies from one region of the device to another.

Nonetheless, more than one of the regions could share the same offset amount and pattern direction and hence display the same appearance as the device is tilted.

The regions of the device could be arranged with any desired positioning relative to one another. However, it is preferred that at least some of the regions abut one another or are spaced from one another by no more than 1 cm, preferably no more than 0.5 cm. This assists the viewer in perceiving the changes in contrast between the regions as the device is tilted and/or rotated.

The device could take any configuration but in preferred examples the regions may be arranged to emphasise or to relate to the dynamic effect perceived upon tilting and/or rotating. For instance, in preferred examples, the regions of the device are arranged along a line, preferably a rectilinear line. In other preferred implementations, the regions of the device are concentric, preferably circles, squares, rectangles, triangles or any other shape. In further advantageous embodiments, the regions of the device are arranged to form one or more symbols, letters, numbers, pictorial graphics or spirals, preferably a circular, triangular or square spiral.

Referring now to both the first and second aspects of the invention, in many implementations, the size or weight (e.g. line width) of the pattern elements will be constant across the device. However, this can be varied to introduce an additional visual effect to the device. Thus in a preferred example, the size or weight of the elements making up the first and/or second patterns is varied across the device in accordance with a third pattern which appears superimposed on the device, locations of relatively high element size or weight exhibiting a relatively high degree of obstruction compared with their surroundings at all viewing positions, and locations of relatively low element size or weight exhibiting a relatively low degree of obstruction compared with their surroundings at all viewing positions. For example, one or both of the patterns could take the form of a screened working, with the variation in element size or weight imparting a variation in tone which can be used to convey information such as alphanumerical text, a letter, digit, symbol or graphic. The resulting image will remain static as the device is tilted and/or rotated, with the dynamic effect already described appearing as a background to the image. The image may or may not be related to the shape or position of the various regions making up the device.

Preferably, within each region of the device, each of the first and second patterns is periodic and has equal periodicity. However, the periodicity of the patterns could vary from one region to another and this may be utilised to vary the apparent "speed" of the dynamic effect as the device is tilted or rotated.

The first and second patterns could take many different forms but preferably are adapted to approximately tessellate with one another. That is, it should preferably be possible to move the two patterns relative to one another (theoretically, not in practice) such that the pattern elements of one "fill in" the gaps (or secondary pattern elements) of the other more or less precisely. However, it is not essential that this tessellation be exact. In preferred examples, the first and/or second patterns may comprise any of:

Line elements, preferably rectilinear, sinusoidal or zigzag line elements, optionally formed of dot elements arranged along lines;

Dot elements, arranged on a regular grid, preferably an orthogonal grid or in a checkerboard pattern Annular elements, arranged on a regular grid.

So-called "dot" elements need not be circular but could take any shape, including indicia such as a number, letter or other symbol. Line or dot elements could also contain negative indicia such as letters or numbers defined by a gap inside an element, and similarly line or dot elements could be made up by a plurality of positive indicia, joined up or not.

As already mentioned, the elements of the first and/or second patterns may be spaced from other elements within the same pattern by gaps (i.e. the absence of pattern elements) or by contrasting elements ("secondary pattern elements"). Advantageously, in the first and/or second pattern, the surface area proportion of elements to intervening gaps or contrasting elements is between 30 and 70%, preferably between 40 and 60%, more preferably approximately 50%. However, as mentioned above this could be varied across the device, optionally in accordance with a third pattern, e.g. to define information. Additionally, whether or not a third pattern is imposed, the proportion of elements to intervening gaps or contrasting elements (e.g. across the whole device) can give rise to different effects. For instance, a higher line weight (e.g. 60%) has been found to result in a greater degree of dark/bright contrast between regions as the device is tilted and/or rotated, as compared with lower line weight patterns. As such, the proportion of elements to intervening gaps or contrasting elements can be selected for each individual device to achieve the desired effects.

The aspect ratio of the pattern dimensions to the distance between the two patterns (set by the transparent layer) also affects the rate of change in obstruction level with tilt angle, and hence the angles to which the device must be tilted in order to perceive the described changes in appearance. Generally, the smaller the ratio of the pattern pitch of the first and/or second pattern to the thickness of the transparent layer, the faster the rate of change, hence the lower the required tilt angles will be and the more readily the effects will be obtained. As such, the smallest values of pitch: thickness ratio ("Q:d" ratio) that are achievable with available pattern forming techniques will generally be preferred. However, in practical terms the present inventors have found it most advantageous if the ratio is between 1.5:1 and 3:1, preferably between 1.67:1 and 2.33:1, more preferably around 2:1.

The minimum size of the pattern elements may be restricted by the technique by which the pattern is formed. The size is preferably kept small in order to improve the ratio mentioned above and also in order that the individual elements are not overly conspicuous to the observer. Preferably, the elements of the first and/or second pattern have a minimum dimension (e.g. linewidth, L) in the range 50 to 150 microns, preferably around 100 microns. Advantageously, the first and/or second pattern has a pitch Q in the range 100 to 300 microns, preferably around 200 microns.

Each region could have any size and shape appropriate for the chosen device configuration. There is no maximum size limitation on the size of each region. Preferably, each region has a minimum dimension of at least 1 times the pitch of the first and/or second pattern. That is, each region will contain at least one pattern repeat at the required pattern direction and/or offset. If there is a single pattern repeat in each region, and the regions are arranged in series order as described above, the dynamic effect will appear substantially continuous with no clear divide between one region and the next. As the size of the regions increases relative to the pattern repeat, the dynamic effect becomes increasing "step wise", with discrete regions each exhibiting a uniform appearance at each viewing position, which can be distinguished from the next region. Both implementation techniques can be used to good effect.

As mentioned above, in certain preferred embodiments of the first and second aspects of the invention, the elements of the first and/or second patterns are substantially opaque such that an increase in the degree of obstruction exhibited by a region appears as an increase in darkness of the region. However, this is not essential and in other cases, the elements of the first and/or second patterns are coloured and/or semi-transparent such that a change in the degree of obstruction exhibited by a region appears as a change of the colour of the region, in terms of its hue, tone, opacity and/or brightness. For example, the elements of the first pattern may have a first colour and the elements of the second pattern may have a second, different colour. Thus as the device is tilted, the two colour will be "mixed" by the eye to differing extents, thereby appearing as different shades.

In all aspects of the invention, the two patterns can be formed using any desired techniques. In preferred cases, the first and/or second pattern is printed (e.g. by offset, lithographic or gravure printing), metallised, exposed via a mask (e.g. photosensitive material), or laser-marked, preferably onto or into the transparent layer. For instance, in order to achieve a very high resolution, photopatterning techniques such as those disclosed in our British Patent Application No. 1117523.9 may advantageously be used. The pattern elements could comprise a single layer of material or be formed of multiple, registered layers. For example, if the elements are metallic and created by patterning of metallised areas than each pattern element may comprise a layer of resist material and a layer of metal. Where the pattern element is multi-layered, those layers may have different appearances from one another (e.g. different colours). For example in particularly preferred implementations, the outermost layer of the pattern element (facing away from the transparent layer) may have one colour (e.g. metallic silver) whilst the innermost layer (facing towards the transparent layer) may have another colour (e.g. red) such that the colour of the elements within one pattern is different when viewed from one side of the device as opposed to the other. This "inner" colour layer may be hidden at certain viewing angles and revealed to a greater or lesser extent as the device is tilted. If the "inner" colour is different for the first and second patterns, the device will also present a different colour appearance depending on from which side it is viewed, in addition to the colour variation upon tilt. The colours could also vary from one region of the device to another.

As mentioned above, the security device could be designed for viewing in transmission, with all layers of the device being at least semi-transparent (apart from the material forming the pattern elements, which may be opaque). However, in other implementations it is desirable for the effects to be viewable in a reflective mode of viewing and hence the device preferably further comprises a reflective surface located such that one of the first pattern and the second pattern is positioned between the reflective surface and the transparent layer whereby when the device is viewed from the side having the other of the first pattern and the second pattern, both patterns can be observed against the reflective surface.

In this implementation, the two patterns could be arranged according to any of the options discussed above. However, for at least some of the designs the resulting optical effect may not be identical to that obtained in a transmissive version of the device with the same two patterns. This is due to the presence of an additional pattern in the form of the reflected image of whichever of the first and second patterns is spaced from the reflective surface. For example, where the first and second patterns have a lateral offset which varies from one region to the next in the manner discussed above, the visual effect of the offset will be combined with an additional obstruction variation as the device is tilted due to the interaction of one or both of the patterns with their reflections. This can be used to generate particularly complex visual effects which are very difficult to imitate. If the pattern(s) spaced from the reflective surface is/are formed of multiple layers of different colour, as described above, the reflected image pattern(s) may have a different colour to that of the originals, introducing further levels of complexity to the effect.

To increase the security of the device still further, the elements of the first and/or second pattern could comprise a security substance such as luminescent material, fluorescent material, thermochromic material, UV responsive material, magnetic material, birefringent material or polarising material. For instance, such material could be included in any one or more layers of a multilayer pattern element. Alternatively or in addition, the transparent layer could comprise a coloured tint and/or a security substance such as luminescent material, fluorescent material, thermochromic material, UV responsive material, birefringent material or polarising material.

The device could further comprise a decorative layer carrying a fourth pattern, preferably a printed decorative layer. This could be used, for example, to define the outline of an image, with the above described dynamic effect "filling in" the image or providing a background thereto.

The first and/or second patterns could also include a border (typically referred to as a "hairline") outlining each of the at least three regions and delimiting it from the next. The inclusion of such a hairline results in a stronger visual distinction between each region whilst omitting the hairline produces a "smoother" effect. Either approach may be preferred depending on the design of the device.

According to a third aspect of the invention, a security device is provided, comprising a first pattern of elements and a reflective surface spaced by a transparent layer, the first patterns of elements obstructing the passage of light reflected to a viewer by the device to a varying degree depending on the viewing position, wherein the first pattern of elements is configured to define at least two regions of the device, of which a first region exhibits a maximum rate of change in the degree of obstruction with tilt angle when the device is tilted relative to the viewer about a first tilt axis, and a second region exhibits a maximum rate of change in the degree of obstruction with tilt angle when the device is tilted relative to the viewer about a second tilt axis which is not parallel to the first tilt axis.

The third aspect of the invention makes use of the same principles already described with respect to the first and second aspects of the invention to achieve an optically variable visual effect. However, rather than providing first and second patterns on either side of the transparent layer (although such a second pattern can be included as discussed below), in the third aspect of the invention, the second pattern is a "virtual" pattern formed as a reflection of the first pattern. When the device is viewed in reflection, the observer perceives a combination of the first pattern and its reflection formed by the reflective surface. As the device is tilted and/or rotated, the positions of the first pattern and its reflection will appear to move relative to one another in the same way as described previously, due to the spacing resulting from the transparent layer. In other words, the first pattern and its reflected image co-operate to obstruct light being reflected by the device to a varying degree which depends on the viewing angle. Thus, at certain viewing angles, the first pattern will appear to have the spaces between its pattern elements "filled" by those of the reflected, virtual pattern, thereby exhibiting the maximum obstruction level, whilst at other viewing angles, the real and virtual pattern elements will overlap to a greater or lesser extent, resulting in lower obstructions levels. As before, it will be appreciated that the term "obstruction" here has the same meaning as discussed in relation to the first and second aspects of the invention and the elements of the first pattern are generally of higher optical density than the transparent layer, e.g. coloured and/or opaque. Thus the change in perceived obstruction level may appear as a change in the darkness of the device, or could appear as a change in colour or colour density.

By forming the device in this way, using a reflective surface, the previously described "switching" or dynamic visual effects of the first and second aspects of the invention respectively, can be viewed under reflected light. This is useful since the device can then be incorporated into or applied to any object and there is no requirement for a transparent or translucent portion of the object to be aligned with the device in order to permit the transmission of light therethrough. For example, the device could be manufactured into a security thread which is incorporated into a banknote in a conventional manner with portions of the thread being revealed through windows on one side of the note only, or the device could be included in a sticker-type article for application to any object.

A further advantage of this aspect of the invention is that the required thickness of the transparent layer for any particular ratio of pitch-to-spacing between the patterns (Q:d) is less than that required in corresponding implementations of the previous aspects of the invention. This is because the reflected, "virtual" pattern appears to the viewer to be located a distance behind the reflective surface: the effective thickness of the transparent layer is doubled, meaning that a transparent layer of half the thickness utilised in previous embodiments can be employed to achieve the same visual result. This allows for a thinner and more flexible device which may be advantageous if the device is to be incorporated within a sheet document, for example (such as a banknote). Alternatively, the thickness of the transparent layer can be maintained, in which case the visual effect will be enhanced (particularly, changes in obstruction level will be apparent at smaller tilt angles) as compared with implementations of the previous aspects since the (Q:d) ratio will effectively be reduced.

Implementations according to the third aspect of the invention can be utilised to form security devices exhibiting many of the effects already described with respect to the first aspect of the invention. Hence, in preferred cases, when the device is tilted about the first tilt axis, the second region of the device exhibits substantially no change in the degree of obstruction. Advantageously, the first and second tilt axes are substantially perpendicular to one another. Preferably, the first and second regions exhibit substantially no contrast between them when the device is viewed from the normal position.

As in the case of the first aspect of the invention, preferably, for each region, the tilt axis about which the region exhibits a maximum rate of change in the degree of obstruction exhibited with tilt angle is determined by a pattern direction of the region, lying in the plane of the device, which pattern direction is defined by anisotropy of the pattern of elements, the pattern direction of the first region being non-parallel to that of the second region. Advantageously, the pattern direction of the first region makes an angle of between 5 and 90 degrees with that of the second region, preferably between 45 and 90 degrees, more preferably between 75 and 90 degrees.

Implementations according to the third aspect of the invention can also be utilised to form security devices exhibiting many of the effects already described with respect to the second aspect of the invention. However, since the virtual pattern is a reflection of the first pattern, if no further pattern is provided, it is not possible to laterally offset the two patterns relative to one another. The virtual pattern elements will in all cases be precisely occluded by the "real" pattern elements of the first pattern (i.e. fully non-complementary). Nonetheless, dynamic visual effects utilising different tilt directions can still be obtained. Therefore, in preferred embodiments, at least three regions of the device are defined, constituting a first group of regions, each of the at least three regions of the first group exhibiting a maximum rate of change in the degree of obstruction with tilt angle when the device is tilted relative to the viewer about different respective tilt axes, whereby as the tilt direction is changed relative to the viewer, a different one of the at least three regions of the first group exhibits its maximum degree of obstruction in turn. As in the second aspect of the invention, more than one group of regions may be provided, preferably exhibiting different behaviour.

In particularly preferred embodiments, the pattern is configured such that, as the viewing position is changed, a respective maxima viewing position or a respective minima viewing position for each of the at least three regions of the first group is reached in the same order as that in which the corresponding regions are arranged spatially across the device in a first continuous direction. Most advantageously, the tilt axes about which each respective region exhibits its maximum rate of change in degree of obstruction with tilt angle lie at angles which successively increase relative to a reference direction from one region to the next adjacent region in series, whereby as the tilt direction is changed relative to the viewer, adjacent regions exhibit their maximum or minimum obstruction in sequence.

The tilt axes which produce the greatest (fastest) variation for each region are typically defined by the pattern direction in each region and preferably, the respective pattern directions of the at least three regions of the first group form a set of pattern directions which are angularly spaced from one another by between 5 and 45 degrees, preferably between 7 and 25 degrees, more preferably around 15 degrees. Advantageously, the respective pattern directions of the at least three regions of the first group form a set of pattern directions which are angularly spaced from one another by substantially the same amount between each angularly adjacent pair of pattern directions.

In a most preferred embodiment, each respective pattern direction of the at least three regions of the first group makes an angle with a reference direction which successively increases from one region to the next adjacent region in series, preferably by a substantially constant increment, whereby as the tilt direction is changed relative to the viewer, adjacent regions exhibit their maximum or minimum obstruction in sequence.

Advantageously, at least one, preferably a plurality, of the at least three regions of the first group is located between the first and second regions. Where the first group comprises N regions, of which (N−2) regions are located between the first and second regions, preferably the respective tilt axes about which each of the N regions exhibits its maximum change in obstruction are angularly separated from one another by approximately 90/(N−1) degrees. Advantageously, the angle of the respective tilt axes about which each of the N regions of the first group exhibits its maximum rate of change in obstruction with tilt angle, relative to that of the first region, increases from each region to the next region of the first group towards the second region.

As mentioned above, if a single pattern of elements is provided, certain effects based on varying lateral offset cannot be achieved. However, in another preferred embodiment, the device further comprises a second pattern of elements located between the reflective surface and the transparent layer, the second pattern of elements preferably being disposed in or on the reflective surface. The second pattern of elements can be used to implement a variation in offset in addition to the variation in pattern direction discussed above. Hence, in a particularly preferred example, the lateral offset of the first pattern relative to the second pattern is different in at least some of the at least two regions, whereby when viewed from the normal viewing position, contrast is exhibited between the regions and when the tilt angle is changed relative to the viewer along at least one tilt direction, the contrast exhibited between the regions changes. The change in lateral offset could be between every region, or sets of plural regions could share the same offset level.

Due to the presence of the "virtual", reflected pattern, the resulting visual effect comprises a graduating change in contrast across the device which moves as the device is tilted, but on which is superimposed a further variation between dark and bright in each region. Particularly complex visual effects can thus be designed which are extremely difficult to imitate.

As in the first and second aspects of the invention, the pattern elements could be formed of a single layer, or could be multi-layered, and if so those (registered) layers could have different colours. This latter implementation is particularly advantageous in the third aspect of the invention since if the outermost and innermost layers of the pattern elements are of different appearance (e.g. colour), the appearance of the pattern elements in the virtual "second" pattern (i.e. the reflection of the first pattern) will be different from that of the first pattern. This may give the impression of each region varying from colourless when the device is viewed from the normal (since the reflected image of the first pattern will be directly concealed under the first pattern itself), to taking on the "hidden" colour as the device is tilted away from the normal. Since the regions will display the variation at different rates for any one tilt direction, as the device is tilted, one region will display the colour before the other, thereby presenting a strong contrast between the regions. If the pattern elements in different regions are formed with innermost layers of different colour from one region to the other, this distinction will again be revealed upon tilting, producing a strong contrast effect.

The first pattern could comprise line elements, dot elements or any of the other options discussed above in relation to the first and second aspects of the invention.

As in the first and second aspects of the invention, the transparent layer may comprise a coloured tint and/or a security substance such as luminescent material, fluorescent material, thermochromic material, UV responsive material, machine readable material, birefringent material, polarising material or transparent magnetic material. The pattern of elements could be formed using any of the techniques, e.g. printing, metallisation, etc. previously discussed. Multi-layer pattern element structures may be formed for example by applying two or more layers in register with one another, e.g. by applying a coloured resist to a metal layer and performing etching to remove the areas not covered by resist, such that pattern elements having metal and resist layers remain. A further decorative layer carrying a fourth pattern, preferably a printed decorative layer, could be incorporated if desired.

The reflective surface is preferably specularly reflective in order to produce a sharp image of the pattern of elements. Any material giving rise to a reflection of the pattern of elements could be used to form the reflective surface, but advantageously, the reflective surface comprises a reflective layer adjacent the transparent layer, preferably comprising metallic material, a thin film structure or a material of different refractive index from the transparent layer. For instance, a high refractive index material could be used if it is desired that the device as a whole be see-through.

The present inventors have found that security devices of the sorts described above comprising two patterns of elements can be, depending on the design of the device, tolerant to a reasonably large amount of mis-registration between the two patterns. This can be beneficial in the sense that manufacturing of the devices is simplified. However, for the same reason, the risk of a successful counterfeit device being produced is increased.

A fourth aspect of the invention addresses this by providing a security device comprising a first pattern of elements and a second, overlapping, pattern of elements spaced by a transparent layer, the first and second patterns in combination obstructing the passage of light transmitted to a viewer through the device to a varying degree depending on the viewing position, the first pattern of elements defining therewithin a first cut-out zone in which no pattern elements are present, and the second pattern of elements defining therewithin a second cut-out zone in which no pattern elements are present, at least a portion of the first cut-out zone being of being of the same shape and size as at least a portion of the second cut-out zone and the first and second cut-out zones being registered to one another such that, at least when viewed from the normal, light is transmitted to the viewer through at least the portion of the two cut-out zones.

It should be noted that the use of cut-out zones in this way is not limited to use security devices according to the first, second or third aspects of the invention, but could be usefully applied to any security device in which high registration between two line patterns is not essential to achieve the primary visual effect. Examples of such devices include moiré interference devices and other devices disclosed in our British patent application no. 1117523.9, as well as those of the first, second and third aspects of the invention.

By providing each pattern with a cut-out zone (or portion thereof) of the same shape and size and registering the two to one another, the difficulty of manufacturing a successful device is increased and hence the security of the device is enhanced. If the matching portions of the cut-out zones are correctly registered, the alignment of the two zones will result in a zone through which light can be transmitted without obstruction by any pattern elements, thereby appearing bright relative to the rest of the device. If however sufficient registration is not achieved (e.g. in a counterfeit device), the visibility of the cut-out zones will be reduced (or, preferably the cut-out zones will no longer be visible) since the zone in the first pattern will overlap a portion of the second pattern, and vice versa, at least to some extent. Viewing of the cut-out zones will therefore be obstructed by the overlapping patterns and the features will not appear as expected or may disappear entirely. This provides a significant obstacle for a counterfeiter to overcome, and a straightforward test for a genuine document.

The matching portions of the cut-out zones should have a shape and size which will quickly reveal mis-registration and thus a minimum dimension of each zone should be of the same order as the registration tolerance of a professional manufacturing system and less than that of amateur equipment, but sufficiently large to allow the feature to be seen by a teller. In advantageous embodiments, each of the first and second cut-out zones has a minimum dimension in at least one direction which is less than or equal to 5 mm, preferably less than or equal to 3 mm, more preferably less than or equal to 1 mm, still preferably less than or equal to 0.5 mm, most preferably less than or equal to 250 microns. For example, using professional lithographic printing apparatus, a registration tolerance of around 200 microns can be achieved and hence a cut-out zone having a width of between 250 and 500 microns should be reproduced reliably. However, ink-jet printing apparatus as may be available to a would-be counterfeiter may only be able to achieve registration to around 500 microns and so reproduction of the same feature would be extremely difficult.

Nonetheless, it is not essential for the cut-out zones to have minimum dimensions on this scale since even larger cut-outs will reveal mis-registration since their appearance in transmitted light will noticeably change due to the encroachment of one of the patterns into the cut-out.

As noted above, only a portion of each cut-out need match the other. Hence one or both cut-outs could extend beyond the matching portion, e.g. as part of a design. However, it is preferred that the whole of each cut-out matches the other.

The first and second cut-out zones could be surrounded by the first and second patterns respectively on all sides or in alternative preferred embodiments, the first and second cut-out zones each adjoins an edge of the respective first or second pattern.

In particularly preferred implementations, the matching portion of each cut-out zone takes the form of one or more lines with linewidth of the dimensions discussed above, the line(s) following at least two different directions in the plane of the device. In this way, mis-registration in any direction can be identified since the appearance of at least one of the line directions will be affected. The one or more lines could be continuous (e.g. including a corner or intersection, or being curved), or could be spaced from one another.

Preferably, the first and second cut-out zones each has the form of an item of information, or a part thereof, such as a letter, number or symbol, or a graphic or pattern, such as a guilloche or fine line pattern. This aids the user in recognising and identifying the cut-out zone in genuine devices. In such cases, the item of information is preferably formed with a linewidth which is less than or equal to 5 mm, preferably less than or equal to 3 mm, more preferably less than or equal to 1 mm, still preferably less than or equal to 0.5 mm, most preferably less than or equal to 250 microns, such that any mis-registration will change the appearance of the item of information or cause it to disappear. Advantageously, one or both of the cut-out zones is provided with a visible outline. This assists in clearly defining the feature, particularly if only a part an the item of information is defined by the cut-out zones, since the remainder of the item can be delimited by the outline, rendering the feature more easily recognisable and drawing attention to the requirement for the cut-out to be present.

The visual effect to which the two patterns of elements give rise could be based on any known mechanism. For example, in preferred embodiments, outside the cut-out zones, the first and second patterns in combination provide a venetian blind effect, a moiré interference pattern, an animation effect created using a barrier strip method as described in WO2011007344 or an optically variable effect viewable in transmitted light generated by the combination of modified line structures for example as described in WO2011076361.

In particularly preferred embodiments, the two patterns are arranged to exhibit effects of the sorts discussed with respect to any of the first, second and third aspects of the invention and hence the security device may additionally comprise any of the features discussed above.

The security devices described with respect to the first, second, third and fourth aspects of the inventions can be utilised in many different ways. Thus, the invention further provides a security article comprising a security device according to any of the aspects discussed above, wherein the security article is preferably a security thread, strip, patch, label or transfer foil.

Such security articles may ultimately be applied or incorporated into any object. However, they find particular application in the field of security documents, the authenticity of which is desired to be testable. Hence, the invention further provides a security document comprising a security article as described above, wherein the security article is preferably located in a transparent window region of the document, or is inserted as a window thread, or is affixed to a surface of the document.

However, it is not essential to form the security device into a security article before the device is incorporated into or onto an object, and so the present invention further provides a security document comprising a security device according to any of the described aspects, the security document comprising a transparent substrate forming the transparent layer of the security device. For instance, the security document may include a transparent layer as an integral part thereof, to which the above-described patterns of elements are applied (or one pattern and a reflective surface) to form the security device. Preferably, the security document is any of: currency (e.g. a banknote, particularly a polymer (plastic) banknote), an identification document, an identification card, a passport, a licence, a certificate of authenticity, a cheque, a stamp or any other document of value.

Examples of security devices, security articles and security documents will now be described with reference to the accompanying drawings, in which.

Figure 3A:
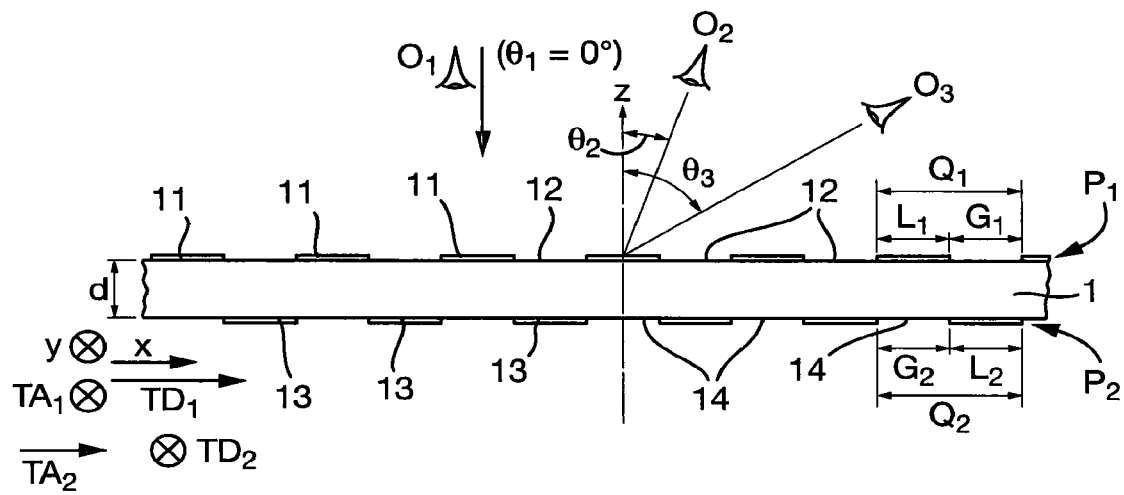
Figure 3B:
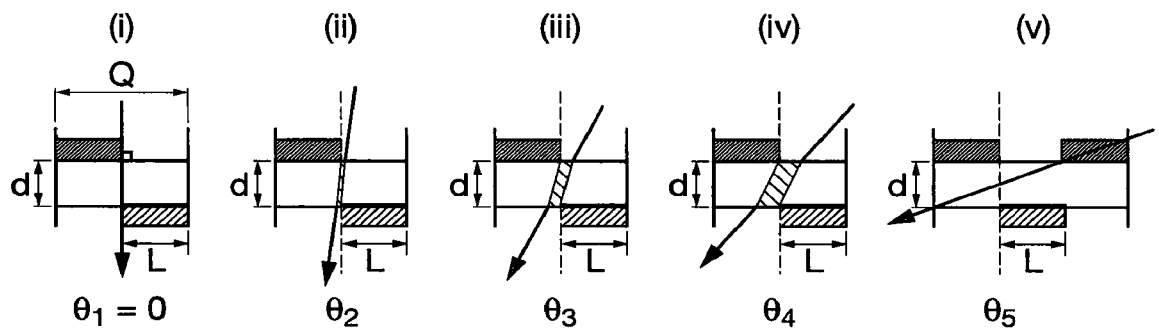
Figure 3C:
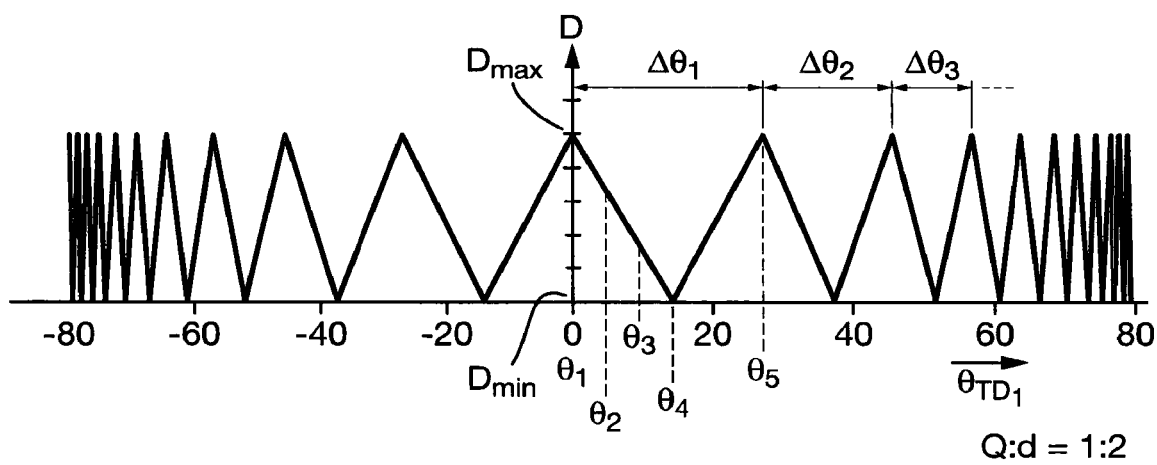
Figure 3D:
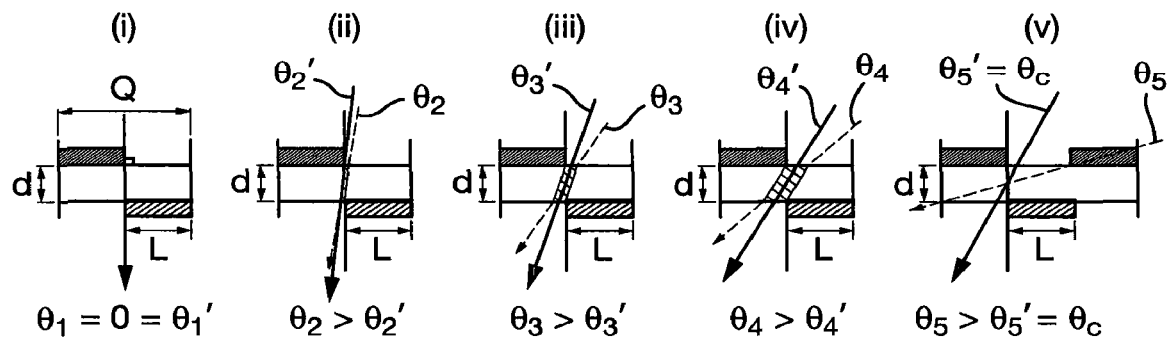
Figure 3E:
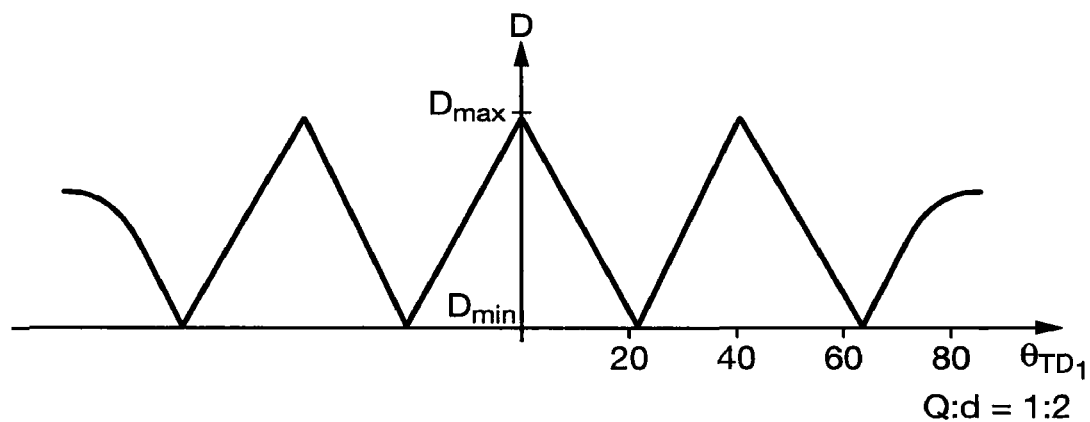
Figure 3F:
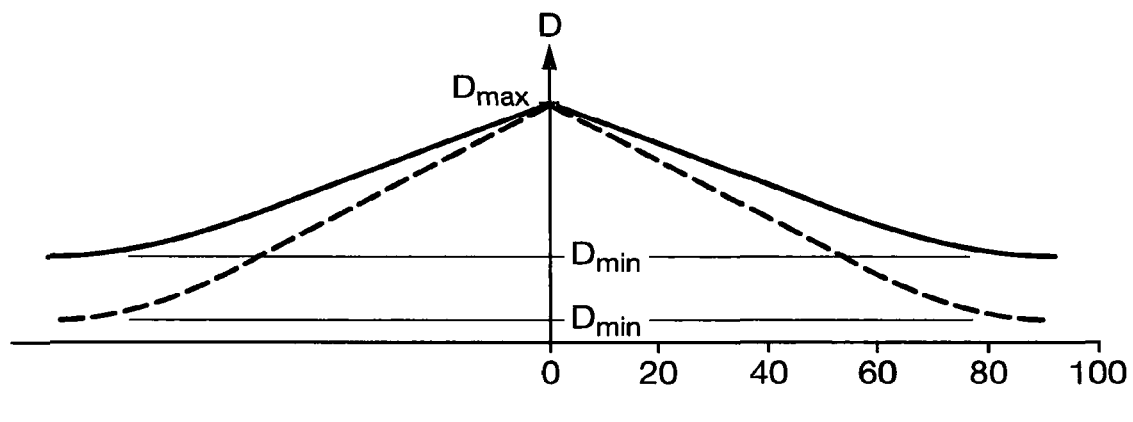
Figure 4A:
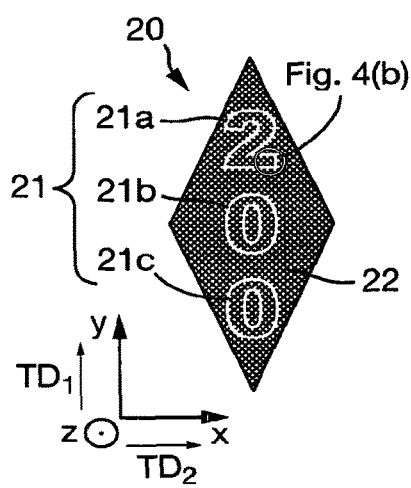
Figure 4B:
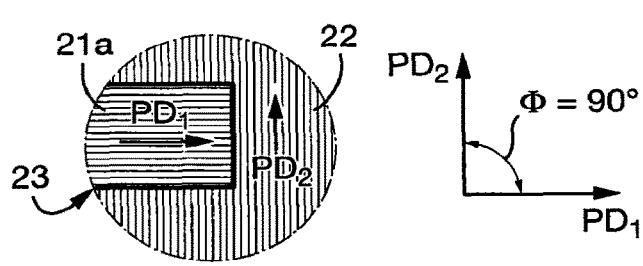
Figure 4C:
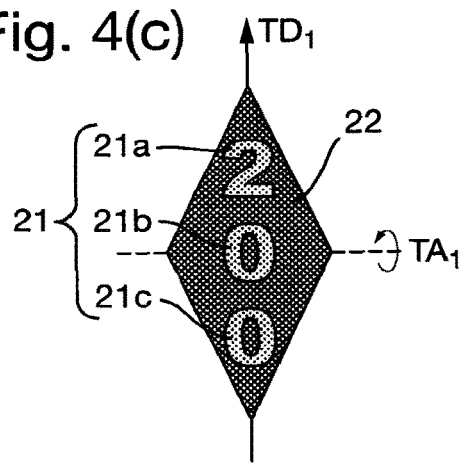
Figure 4D:
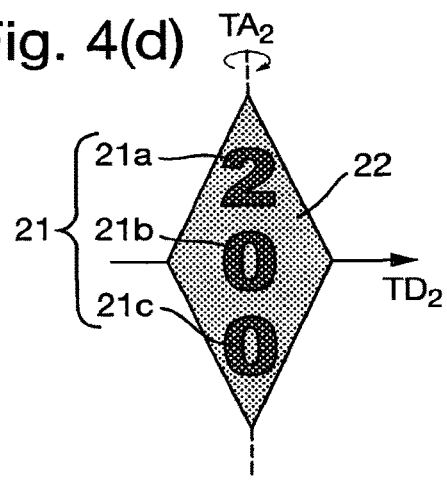
Figure 4E:
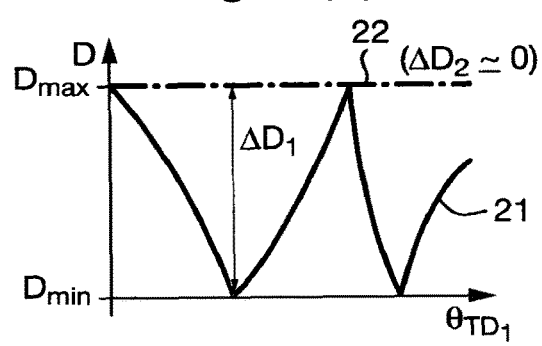
Figure 4F:
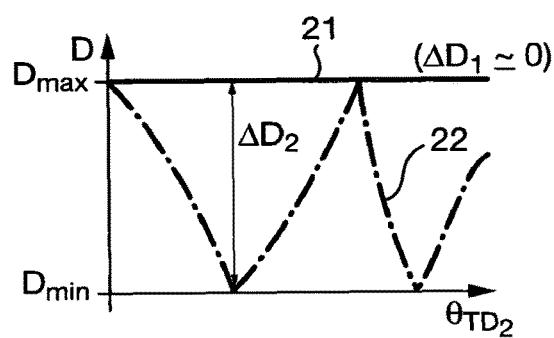
Figure 5A:
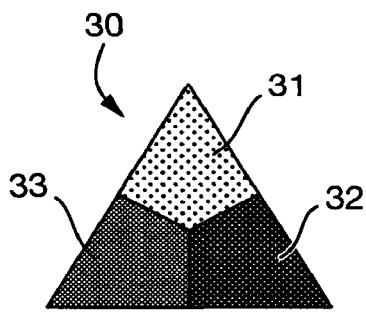
Figure 5B:
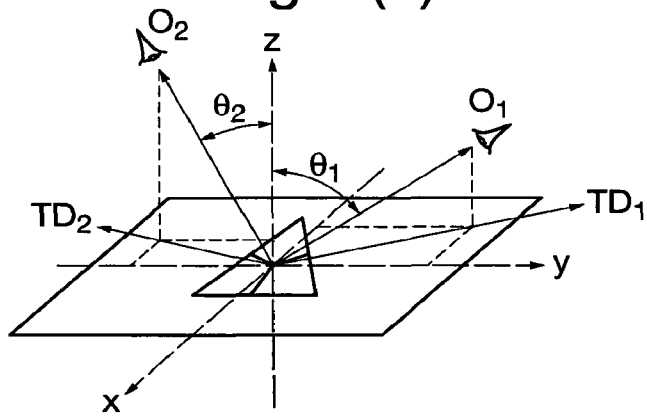
Figure 5C:
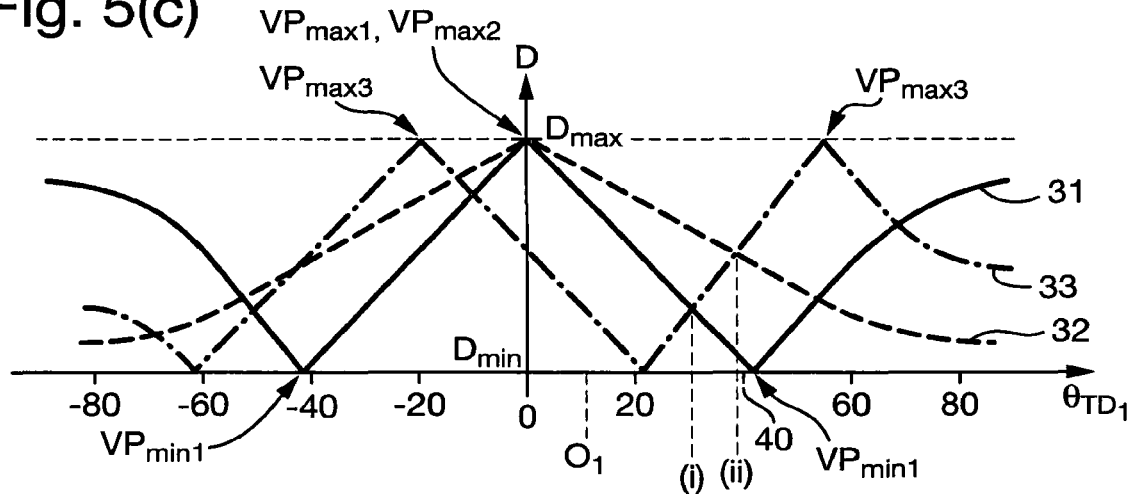
Figure 5D:
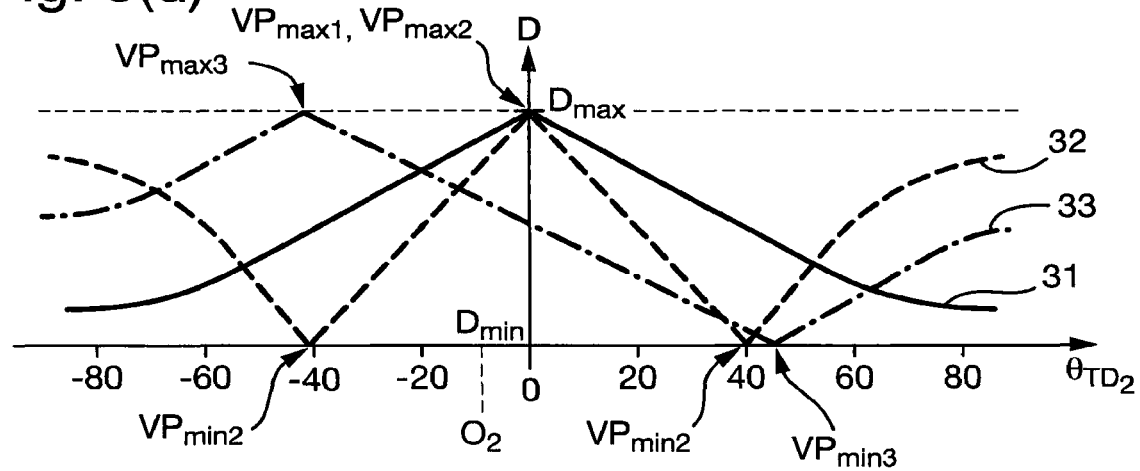
Figure 6A:
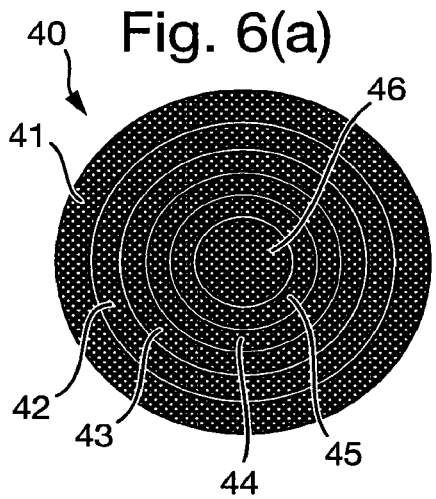
Figure 6B:
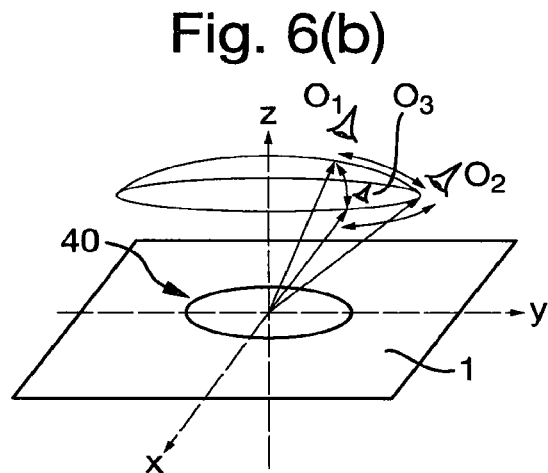
Figure 7A:
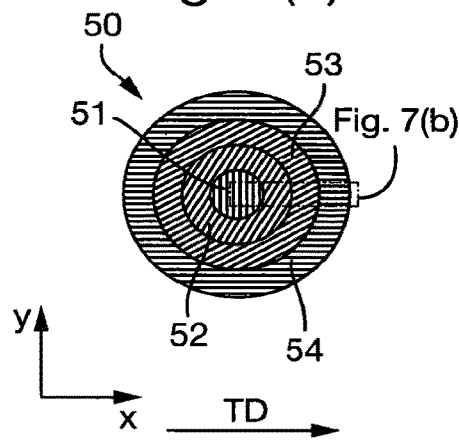
Figure 7B:
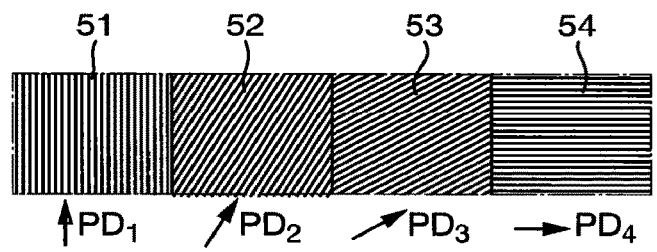
Figure 7C:
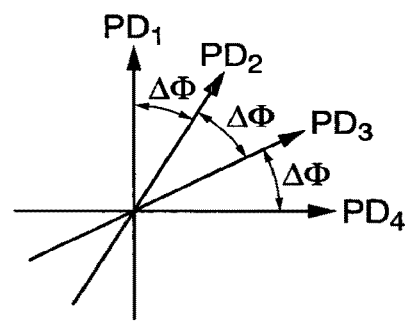
Figure 7D:
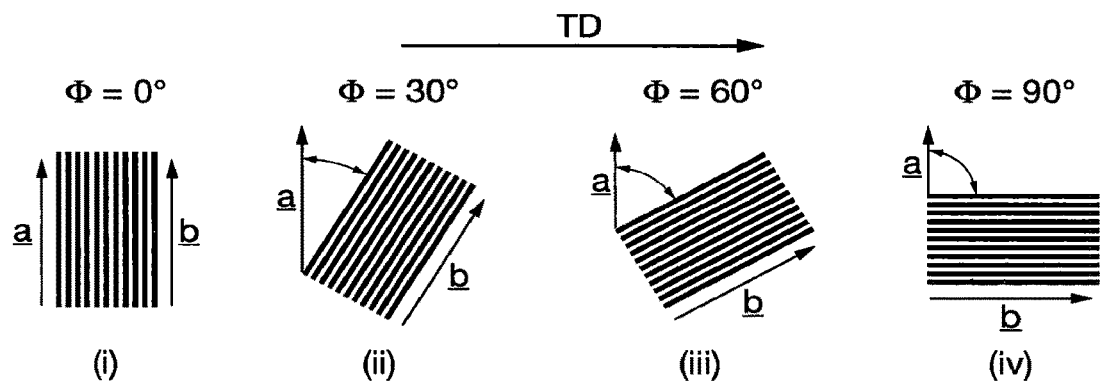
Figure 8A:
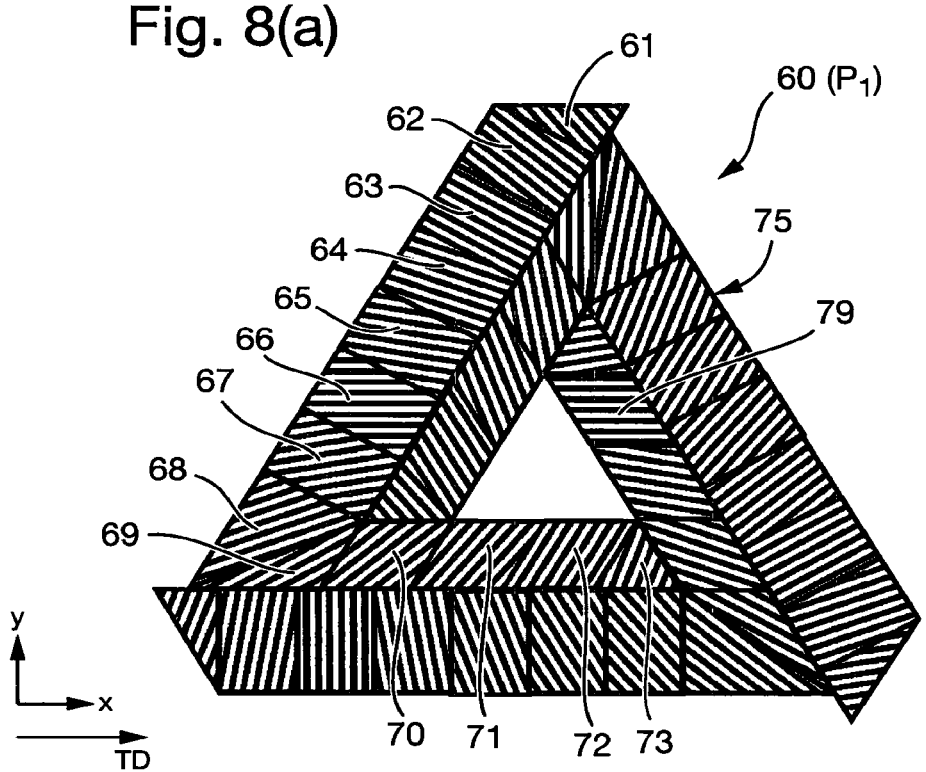
Figure 8B:
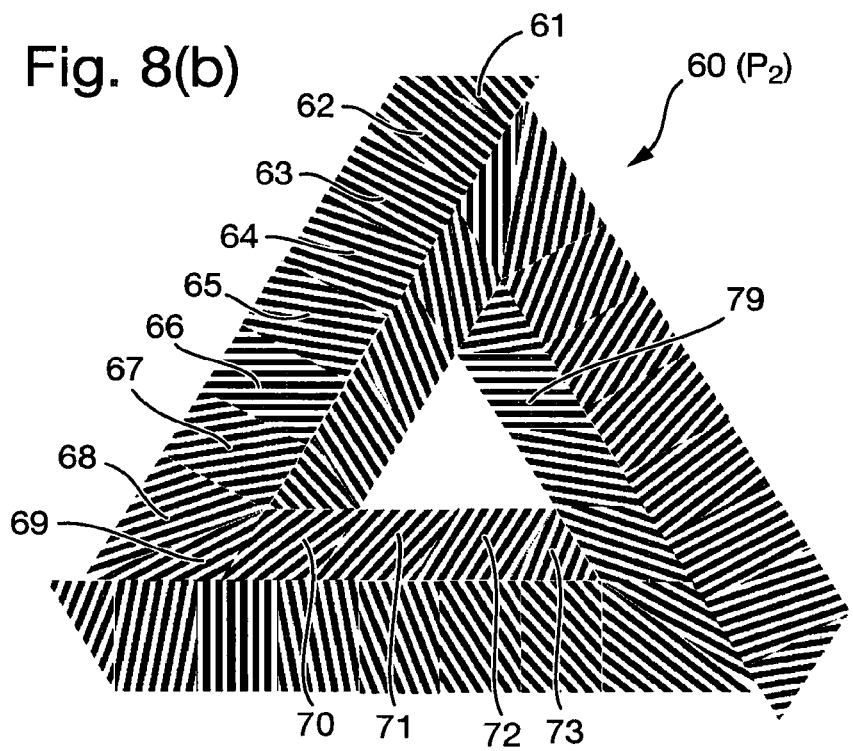
Figure 9A:
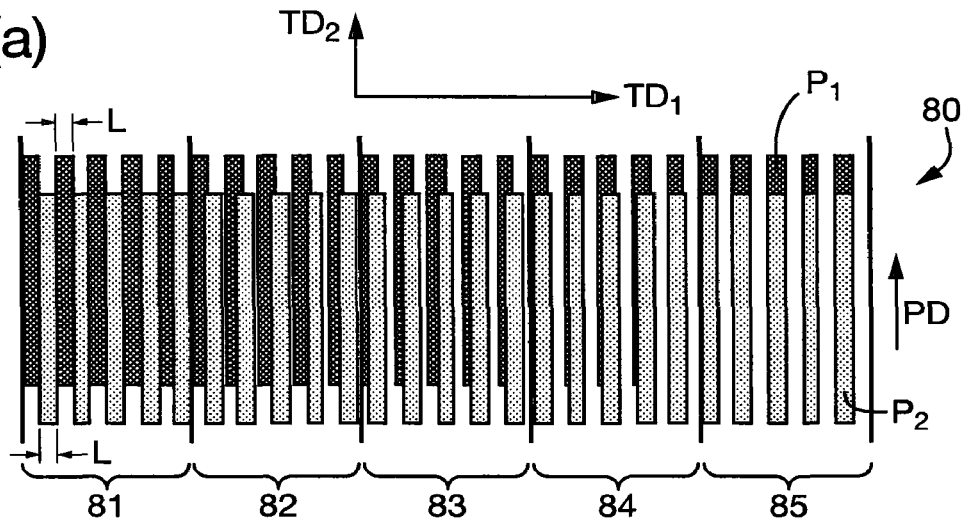
Figure 9B:
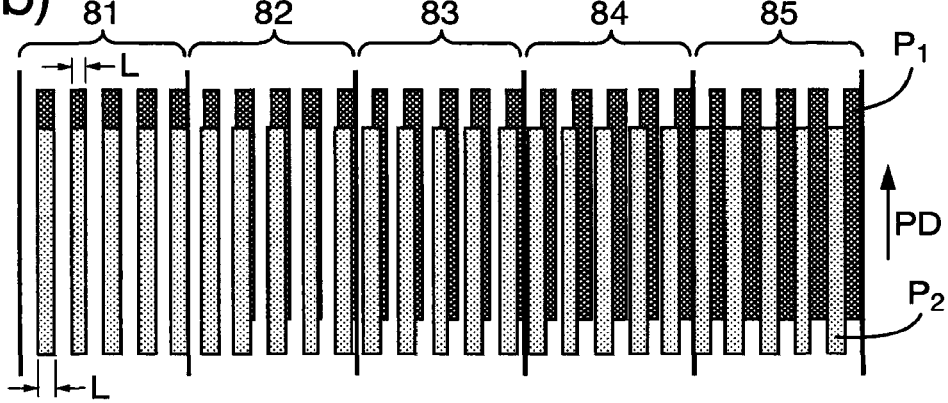
Figure 9C:
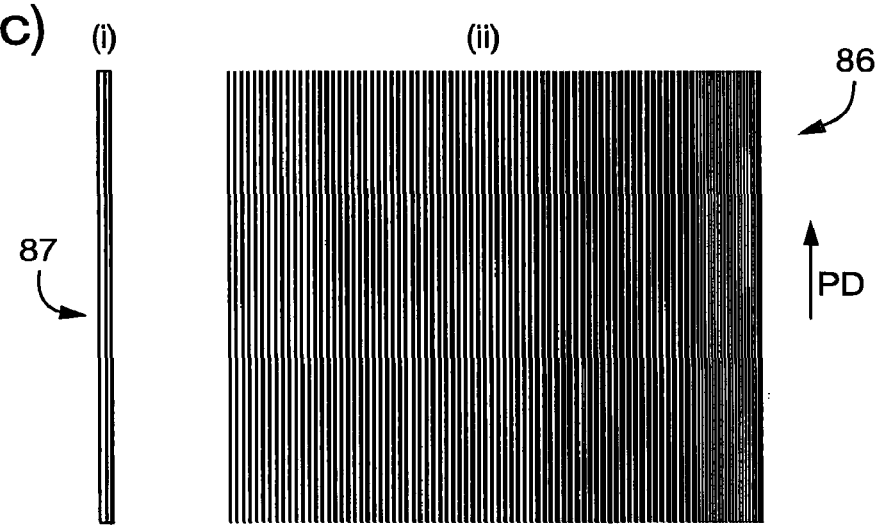
Figure 10:
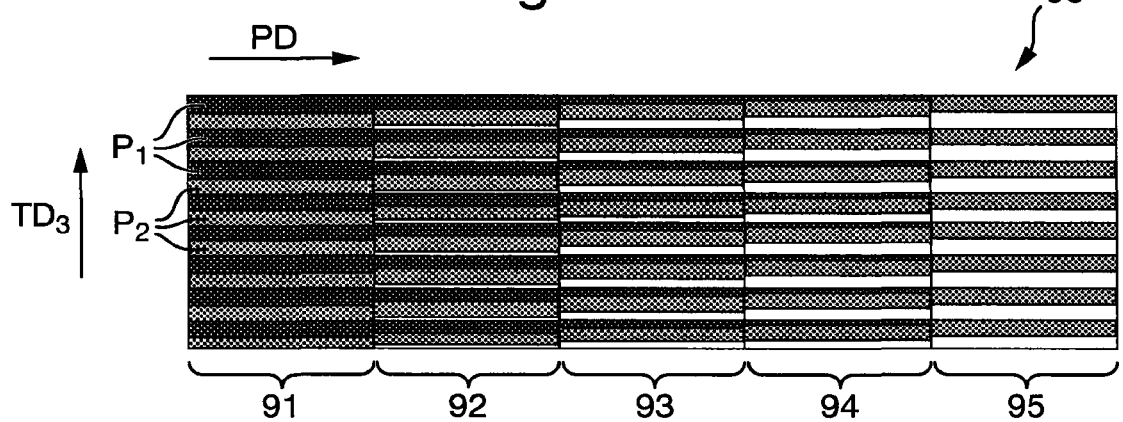
Figure 11:
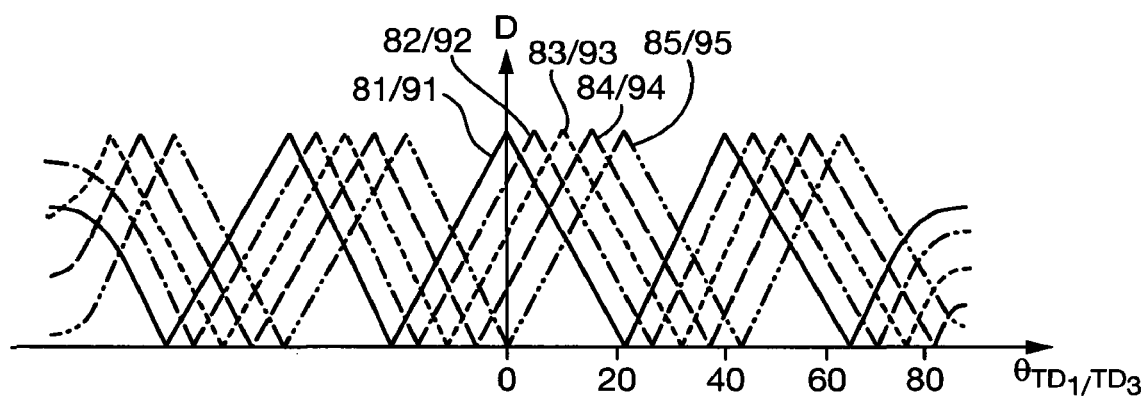
Figure 12A:
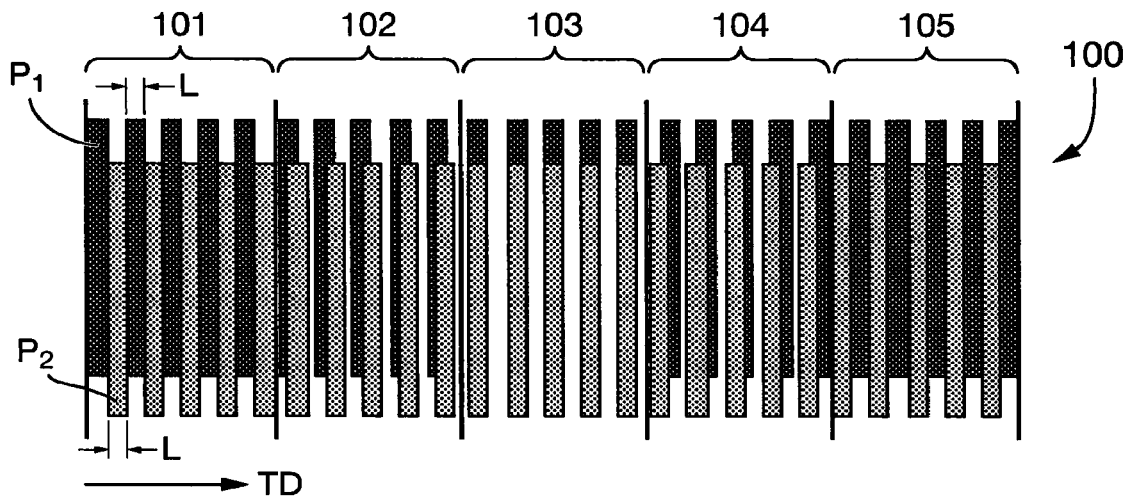
Figure 12B:
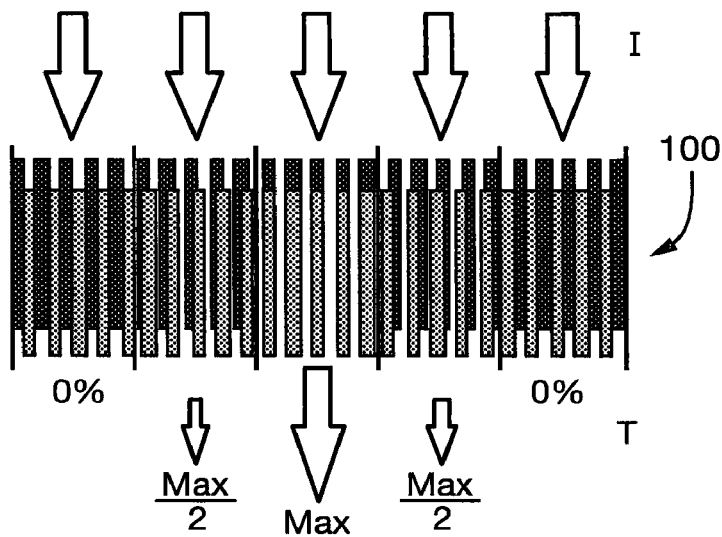
Figure 13:
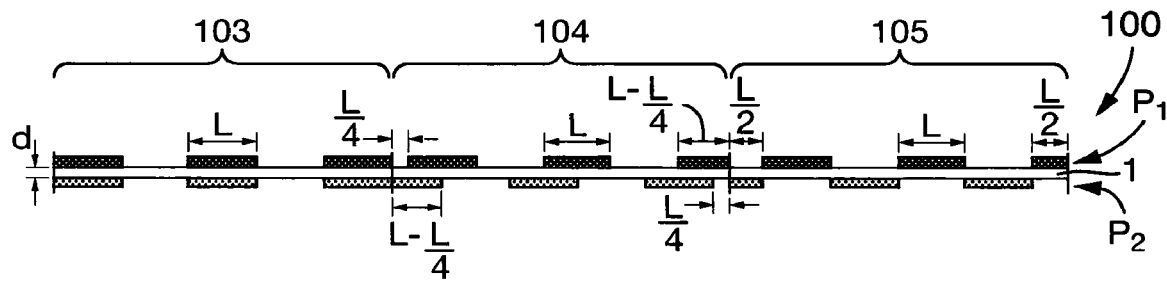
Figure 14A:
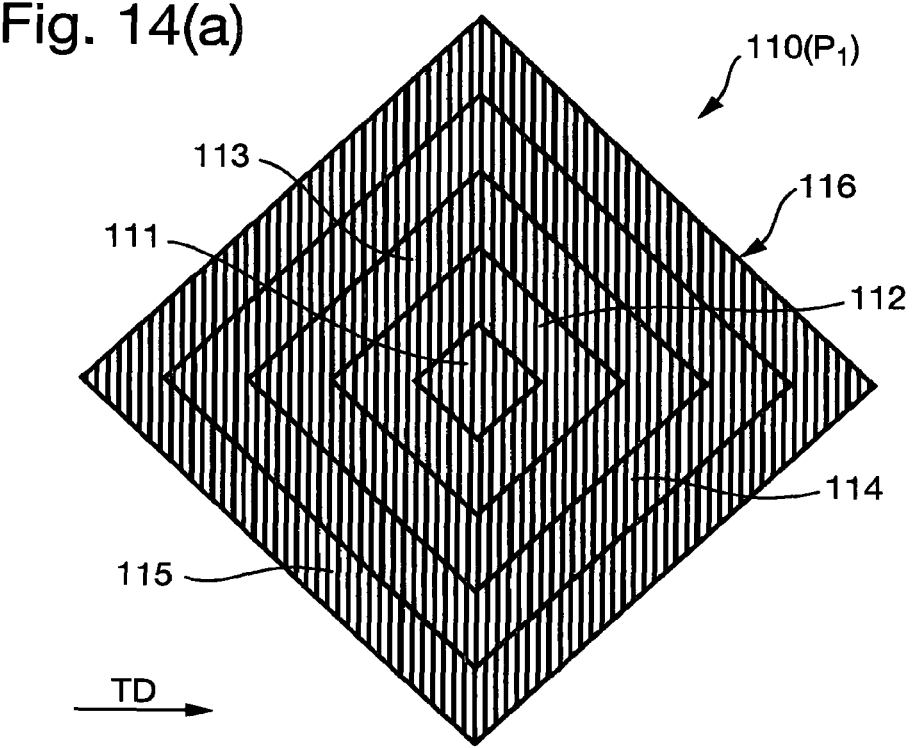
Figure 14B:
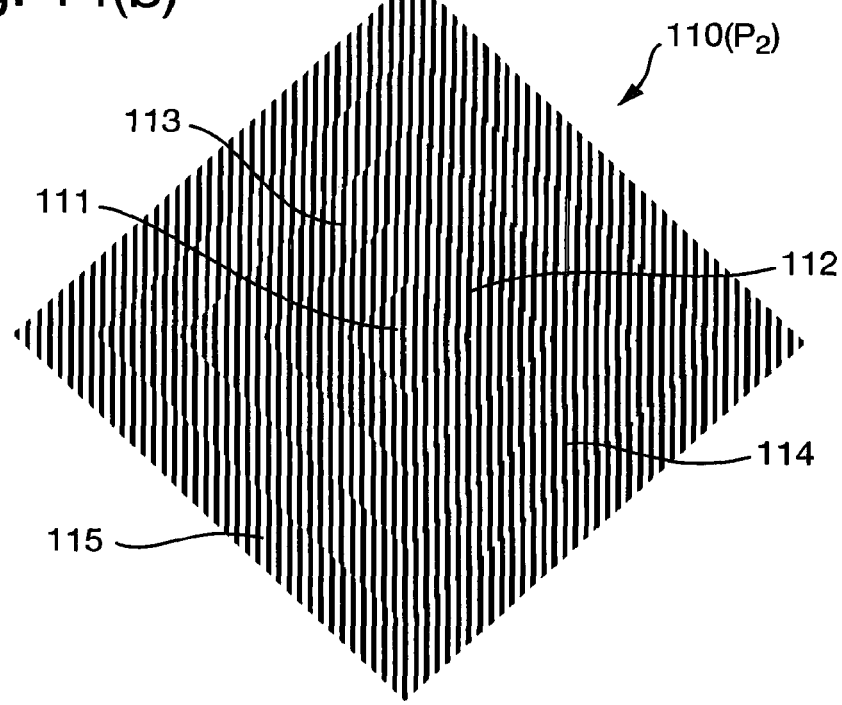
Figure 15A:
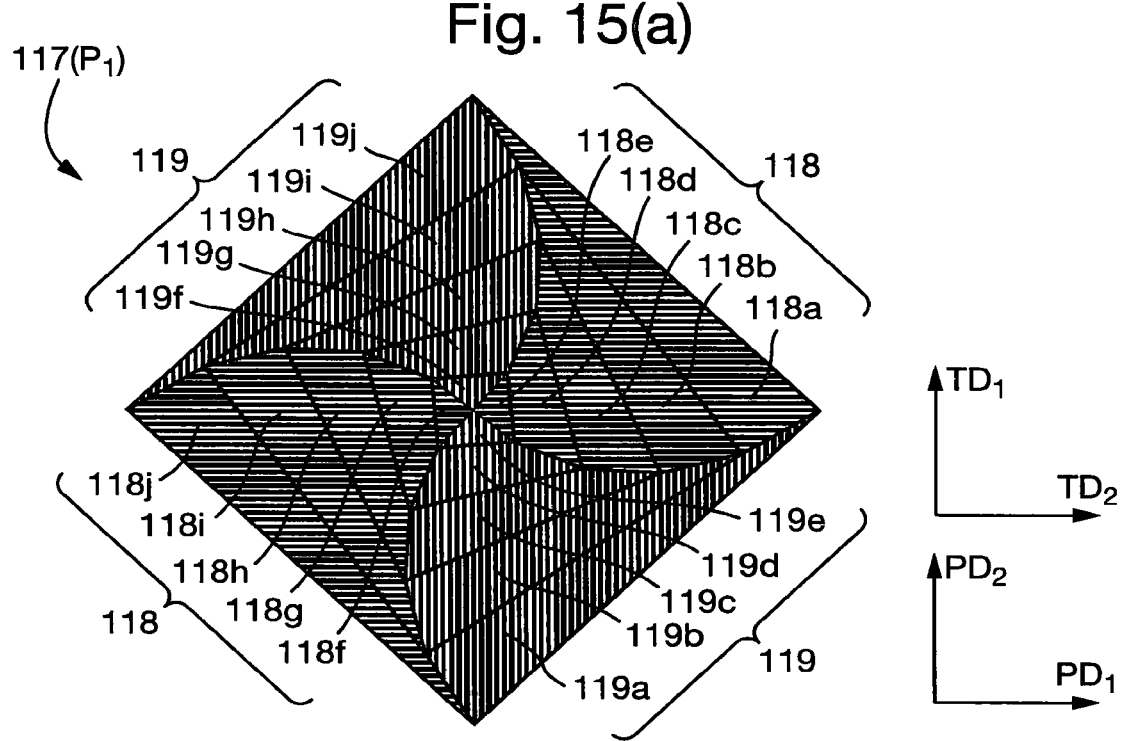
Figure 15B:
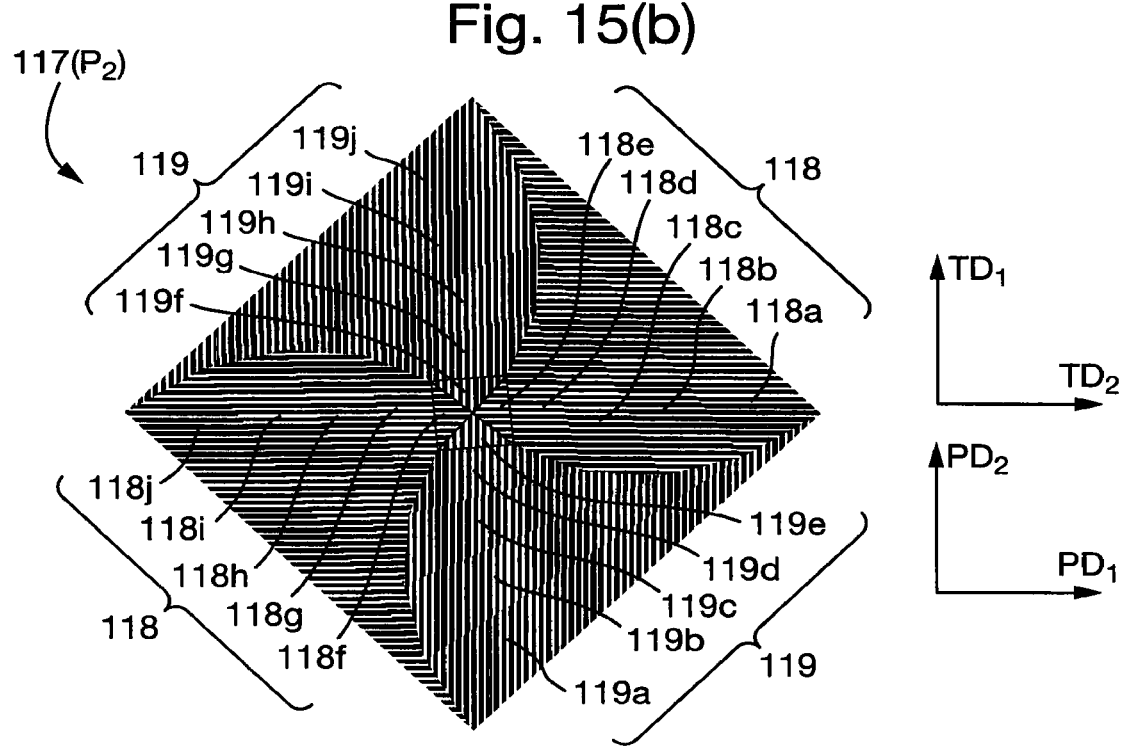
Figure 16A:
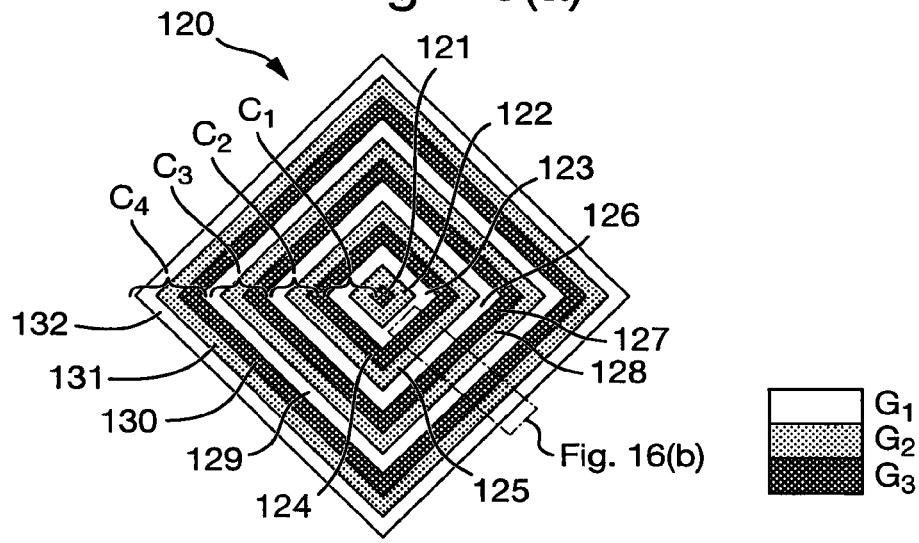
Figure 16B:
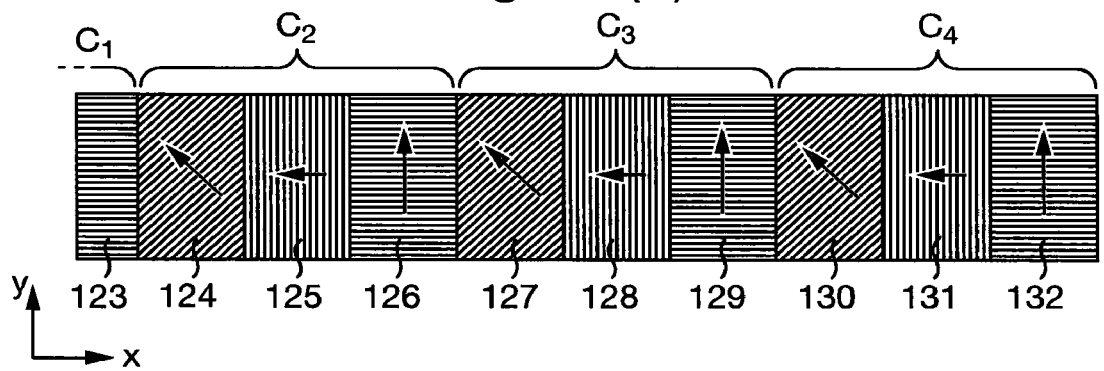
Figure 17:
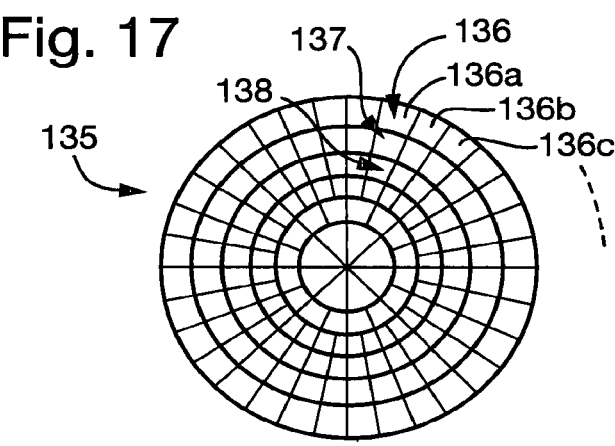
Figure 18:
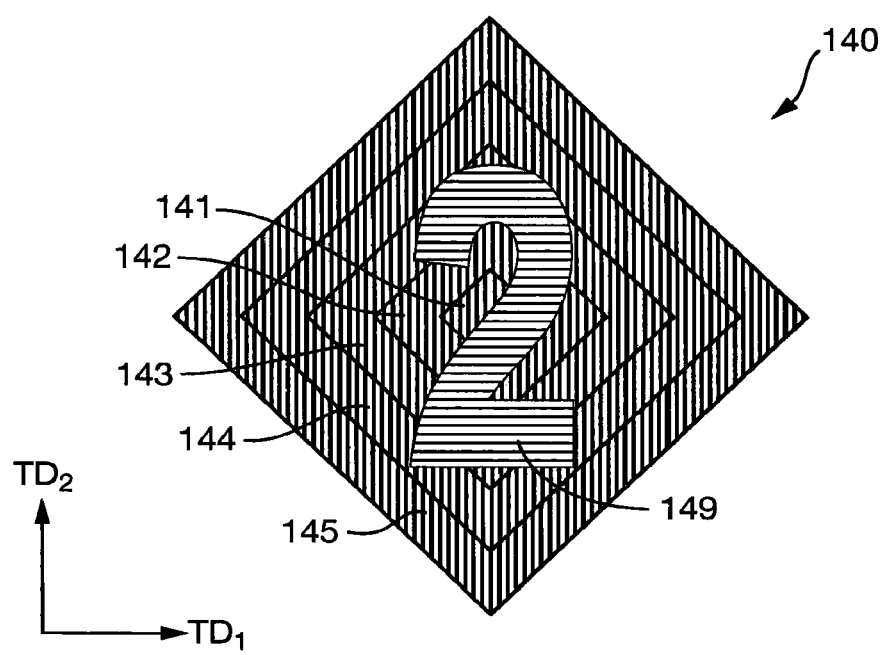
Figure 19:
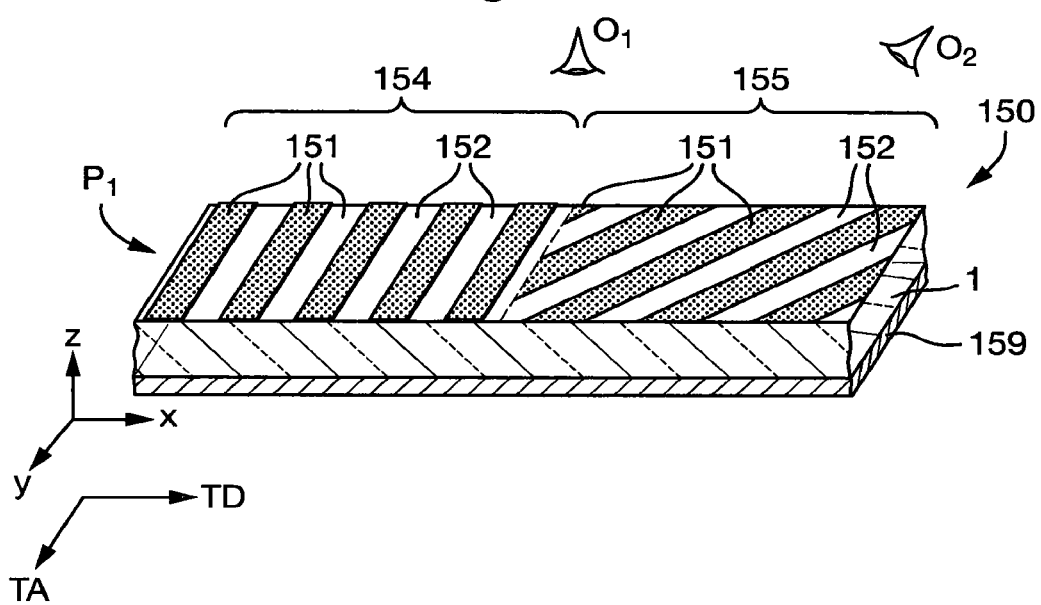
Figure 20:
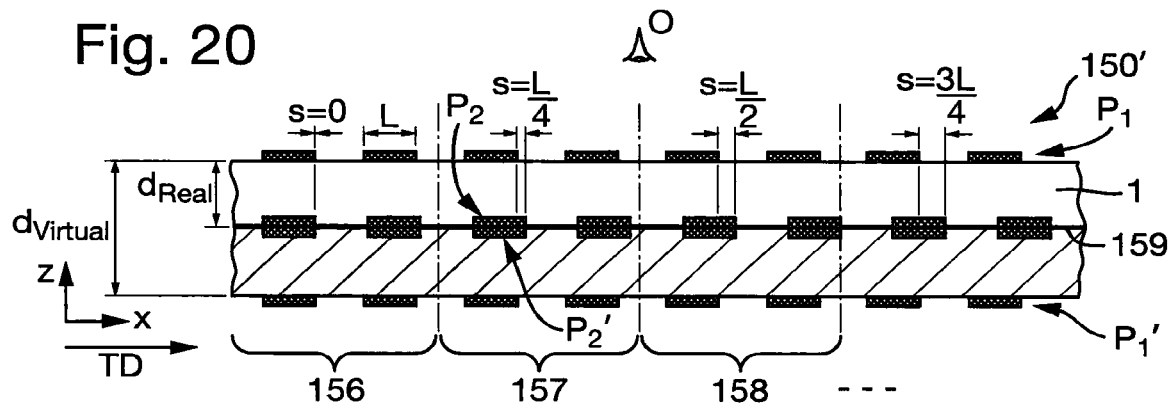
Figure 21A:
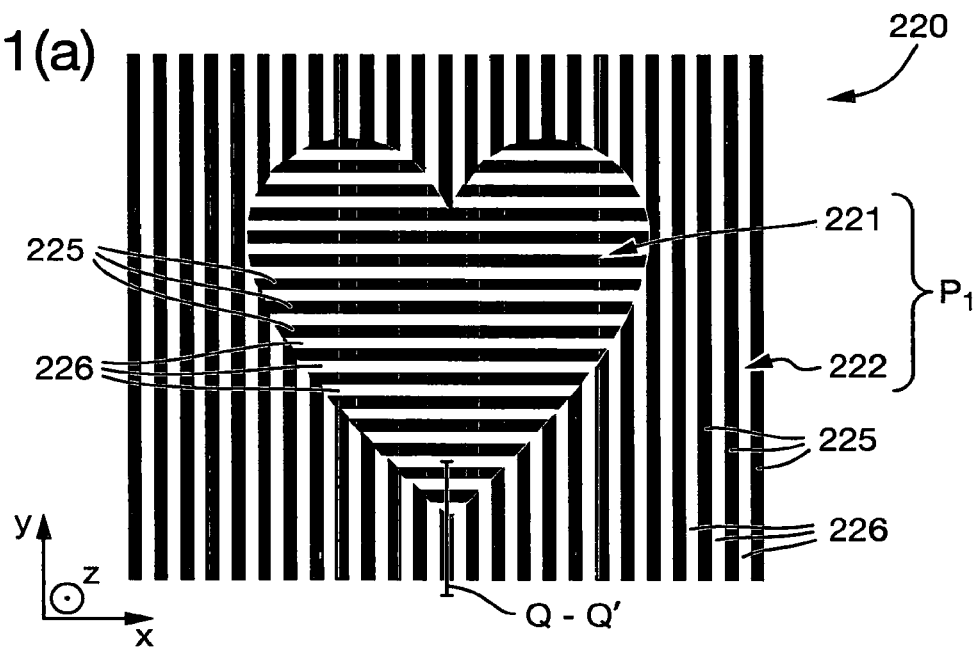
Figure 21B:
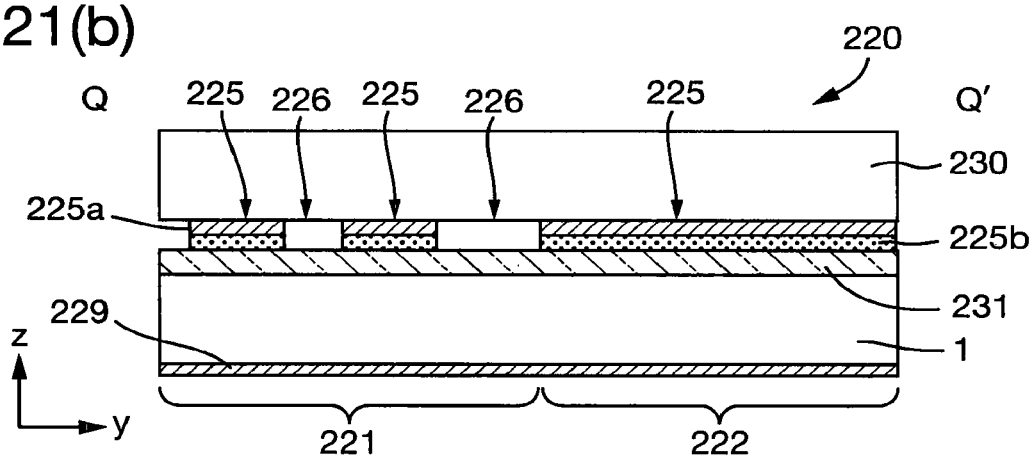
Figure 21C:
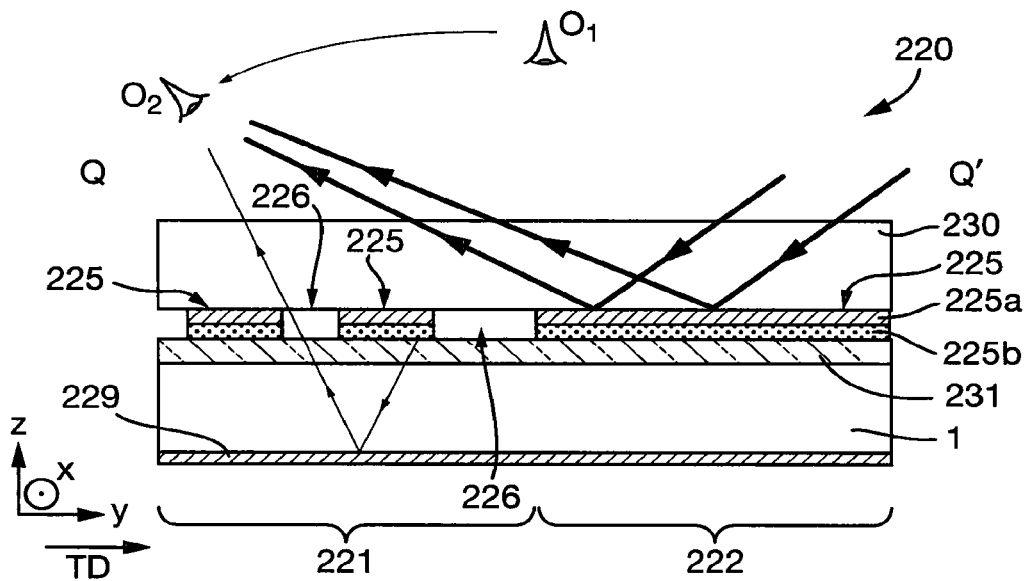
Figure 22:
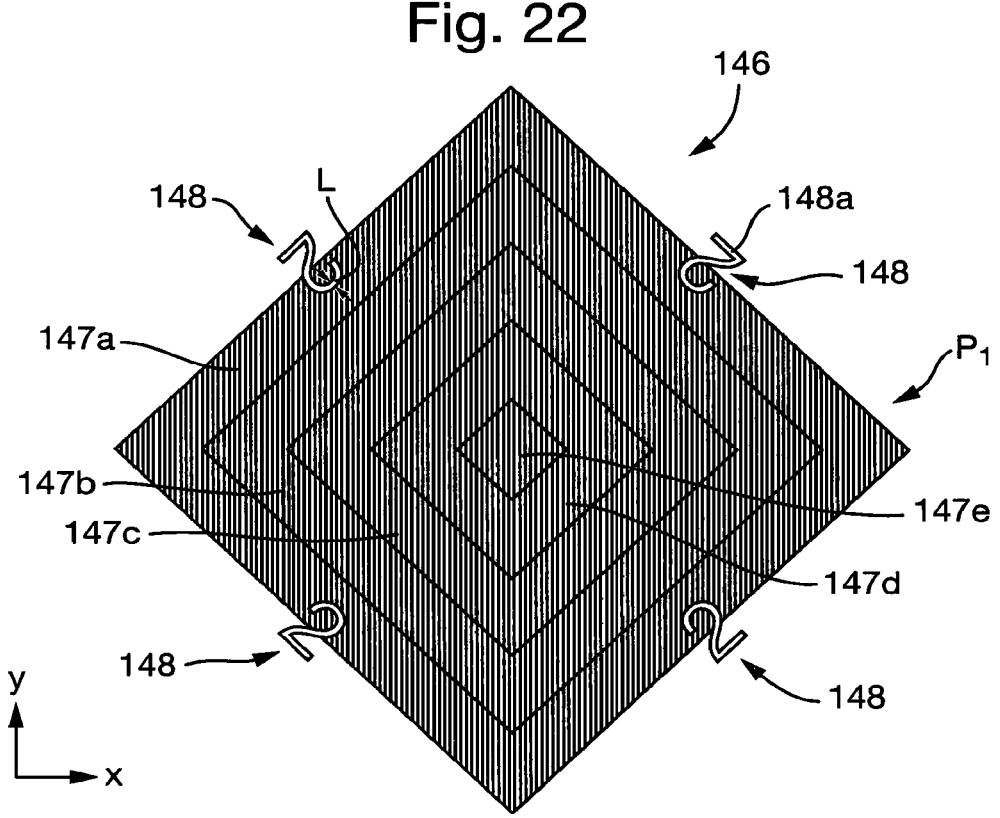
Figure 25A:
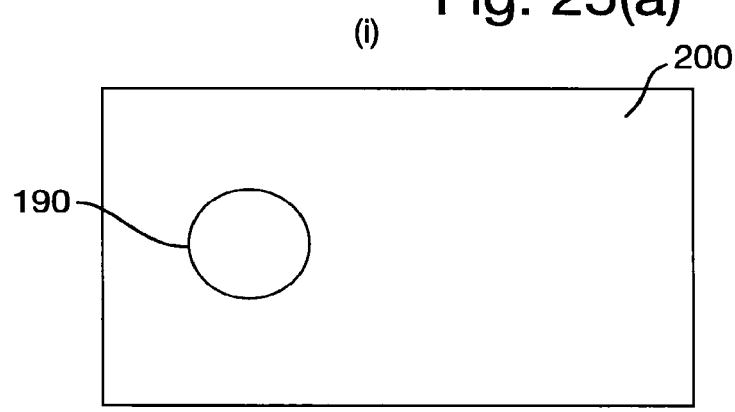
Figure 25A:
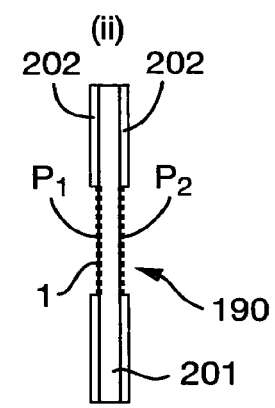
Figure 25B:
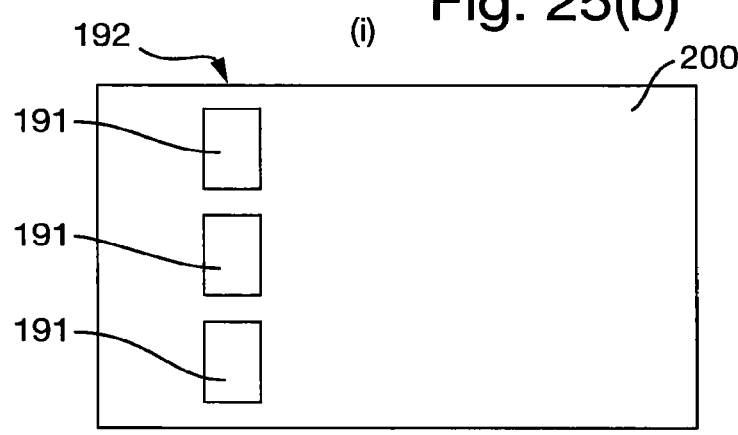
Figure 25B:
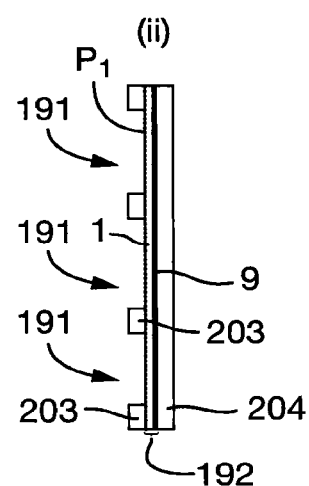
Figure 25C:
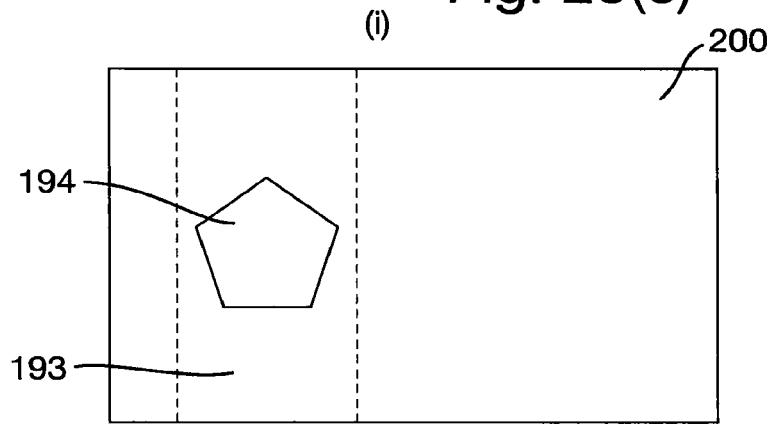
Figure 25C:
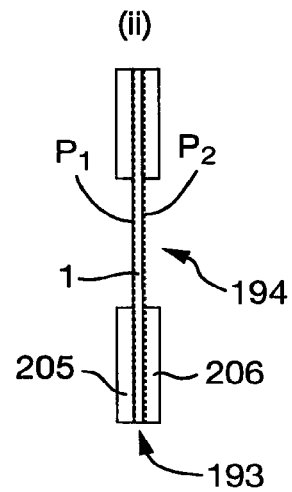
Figure 26A:
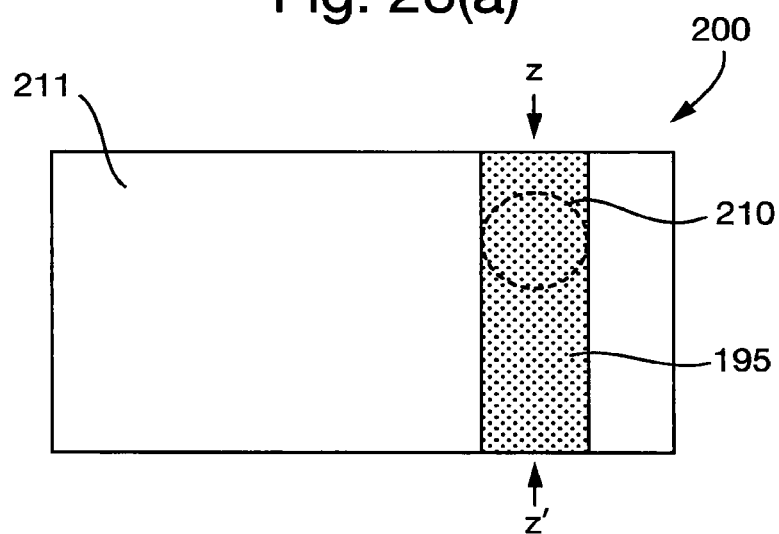
Figure 26B:
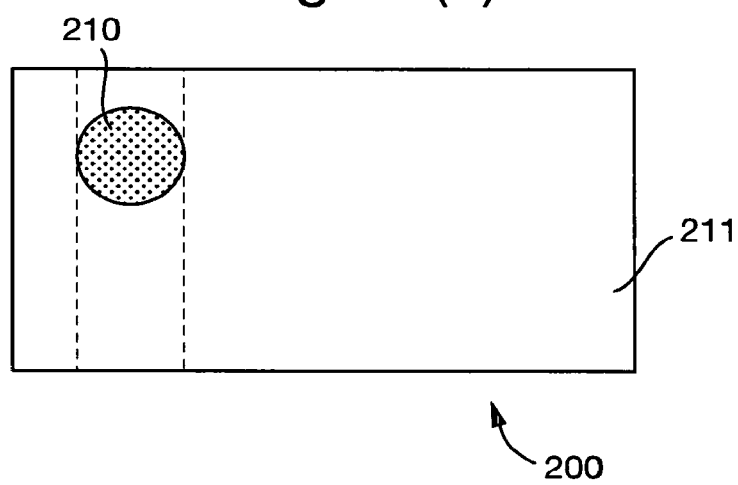
Figure 26C:
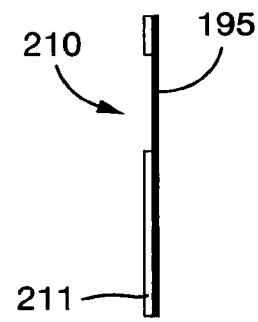

FIG. 3(a) is a cross-section through a portion of a device in accordance with a second embodiment, in FIG. 3(b) illustrations (i) to (v) illustrate the passage of light through the FIG. 3(a) device at five selected viewing angles and FIG. 3(c) being a plot illustrating the exhibited level of obstruction (or darkness, D) of the FIG. 3(a) device at different viewing angles; in FIG. 3(d) illustrations (i) to (v) illustrate the passage of light through the FIG. 3(a) device at five selected viewing angles taking into account the refractive index of the device, FIG. 3(e) showing the corresponding variation in obstruction level with tilt angle; FIG. 3(f) and FIG. 3(g) being plots illustrating obstruction level variation with tilt angle for the FIG. 3(a) device implemented with different pitch:thickness ratios;

FIG. 4(a) depicts a security device in accordance with a third embodiment of the invention, FIG. 4(b) showing an enlarged detail thereof, FIG. 4(c) and FIG. 4(d) illustrating the appearance of the FIG. 4(a) device at different viewing angles, and FIG. 4(e) and FIG. 4(f) being plots showing the change in the level of obstruction (or darkness, D) exhibited by the device as the viewing angle varies along different tilt directions, $TD_1$ and $TD_2$, respectively;

FIG. 5(a) depicts a security device in accordance with a fourth embodiment of the invention, FIG. 5(b) showing in three dimensions the positions of three exemplary observers relative to the device, FIG. 5(c) being a plot depicting the change in level of obstruction (or darkness, D) exhibited by the device at different tilt angles along a first tilt direction $TD_1$, and FIG. 5(d) being a plot illustrating the change in level of obstruction exhibited by the device as the tilt angle varies in a second tilt direction, $TD_2$;

FIG. 6(a) depicts a security device in accordance with a fifth embodiment of the invention, viewed from the normal viewing position, FIG. 6(b) illustrating in three dimensions the positions of three exemplary observers relative to the device, and FIG. 6(c), FIG. 6(d), FIG. 6(e) and FIG. 6(f) illustrating the appearance of the device of FIG. 6(a) at various different viewing positions;

FIG. 7(a) shows a security device in accordance with a sixth embodiment of the invention, FIG. 7(b) showing an enlarged detail thereof, and FIG. 7(c) depicting the intersection of four pattern directions together for ease of reference. In FIG. 7(d), illustrations (i), (ii), (iii) and (iv), illustrate respective regions of the device of FIG. 7(a) and the corresponding component a of the pattern b in the direction perpendicular to the tilt direction TD; FIG. 7(e) is a plot depicting the change in level of obstruction (or darkness, D) of each of the regions of the FIG. 7(a) device with changing tilt angle in the illustrated tilt direction TD where the device is implemented with a first pitch:thickness ratio, and FIG. 7(f) is a corresponding plot where the device is implemented with a second pitch:thickness ratio;

FIG. 8(a) and FIG. 8(b) depict first and second patterns for use in a seventh embodiment of the invention;

FIG. 9(a) depicts an eighth embodiment of the invention, viewed from the normal, FIG. 9(b) showing the FIG. 9(a) device viewed when tilted in the tilt direction $TD_1$, FIG. 9(c) depicting a variant of the eighth embodiment;

FIG. 10 depicts a security device in accordance with a ninth embodiment of the invention, viewed from the normal;

FIG. 11 is a plot depicting the change in level of obstruction (or darkness, D) exhibited by the devices of FIG. 9 and FIG. 10 with changing tilt angle in the direction $TD_1$ (=$TD_3$);

FIG. 12(a) depicts a security device in accordance with a tenth embodiment of the invention, FIG. 12(b) showing the same device and illustrating the obstruction of light transmitted therethrough;

FIG. 13 is a cross-section through a portion of the FIG. 12(a) embodiment;

FIG. 14(a) and FIG. 14(b) depict first and second patterns respectively for use in a security device according to an eleventh embodiment of the invention;

FIG. 15(a) and FIG. 15(b) depict first and second patterns respectively for use in a security device according to an twelfth embodiment of the invention;

FIG. 16(a) depicts a security device in accordance with a thirteenth embodiment of the invention, FIG. 16(b) showing an enlarged detail thereof;

FIG. 17 schematically depicts a security device in accordance with a fourteenth embodiment of the invention;

FIG. 18 shows a security device in accordance with a fifteenth embodiment of the invention;

FIG. 19 and FIG. 20 depict security devices in accordance with sixteenth and seventeenth embodiments of the invention, respectively;

FIG. 21(a), FIG. 21(b) and FIG. 21(c) illustrate a security device in accordance with an eighteenth embodiment of the invention, in FIG. 21(a) plan view, FIG. 21(b) cross-section, and FIG. 21(c) cross-section with schematic light ray paths;

FIG. 22 shows a security device in accordance with a nineteenth embodiment of the invention;

FIG. 23(a), FIG. 23(b), FIG. 23(c), FIG. 23(d), FIG. 23(e), FIG. 23(f) and FIG. 24(g) are diagrams illustrating alternative exemplary patterns for use in any of the embodiments, viewed from the normal and at certain angles;

FIG. 24(a), FIG. 24(b), FIG. 24(c), FIG. 24(d), FIG. 24(e), FIG. 24(f), FIG. 24(g), FIG. 24(h), FIG. 24(i), FIG. 24(j), and FIG. 24(k) illustrate further alternative patterns for use in any of the embodiments, viewed from the normal and at certain angles;

FIG. 25(a), FIG. 25(b) and FIG. 25(c) are examples of security documents provided with security devices in accordance with any of the embodiments, where FIG. 25(a) includes an illustration (i) in plan view and an illustration (ii) in cross-section, FIG. 25(b) includes an illustration (i) in plan view and an illustration (ii) in cross-section, FIG. 25(c) includes an illustration (i) in plan view and an illustration (ii) in cross-section; and FIG. 26 depicts a further example of a security document provided with a security device in accordance with any of the embodiments, shown in FIG. 26(a) front view, FIG. 26(b) back view and FIG. 26(c) cross-section.

Figure 1:
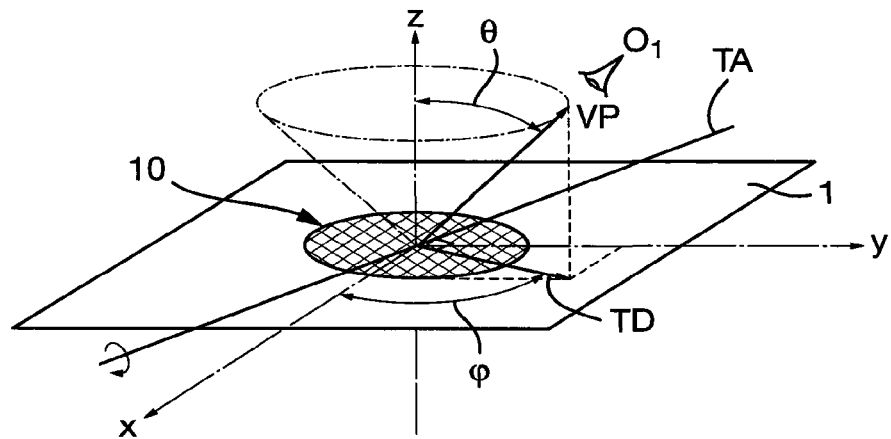
FIG. 1 is a schematic diagram defining a frame of reference and certain directions and angles with respect to a layer 1 carrying an exemplary security device 10.

For ease of reference, the description below will refer to certain directions utilizing the notation depicted in FIG. 1. FIG. 1 shows an exemplary security device 10 disposed on a layer 1 which sits in an approximately planar surface defined by X and Y orthogonal axes. The third orthogonal Z axis is normal to the plane of the device, and as such an observer viewing the device 10 from any position along the Z axis has a normal viewing position. An observer $O_1$ at an arbitrary viewing position (VP) away from the normal is shown in FIG. 1. The viewing position VP is defined by the tilt angle $\Theta$ between the viewing position VP and the normal (Z axis) in combination with either the tilt direction (TD) or the tilt axis (TA). The tilt direction TD is the intersection of the plane through which the tilting occurs with the plane of the device, whilst the tilt axis TA is the axis about which tilting occurs. By definition, for any one viewing position, the tilt direction TD will be perpendicular to the tilt axis TA, both lying in the plane of the device. The tilt direction TD and tilt axis TA can be defined in terms of their Cartesian coordinates in the X, Y plane, but for convenience may be referred to in terms of the cylindrical angle $\varphi$ between the respective direction and the X axis, as shown in FIG. 1. Rotating the device about the Z axis will change the value of $\varphi$ such that observer $O_1$ depicted in FIG. 1 will see the device from a series of viewing positions on the surface of the chain-dashed cone shown in the Figure.

"Tilting" means that there is a change in the tilt angle, $\theta$, whilst "rotating" means that there is a change in angle $\varphi$. A change in viewing position may involve either tilting or rotation or both.

Figure 2A:
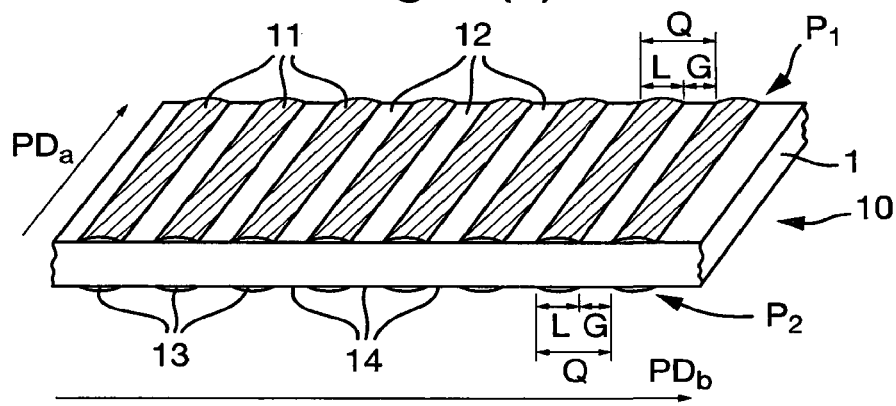
FIG. 2(a) illustrates a portion of a security device in accordance with a first embodiment of the invention, FIG. 2(b) and FIG. 2(c) illustrating alternative patterns for use in the device.

FIG. 2 shows a portion of a device in accordance with a first embodiment of the invention. The device 10 comprises a transparent layer 1, which may optionally comprise a multilayered structure, formed for example of one or more substantially optically transparent polymers such as polypropylene, polyethylene teraphthalate (PET), polyethylene, polyamide, polycarbonate, polymethylmethacrylate (PMMA), or polyethylene naphthalate (PEN), provided with first and second patterns $P_1$ and $P_2$ on opposite sides of the layer 1. In this example the patterns $P_1$ and $P_2$ are depicted as being formed on the surfaces of the layer 1 but in practice could be carried on separate sheets either side of the transparent layer. In such cases, the transparent layer 1 may be formed as an air gap, with no material present. The patterns $P_1$ and $P_2$ may be formed using any available processes, including printing, preferably lithographic, gravure, or offset printing, metallization or laser marking for example, and may each be single-layered or multi-layered. Alternatively, one or both patterns could be formed by exposure through a mask, e.g. of photosensitive material. Each pattern $P_1$ and $P_2$ is formed of pattern elements 11, 13 which may be spaced by gaps 12, 14 as shown in FIG. 2(a) or by secondary pattern elements having a different appearance from the primary pattern elements 11, 13 (e.g. a different color). The pattern elements 11 may be semi-transparent (e.g. having a colored tint) but in most preferred examples are of high optical density (i.e. higher than that of the transparent layer 1) and are preferably substantially opaque. For instance, they may be printed in a dark color of ink, such as black or dark green. As described further below, if the pattern elements are multi-layered, those layers may have different appearances (e.g. colours). These options for forming the pattern elements apply to all embodiments disclosed herein.

The first and second patterns $P_1$ and $P_2$ at least partially overlap one another, although it should be noted that this refers to each pattern as a whole and not necessarily to the individual elements thereof. In particular, although in the FIG. 2 example it will be seen that the elements 11 of pattern $P_1$ align with and precisely overlap each respective pattern element 13 of pattern $P_2$, this will not be the case in all examples.

In the present embodiment, the first and second patterns $P_1$ and $P_2$ are patterns of line elements 11, 13 of constant pitch (repeat length) Q and line width L, which here is substantially equal to the spacing or gap G between each line. It should be noted that it is not essential for the pitch Q or line width L to be constant across the whole device, but in any one locality, that of pattern $P_1$ should be approximately equal to that of pattern $P_2$. The greater the line width L as a proportion of the pitch Q, the darker the device will appear. This may be varied across the device to impart a pattern or graphic on top of the effects to be described below, if desired.

In the case of a line pattern, a pattern direction $PD_a$ lying parallel to the elongate axis of the line elements 11, 13 can be ascribed to the pattern. However, it is not essential that the pattern direction be aligned with elongate pattern elements: rather, the direction of the pattern can be defined by any one or more features within the pattern which allow a direction to be defined relative to them. For example, in the case of the line pattern of FIG. 2(a), the direction of the pattern could equally well be described by pattern direction $PD_b$, which is perpendicular to the elongate direction of the line elements.

Figure 2B:
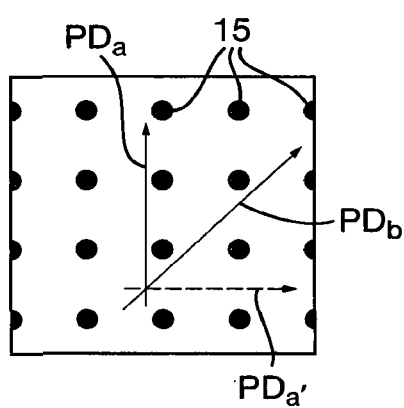

It should be noted that the same applies to any anisotropic pattern and there is no requirement for the pattern to comprise elongate pattern elements. For example, FIG. 2(b) shows an alternative pattern of dot elements 15 arranged on a square grid. Here, exemplary pattern directions $PD_a$ and $PD_b$ can be defined between selected dot elements as shown. It is not of consequence that, if rotated by 90 degrees, the defined pattern directions $PD_a$ and $PD_b$ could be mistaken for directions between other dot elements on the same grid (e.g. direction $PD_a'$ shown in dashed lines), since due to the rotational symmetry of the pattern, the effects exhibited by the device will be identical.

Figure 2C:
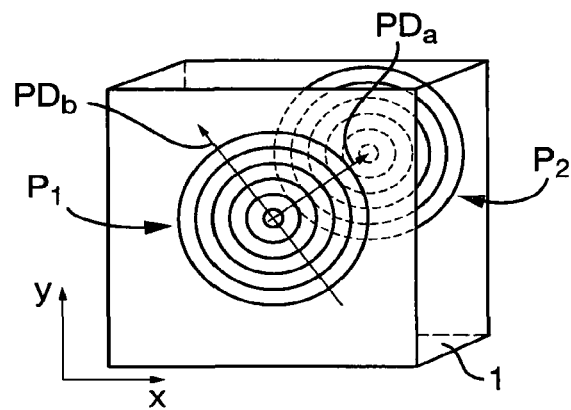

It is also possible to define a pattern direction PD in cases where the first and second patterns $P_1$ and $P_2$ each individually are substantially anisotropic in the X-Y plane if the first and second patterns $P_1$ and $P_2$ are laterally offset from one another. For example, as shown in FIG. 2(c), if the patterns $P_1$ and $P_2$ were to consist of sets of concentric circles, it may not be possible to identify a pattern direction PD in either pattern alone, since one orientation in the X-Y plane cannot be distinguished from another. However, here the second pattern $P_2$ is offset laterally from the first $P_1$ in the direction indicated by line $PD_a$, thereby defining a pattern direction. Of course, any other direction defined relative to this offset, such as $PD_b$, could be used instead.

As illustrated by these examples, the pattern elements could take a wide range of forms including line elements and dot elements. In further examples, dot elements could be arranged along lines to give the impression of line elements. Dot elements need not be circular but could take any shape, including indicia such as letters, numbers or other symbols. Line and/or dot elements could also have negative indicia defined as gaps within them, or could be made up of a plurality of positive indicia (joined up or not), acting for example as microtext in both implementations. These options apply to all of the embodiments disclosed herein.

FIG. 3(a) shows a cross section through a second embodiment of a device in accordance with the present invention, of much the same construction as that described above in relation to FIG. 2(a), although in this example the pattern elements 11 of the first pattern $P_1$ precisely do not align with the pattern elements 13 of the second pattern $P_2$: i.e. the first and second patterns $P_1$ and $P_2$ are complementary to one another. As before, the pitch of the two patterns $Q_1$ and $Q_2$ is substantially identical, as are the line widths $L_1$ and $L_2$, and the spacing $G_1$ and $G_2$. When the device is viewed in transmitted light from a normal viewing position (observer $O_1$), at every position along the device either the pattern elements 11 of first pattern $P_1$ or those 13 of the second pattern $P_2$ will obstruct the passage of light through the device to the observer $O_1$ such that the device exhibits its maximum level of obstruction. That is, for example, where the pattern elements 11, 13 are substantially opaque, the device as a whole will appear dark. If the pattern elements 11, 13 are semi-transparent and coloured this may instead appear as the device exhibiting a particular colour. This will be discussed further below but, for ease of reference, the description will focus primarily on patterns of substantially opaque elements such that the level of obstruction corresponds to a level of darkness. It should be appreciated that wherever the "darkness level" is referred to below, this could instead be a particular colour or change in colour level.

As the viewing position is changed to increase the viewing angle (i.e. the device is tilted relative to the observer) the level of obstruction exhibited by the device will change. For example, as the viewing position changes from observer $O_1$ to observer $O_2$ (equivalent to tilting the device about tilt access $TA_1$, which is parallel to the elongate direction of the line elements 11, 13), the apparent darkness of the device will decrease. This is best shown with respect to FIG. 3(b). As shown in FIG. 3(b) (i) to (v), due to the transparent layer 1 having a non-zero thickness d, as the tilt angle $\Theta$ increases from zero to $\Theta_2$, $\Theta_3$, $\Theta_4$, the volume of the device through which light can be transmitted increases until the level of obstruction (or darkness, D) reaches a minimum and the transmission is a maximum (at $\Theta_4$, FIG. 3(b) (iii)). It will be understood that, at this point, the level of obstruction will not be zero since a significant proportion of light will still be obstructed by the pattern elements. In this example, upon reaching the minimum obstruction position, continued tilting will lead to a reduction in the volume through which light can be transmitted as different pairs of pattern elements from the first and second patterns $P_1$ and $P_2$ respectively begin to approach one another (as it appears to the observer). At a sufficiently high tilt angle $\Theta_5$, the passage of light will be blocked once more and the device will exhibit its maximum darkness level.

The observed variation in obstruction level with tilting depends on the particular construction of the device. As a first example, FIG. 3(c) is a plot showing the change in obstruction level (darkness) with tilt angle for an exemplary device where the pitch to thickness ratio (Q:d) is approximately 1:2, and it will be seen that the apparent level of obstruction exhibited by the device varies with tilt angle through a series of obstruction maxima/transmission minima (e.g. at $\Theta_1=0$, $\Theta_m$ and $-\Theta_m$) and intervening obstruction minima/transmission maxima (e.g. at $\Theta_4$ and $-\Theta_4$). The peaks (e.g. at $\Theta_1=0$, $\Theta_m$ and $-\Theta_m$) represent a set of maxima viewing positions for the device, from which positions the maximum obstruction level will be exhibited, and likewise the troughs (e.g. at $\Theta_4$ and $-\Theta_4$) represent a set of minima viewing positions. Together, the maxima and minima viewing positions constitute a set of peak viewing positions. As shown in FIG. 3(c), the variation of transmission/obstruction level is not sinusoidal but tends towards a roughly triangular wave shape with an angular period $\Delta\Theta_1, \Delta\Theta_2, \Delta\Theta_3, \ldots \Delta\Theta_n$ between adjacent peaks which decreases as the tilt angle increases.

However, the exemplary device on which FIG. 3(c) is based assumes that the material from which the transparent layer 1 is formed has a refractive index which is equal to that of its surroundings and hence does not take into account any refraction effects. Such implementations are conceivable but more typically the transparent layer 1 will have a different refractive index (commonly around 1.5) compared with its surroundings. This has a significant impact on the observed variation in obstruction level with tilt angle since, as shown in FIG. 3(d), the effective angle $\Theta'$ at which light rays will travel between the patterns $P_1$, $P_2$ through the transparent layer 1 will be smaller (i.e. closer to the normal) than the actual viewing angle $\Theta$, due to Snell's law. As illustrated in FIGS. 3(d) (ii), (iii) and (iv), for each viewing angle $\Theta_2$, $\Theta_3$, $\Theta_4$, the effective angle of light passing through the device will be reduced to $\Theta_2'$, $\Theta_3'$, and $\Theta_4'$. As the tilt angle $\Theta$ increases, a critical angle is reached which the effective angle $\Theta'$ will not surpass. For materials with refractive index around 1.5, the maximum effective angle $\Theta_C$ is approximately 42 degrees: thus even at very high actual tilt angles approaching 90 degrees, the effective angle of light passing through the layer 1 will never exceed this critical angle.

This has the effect of slowing down the variation of obstruction level with tilt angle, since for any actual change in tilt angle $\Theta$, the corresponding change in effective tilt angle $\Theta'$ is smaller. This effect accelerates at high tilt angles as the critical angle $\Theta_C$ is reached, curtailing the observed variation. For comparison with FIG. 3(c), FIG. 3(e) is a plot of observed obstruction level (darkness, D) against (actual) tilt angle $\Theta$ in the direction $TD_1$ for a device of Q:d ratio 1:2, having a refractive index of 1.5. It will be seen that the first minima is now not reached until a tilt angle of just over 20 degrees (as compared with around 15 degrees in FIG. 3(c)), and only 1.5 dark/light cycles are completed before the variation is curtailed at around 80 degrees as the critical angle is approached.

The shape of the plot also depends heavily on the pitch-to-thickness ratio, Q:d or "R", of the device, (R=Q/d, where $Q=Q_1$ or $Q_2$, since these will be approximately equal). The smaller the value of R, the smaller the (actual or effective) tilt angle $\Theta$ required in order to exhibit a certain change in the level of obstruction, and hence the smaller the angular periods $\Delta\Theta_n$. In other words, the rate of change of obstruction level with tilt angle is greater for lower vales of R. As mentioned above, the devices on which FIGS. 3(c) and (e) are based have a pitch-to-thickness ratio (R) of 1:2 (i.e. R=0.5). In practice, it is difficult to obtain such low values of R except in relatively thick devices (which may be suitable for some applications such as identity cards but not others such as currency) and so, for comparison, FIG. 3(f) additionally shows the variation in obstruction level with tilt angle for a device with a Q:d ratio (R) of 2:0.7 (solid line), and a device with a Q:d ratio (R) of 2:1 (dashed line). In both cases, a refractive index of around 1.5 has been assumed. It will be seen that the degree of obstruction changes with tilt angle θ far more slowly than in the previous case, with not even a full half cycle being completed before the variation is curtailed by the critical angle. This is because, for a R=2:1 complementary device (as shown in FIG. 3(a)), light needs to pass through the transparent layer 1 at an angle of 45 degrees in order for neither pattern $P_1$, $P_2$ to obstruct the light passed by the other. However, since the critical angle is around 42 degrees, the effective tilt angle $\Theta'$ cannot reach 45 degrees. As such, the minimum obstruction level reached by the device (at around $\Theta=80$ degrees) is less than would be observed in a device with a lower R ratio. Nonetheless, at such tilt angles the device will still appear bright compared with its appearance when viewed from the normal. As such, the point around 80 degrees constitutes a minima viewing position for the R=2:1 device (the terms "maxima/maximum" and "minima/minimum" being relative to the obstruction levels actually achievable by the device, taking all viewing positions into account).

Devices with still larger R values will exhibit yet slower changes in obstruction level with tilt value, and will show a lesser overall change in obstruction level between maximum and minimum values. This is illustrated in FIG. 3(f) by the solid line trace representing a device with a Q:d ratio of 2:0.7 (e.g. a pattern pitch Q of around 200 microns and a layer thickness d of around 70 microns). As before, when the device is viewed from the normal (zero tilt angle), maximum obstruction is exhibited. When the device is tilted in the direction $TD_1$, the obstruction level decreases to a minimum around 80 degrees. This minimum obstruction value is greater than that achieved in the 2:1 device, but is nonetheless considered a minimum for the 2:0.7 device in question.

For further comparison, FIG. 3(g) shows exemplary plots for four devices having R values of 2:1, 1:1, 2:3 and 1:2 respectively, assuming a refractive index of 1.5 in each case. It will be seen that the smaller the value of R, the greater the rate of change of transmission/obstruction with tilt angle exhibited by the device. It should be noted that when comparing such rates, it is the initial gradient of the plot in the region adjacent θ=0 that is relevant, since at high values of θ, all devices will show a similarly slow rate of change in transmission/obstruction values, due to the above-described curtailment effect.

In practice, most preferred values of R lie in the range 2.00±0.66. For example, in preferred embodiments, the ratio of the pattern pitch of the first and/or second pattern to the thickness of the transparent layer is between 1.5:1 and 3:1, preferably between 1.67:1 and 2.33:1, more preferably around 2:1. Typical layer thicknesses d will vary according to the manner in which the device is to be incorporated into or onto a product or a security document, for example, but typically may be of the order of 50 to 100 microns. For example, in a polymer banknote where the banknote substrate may act as the transparent layer of the device, the thickness may be between 50 and 100 microns. In security threads, the thickness of the transparent layer may be lower, e.g. between 20 and 40 microns. In card-type documents (e.g. ID cards, driving licences, credit cards, etc) the transparent layer thickness may be greater, e.g. up to 1 mm. To obtain suitable values of R, preferred line thicknesses L are also of a similar order of magnitude. For instance, where the thickness of the transparent layer d is around 75 microns, preferably the line thickness L is also around 75 microns (hence its pitch, Q, equaling approximately 150 microns). Devices with dimensions of this sort exhibit a clear change in appearance over viewing angles in the range 25 to 40±2 degrees, which is suitably small such that minimal tilting will be required in order to observe the desired effects.

Thus, when the device is viewed at a range of angles along tilt direction $TD_1$, which is perpendicular to the elongate direction of the line elements 11, 13, the device varies between a relatively dark and relatively light appearance in a manner dependent on its Q:d ratio and refractive index. However, the behaviour of the device will be different for a different tilt direction. For example, if the FIG. 3(a) device were to be tilted in the perpendicular direction along the tilt direction $TD_2$ (parallel to the elongate direction of the line elements 11, 13), substantially no change in the level of obstruction exhibited would be observed. This is because the relative positions of the first and second patterns $P_1$ and $P_2$ will not change in a noticeable manner, with the respective pattern elements 11, 13 remaining in complementary positions to one another. As such, the device will continue to exhibit substantially its maximum darkness level.

At tilt directions in between $TD_1$ and $TD_2$, a variation in the exhibited level of transmission/obstruction will be observed, and the present inventors have found that this variation will adhere to a plot of similar shape to that observed when tilted in direction $TD_1$ (e.g. as shown in FIG. 3(c), (e), (f) or (g), for the appropriate device construction), but with a slower rate of change of transmission/obstruction level with tilt angle. In other words, the change in tilt direction away from $TD_1$ has the same result as an increase in the value of R. This is because the pattern pitch Q is effectively increased in the tilt direction, whilst the layer thickness d remains unchanged. Thus, for a certain degree of tilt, the degree of change in obstruction level will be less than observed when the device is tilted in direction $TD_1$, but more than when the device is tilted in direction $TD_2$.

FIG. 4 depicts a third embodiment of the invention which makes use of this phenomenon. FIG. 4(a) shows the security device 20 when viewed from the normal position. The device 20 comprises two regions 21 and 22 of which the first region 21 comprises three sub-regions 21a, 21b and 21c having the shape of the digits 2, 0 and 0 respectively such that, together, the number "200" is conveyed. To aid interpretation of the Figures, the boundary between the first region 21 and second region 22 is delineated with a light colored hairline, shown as dark line 23 in the enlarged detail of FIG. 4(b). However, in practice, this may be omitted.

Each of the regions is provided with first and second patterns on either side of a transparent layer in the same manner as depicted in FIG. 3(a). In this example, the Q:d ratio of the device is around 1:2, and a refractive index of 1.5 is assumed. However, the pattern directions of the two regions are not parallel to one another. In particular, as shown in the enlarged detail of FIG. 4(b), in the sub-regions such as 21a making up first region 21, the line elements of both patterns $P_1$ and $P_2$ align with the X axis and the pattern direction $PD_1$ is defined in the same direction. In contrast, in the second region 22, the same pattern direction (i.e. the direction parallel to the elongate elements), $PD_2$, lies parallel to the Y axis. Hence, the pattern direction of the first region $PD_1$ makes an angle φ with the pattern direction of the second region $PD_2$, which in this example is 90 degrees. The result is that the two regions 21, 22 will behave differently from one another when the device is tilted. In particular, the maximum rate of change in the level of obstruction with tilt angle exhibited by each of the two respective regions will be obtained when the device is tilted in different, non-parallel tilt directions.

For example, FIG. 4(c) depicts the device 20 when viewed away from the normal, having being tilted along the tilt direction $TD_1$ about tilt access $TA_1$. It will be seen that the first region 21 has undergone a change in the level of obstruction exhibited, and now appears lighter than when viewed from the normal (FIG. 4(a)). This is because the tilt direction $TD_1$ is substantially perpendicular to the elongate direction of the pattern elements in the first region (parallel to $PD_1$) and as such the region will exhibit a variation in obstruction level, or darkness D, with tilt angle as illustrated by line 21 in FIG. 4(e). In contrast, the second region 22 exhibits substantially no change in its appearance since here the elongate pattern elements are substantially parallel to the tilt direction $TD_1$. This is illustrated by the trace 22 in FIG. 4(e). Hence, when the device 20 is tilted along the tilt direction $TD_1$, the rate of change of obstruction for the first region will be fast relative to that of the second region, where the rate is preferably zero. Thus, when tilted in direction $TD_1$, the amplitude of the obstruction variation $\Delta D_1$ for the first region 21 appears relatively large whereas the amplitude $\Delta D_2$ for the second region 22 appears small (preferably substantially zero). In reality, if the elongate direction of the pattern elements in the second region 22 is close to but not precisely perpendicular to that in the first region 21, when the device is tiled in direction $TD_1$, the second region 22 will also undergo a variation in obstruction level with tilt angle. However, the rate of variation with tilt angle will typically be so slow that this variation will not be apparent within the available range of tilt angles, or at least until a very high tilt angle is reached.

FIG. 4(d) depicts the same device 20 when tilted in a different tilt direction, $TD_2$, which is perpendicular to $TD_1$. Now, the opposite changes occur. The first region 21 exhibits substantially no change in the level of obstruction as compared with the normal viewing position and therefore remains dark. In contrast, the second region 22 now undergoes a change in the obstruction level and becomes light at some viewing angles as shown in FIG. 4(d). This is because the elongate elements of the first region 21 are substantially parallel to the new tilt direction $TD_2$ whilst those of the second region 22 are substantially perpendicular. The corresponding changes in darkness level D are shown in graphically in the plot of FIG. 4(d) and it will now be seen that the rate of change of obstruction level for the second region is fast whilst that for the first region is slow, preferably substantially zero Thus, the two regions exhibit their maximum rate of change in the level of obstruction with tilt angle when the device is tilted about different, non-parallel axes. The result is a device which exhibits different changes in appearance when tilted through different directions. Further, in this embodiment, at least three different overall appearances are visible: when viewed from the normal, the first and second regions exhibit substantially the same level of obstruction and hence the number "200" is substantially hidden. Especially if the hairline 23 is not present, it will be difficult to distinguish the first region from the second region, except under magnification or close inspection. When the device is tilted in a first direction $TD_1$, the first region 21 will vary in appearance between dark and bright, whilst the second region 22 will remain dark. When the device is tilted in a second direction $TD_2$, the first region 21 will remain dark whilst the second region 22 will change in appearance. Hence, in this example the number "200" appears first light against a dark background and then dark against a light background when the device is tilted in different directions. This provides a level of complexity not achieved in previous security devices.

It should be noted that it is not essential to form the first and second patterns $P_1$ and $P_2$ with their pattern elements 11 and 13 in complementary positions to one another (as shown in FIG. 3(a)) in the FIG. 4 embodiment. In fact, the patterns $P_1$ and $P_2$ can have any relative positioning, although it is preferred that they are sufficiently aligned such that the combination of the two patterns does not give rise to a Moiré effect, i.e. in the present case, the elongate elements of each pattern should be substantially parallel to one another. For example, if the first and second patterns $P_1$ and $P_2$ are precisely non-complementary (as depicted in FIG. 2(a)), when the device is viewed from the normal, both regions 21 and 22 will appear to have their maximum lightness ($D_{min}$). As the device is tilted in the tilt direction $TD_1$, the obstruction level of the first region 21 will vary, whilst the background formed by region 22 will remain light, and when the device is tilted in direction $TD_2$ the opposite effects will occur.

In order to obtain the maximum visual impact, it is preferred that the first and second patterns $P_1$ and $P_2$ are either fully complementary (as shown in FIG. 3(*a*)) or fully non-complementary as shown in FIG. 2(*a*). However, this is not essential. If the offset between the two patterns $P_1$ and $P_2$ is at an intermediate position, when the device is viewed from the normal, both the first and second regions 21 and 22 will exhibit some intermediate level of obstruction and, as the device is tilted in direction $TD_1$ or $TD_2$, only one of the regions will exhibit variations whilst the other will remain constant.

It should also be noted that, whilst it is preferred that the offset between patterns $P_1$ and $P_2$ is the same in both the first and second regions 21 and 22 (e.g. both complementary or both non-complementary), this is not essential and different offsets could be applied in each region. For example, in the first region, the first and second patterns $P_1$ and $P_2$ may be non-complementary (as shown in FIG. 2(*a*)) whilst in the second region 22 the first and second patterns $P_1$ and $P_2$ may be complementary (as shown in FIG. 3(*a*)). In this version, the two regions 21 and 22 will have different appearances when the device is viewed from the normal and hence the number "200" in this example will not be hidden. However, when the device is tilted, similar effects to those described with reference to FIGS. 4(*c*) and 4(*d*) will be exhibited, with the number "200" being hidden at certain viewing positions.

It is also preferred that the angle $\phi$ between the pattern directions $PD_1$ and $PD_2$ of the first and second regions is substantially 90 degrees (e.g. between 85 and 95 degrees), since as discussed above this will minimise the variation exhibited by one region when the device is tilted in the direction which gives rise to the maximum rate of change in the other region. In other words, one of the regions will appear to exhibit a substantially constant level of obstruction whilst the other changes between its maximum and minimum darkness levels. However, this is not essential and similar effects can be achieved wherever the pattern directions of the two regions are non-parallel. Nonetheless, it is preferred that the angular separation between the two pattern directions, $\phi$, should be at least 30 degrees and more preferably 45 degrees or greater in order to achieve the most visually effective result. If the angular separation between the two pattern directions $\phi$ is too small, there will be a similar rate of variation of the level of obstruction in both regions whichever direction the device is tilted in, which will reduce the visibility of the "200" indicia.

It will be appreciated that the design depicted in FIG. 4 is purely exemplary and the regions could take any configuration as appropriate for the application. However it is preferred that the device conveys one or more items of information, such as the number "200" in this example, but alternatively a letter, digit, symbol, image, graphic or alphanumerical text. It is also preferred that the two regions are positioned close to one another, e.g. abutting one another (as shown) or spaced by no more than 0.5 cm or 1 cm. This assists in ensuring that the change in contrast between the regions can be appreciated by the human eye.

The regions can be of any size but preferably are sufficiently large that each contains multiple pattern repeats, i.e. in at least one direction (and preferably all directions) the region has a dimension which is greater than the pitch Q of the patterns $P_1$ and $P_2$ (which are preferably substantially equal within any one region). However in other embodiments, only a single pattern repeat may be contained in each region and this will be detailed further below.

FIG. 5(*a*) depicts a security device 30 according to a fourth embodiment of the invention viewed from an arbitrary angle, away from the normal. Here, the device is of a triangular shape divided into three regions 31, 32 and 33 which abut one another, although this is not essential for the same reasons as given above. The device is constructed as described above, having first and second patterns $P_1$ and $P_2$ on opposite sides of a transparent layer 1. One or both of the patterns $P_1$ and $P_2$ have different properties in each of the three regions of the device such that the regions will exhibit different changes in appearance (i.e. obstruction levels/darknesses) when the device is tilted. In some embodiments, all three regions 31, 32 and 33 may exhibit their maximum darkness level when the device is viewed from the normal viewing position, although this is not essential. However, in all cases, when the device is viewed from a viewing position away from the normal, each of the three regions will exhibit its maximum and minimum darkness levels at different viewing positions. That is, each region will exhibit its maximum darkness level at at least one viewing position at which one or preferably both of the other regions does not, and/or the region will exhibit its minimum darkness level at at least one viewing position at which one or preferably both of the other regions does not. This is achieved by arranging the patterns $P_1$ and $P_2$ to have a different pattern direction and/or offset between the first and second patterns in each of the three regions 31, 32 and 33 of the device 30, as will be described in more detail with respect to FIGS. 6 to 14.

To illustrate a general case, FIG. 5(*b*) shows the device 30 in three dimensions, indicating the positions of two exemplary off-axis observers $O_1$ and $O_2$. Observer $O_1$ views the device from a viewing position with tilt angle $\ominus_1$ along a tilt direction $TD_1$, and observer $O_2$ views the device from a tilt angle of $\ominus_2$ along a tilt direction $TD_2$. FIGS. 5(*c*) and 5(*d*) are plots illustrating the change in exhibited obstruction level (or darkness, D) of each of the regions 31, 32 and 33 as the device is tilted in tilt directions $TD_1$ and $TD_2$, respectively. The plots assume a Q:d ratio of 1:1 for all regions and a refractive index of 1.5.

Referring first to FIG. 5(*c*), the solid line 31 represents the darkness level of region 31. In this region the pattern elements are complementary to one another (as shown in FIG. 3(*a*)), and hence the obstruction level is at its maximum. The pattern elements are elongate and the selected tilt direction $TD_1$ is substantially perpendicular to their length (which is parallel to the pattern direction in this region). Hence, as the device is tilted in the tilt direction $TD_1$, the obstruction level of region 31 varies from its maximum to its minimum levels as shown.

The second region 32 is represented by dashed line 32 in FIG. 5(*c*), and like region 31 will exhibit its maximum darkness when viewed from the normal. Again, this is achieved by forming the pattern elements to be complementary to one another (as per FIG. 3(*a*)). However, in region 32, the pattern direction is different to that of region 31 such that the elongate elements extend in a direction which is not perpendicular to the tilt direction $TD_1$. Hence, when the device is tilted in the direction $TD_1$, the darkness of region 32 will vary more slowly than that of region 31. Hence as the device is tilted away from the normal through a certain angle, region 32 will appear to undergo less of a change in appearance than region 31. In this example, the pattern direction of region 32 is sufficiently rotated compared with that of region 31 that the variation of obstruction level in 32 when the device is tilted in direction $TD_1$ is so slow that the region does not attain its lightest possible appearance (i.e. minimum obstruction level) before the critical angle curtails the variation as discussed above.

The third region 33 is provided with pattern elements parallel to those of the first region 31 and hence the maximum rate of change in the darkness level with tilt angle will be encountered when tilting in the same direction $TD_1$. However, in region 33 the offset between the first and second patterns is different, such that the pattern elements are not complementary but partially occlude one another when viewed from the normal. As such, when viewed from the normal, region 33 has an intermediate darkness level which will vary between $D_{max}$ and $D_{min}$ as the device is tilted in tilt direction $TD_1$. However the variation will appear to "lag" behind that of region 31.

For comparison, FIG. 5(d) shows the change in obstruction level for the three regions as the device is tilted along the direction $TD_2$. Again, regions 31 and 32 exhibit maxima when viewed from the normal, whilst region 33 does not, due to the different offset. However, when tilted in this direction, regions 31 and 33 now exhibit a slower rate of change in obstruction level since the tilt direction $TD_2$ is not optimised for the pattern direction in these regions. Instead, region 32 now exhibits its maximum rate of change in obstruction level with tilt angle.

Further examples and details of the above described mechanisms will be given below. However, for the time being it is sufficient to note that the result is a set of obstruction maxima (i.e. the viewing positions at which $D_{max}$ is attained) and obstruction minima (i.e. the viewing positions at which $D_{min}$ is attained) for each region—forming a set of "peak viewing positions"—which is different from that for each of the other regions. For instance, FIGS. 5(c) and (d) denote as $VP_{max1}/VP_{min1}$ maxima/minima viewing positions for region 31, as $VP_{max2}/VP_{min2}$ maxima/minima viewing positions for region 32, and as $VP_{max3}/VP_{min3}$ maxima/minima viewing positions for region 33. It should be noted that in this example the viewing positions around $\theta=80$ degrees where the plots are curtailed are not denoted as maxima or minima. This is because the obstruction values reached are not the highest/lowest achievable by the respective regions, taking all possible viewing positions into account. For regions 31 and 33 this is apparent from an inspection of FIG. 5(c) alone. Region 32 on the other hand appears from FIG. 5(c) to have a minima around 80 degrees. However, this is not a true minima because when the device is tilted in a different tilt direction ($TD_2$), the same region will exhibit lower obstruction values. This is shown in FIG. 5(d) where the relevant minima for region 32 are marked as $VP_{min2}$. Likewise the lowest values of obstruction level for region 31 shown on FIG. 3(d) are not in fact minima for region 31 since these will only be found when tilting in direction $TD_1$.

It will be seen that the sets of peak viewing positions for each region differ from one another: each set includes at least one maxima viewing position which is not a maxima viewing position for one or both of the other regions and/or at least one minima viewing position which is not a minima viewing position for one or both of the other regions (although some may coincide for two or more regions). Thus, as the device is tilted, different ones of the three regions will appear darkest in sequence. At the position of observer $O_1$, marked on FIG. 5(c), region 32 will appear darkest, region 33 will appear lightest and region 31 will have an intermediate value. This order of darkness levels will remain the same until the tilt angle reaches position (i) indicated on FIG. 5(c), at which region 32 will remain darkest but region 33 will become darker than region 31. At position (ii), region 33 becomes darkest, and so on. The result is that the darkest portion of the device appears to move from one region or another (or, analogously, the lightest portion of the device appears to move). The regions can be configured such that the movement appears to jump from one arbitrarily selected region to another, but preferably, the region follows a continuous direction (which may be a straight line or a circle, for example), such that the darkest (or lightest) region of the device appears to move as a "wave" across or around the device. The device could take any configuration and have any number of regions to make use of this effect.

Thus, as the viewing position is changed by moving the device relative to the observer, the appearance of the device will change as different ones of the multiple regions exhibit their maximum obstruction level and different ones exhibit their minimum obstruction value. A change in viewing position may involve either tilting the device relative to the viewer (i.e. there is a change in $\theta$) or rotating the device relative to the viewer (i.e. there is a change in $\varphi$), or both. A change in the viewing position (e.g. from the position of observer $O_1$ to that of observer $O_2$) will automatically involve the viewer observing the device from a continuum of viewing positions between $O_1$ and $O_2$, since it is impossible to arrive at a new viewing position without travelling through the different values of $\theta$ and/or $\varphi$ in-between. In many embodiments, as will be seen below, the manner in which the appearance of the regions changes will differ according to the change in viewing position being undertaken (e.g. the direction of tilt). In some embodiments, certain changes in viewing position may not elicit any change in the appearance of the regions, a different tilt direction being required to observe the effect.

The various regions of the device can be arranged in any desired manner. In particular, the different regions may exhibit their maximum darkness (or lightness) level in any order as the viewing position is changed. However, in the most preferred embodiments, as noted above, the regions are arranged such that as the viewing position is changed, the darkest (or analogously lightest) region of the device appears to move in a continuous direction, e.g. in a straight or curved line. This gives the appearance of dynamic motion across the device, which provides a strong visual impact and hence a particularly distinctive security effect.

The size of each region is preferably sufficiently large to contain multiple repeats of the patterns $P_1$ and $P_2$ within the region, i.e. the region has a minimum dimension greater than the pattern's pitch Q in that region. However in other implementations, each region could exhibit a single pattern repeat, e.g. one line element. Thus the orientation and/or offset (relative to the other pattern $P_1$ or $P_2$) of each individual line would differ from that of the next, such that the pattern direction and/or offset varies substantially continuously across the device. This would still give rise to the same "motion" effect discussed above when the device is tilted, but the dark/light "wave" would appear to move more smoothly across the device rather than in a step-wise manner. An example of such a device will be described below in relation to FIG. 9(c).

FIG. 6 shows a security device according to a fifth embodiment in which such motion is displayed. Here the device 40 is formed of six regions: five concentric annular rings 41 to 45 surrounding a central circular region 46. For clarity, in the Figures, each region is delineated with a white line, however these may be omitted in practice. As in the previous embodiments, the device comprises two overlapping line patterns arranged with their pattern elements complementary to one another (as in FIG. 3(a)) such that when the device is viewed from the normal, all of the regions 41 to 46 exhibit their maximum darkness, as shown in FIG. 6(a).

FIG. 6(b) illustrates the locations of three exemplary observers $O_1$, $O_2$ and $O_3$ relative to the device 40. Observers $O_1$ and $O_2$ share the same tilt direction but have different tilt angles θ, whilst observer $O_3$ has the same tilt angle θ as observer $O_2$ but a different tilt direction. Thus moving from the normal (Z axis) to observer $O_2$ via observer $O_1$ involves increasing the tilt angle θ in a constant tilt direction, whilst attaining the position of observer $O_3$ from that of $O_2$ involves rotating the device relative to the viewer. Alternatively the viewing position could be changed directly from $O_1$ to $O_3$ by changing both the tilt angle θ and tilt direction.

Figure 6C:
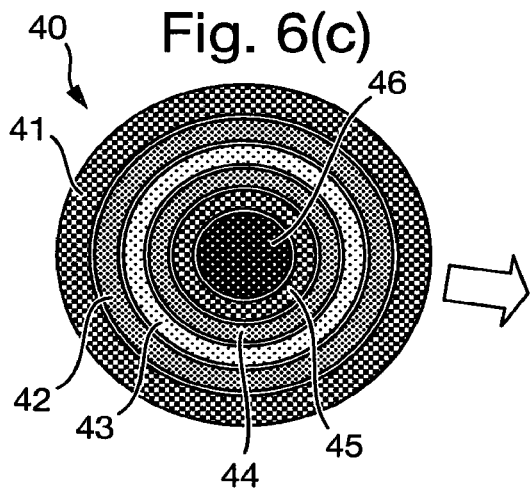

When the device is viewed from a location away from the normal (e.g. $O_1$), a range of obstruction levels will be exhibited by the regions. For example, as shown in FIG. 6(c), the centre region 46 may be at its maximum darkness, with the adjacent concentric rings 45, 44 displaying decreasing levels of obstruction until, at region 43, the minimum obstruction level is displayed. Continuing out from the centre of the device, the next region 42 exhibits a darker obstruction level, and the outmost region 41 appears darker still. Thus overall the device gives a graduated appearance, with the darkness appearing to vary in steps from one region to the next.

Figure 6D:
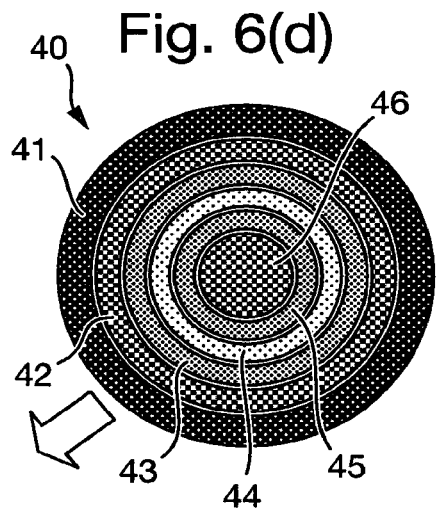
Figure 6E:
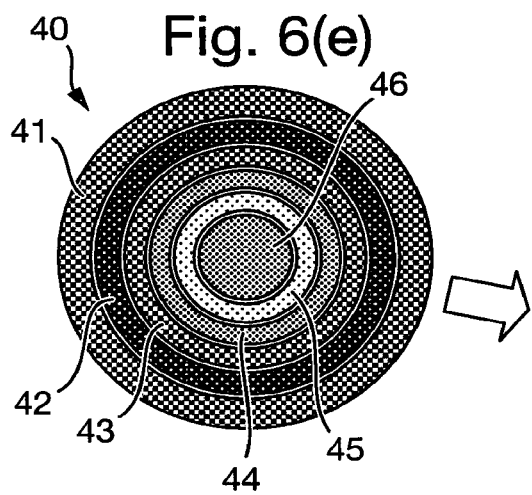
Figure 6F:
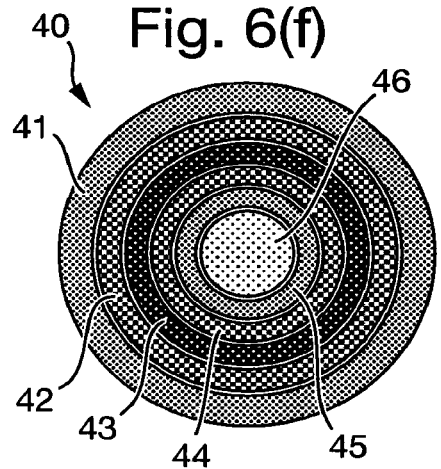

As the viewing position is changed (e.g. from $O_1$ to $O_3$), the obstruction levels of the regions change and the location of the darkest region (or conversely the lightest) appears to move across the device. For instance, as shown in FIG. 6(d), when the viewing position has been changed by a small amount, the centre region 46 now appears a shade lighter than at $O_1$, as does each of rings 45 and 44, such that region 44 now appears lightest. Regions 43, 42 and 41 have each become a shade darker. As such, the lightest portion of the device appears to have moved towards the centre. As tilting continues, the bright ring continues to move towards the centre, now followed by a dark ring (region 42 in FIG. 6(e)), until as shown in FIG. 6(f) the device has the opposite appearance from that in FIG. 6(c), with the centre region 46 lightest. Overall, the device appears to exhibit a series of moving dark/light "waves" moving towards the centre of the device (if the direction of tilt is reversed, the direction of the "waves" will also reverse). It should be noted that this effect will only be seen from off-axis viewing positions and not if the device is rotated whilst viewed from the normal (without any tilt).

In order to display smooth and continuous movement, it is most preferred that the regions which together display the above-described "motion" are adjacent one another and advantageously abut one another or are closely spaced, e.g. by 0.5 cm or less. However this is not essential and certain additional effects may be obtained through other arrangements. For example, the described regions 41 to 46 could constitute a first group of regions which is interspersed with a second group of concentric ring regions (not shown). The second group of regions could be configured to exhibit a different response to tilting. For instance, the patterns within the second group of regions could be arranged to give the appearance of a dark/light "wave" travelling outward from the centre of the circle from one region of the second group to the next, whilst the first group of regions displays an inwardly moving "wave". Further examples will be given below.

There are two primary techniques through which such dynamic visual effects can be achieved, namely: (i) varying the pattern direction (PD) between regions of the device, or (ii) varying the offset between the first and second patterns $P_1$ and $P_2$ from one region of the device to another. In some cases, both the pattern direction and the offset may be varied in certain regions of the device. Examples of preferred implementations will now be described with reference to FIGS. 7 to 17.

FIG. 7 depicts a sixth embodiment of the invention in which a dynamic visual effect is achieved by varying the pattern direction PD between regions of the device. Like the fifth embodiment, here the device 50 comprises a series of concentric circular regions 51, 52, 53 and 54. The patterns $P_1$ and $P_2$ on either side of the transparent layer are line patterns arranged complementary to one another in the same manner as shown in FIG. 3(a), as schematically shown in FIG. 7(a). For clarity, FIG. 7(a) depicts the pattern elements of the first pattern $P_1$ with dark lines and those of the second pattern $P_2$ with relatively light lines. However it should be appreciated that no such distinction need be apparent in practice.

In the centre region 51 of the device, the pattern direction $PD_1$ (defined as parallel to the elongate axis of the pattern elements) is parallel to the y-axis, as shown more clearly in the enlarged detail of FIG. 7(b). In the next region 52, the pattern direction $PD_2$ has been rotated relative to $PD_1$ by an angle Δφ, and likewise the pattern in region 53 has been rotated still further. Finally, in the outermost region 54, the pattern direction $PD_4$ is approximately perpendicular to that of the centre region 51 ($PD_1$). Preferably the angular change in pattern direction Δφ from one region to the next is substantially constant—i.e. the set of pattern directions intersect one another as shown in FIG. 7(c) such that the angle between adjacent pairs is approximately equal. In other words, taking $PD_1$ as the reference direction (φ=0), the pattern direction of each region is given by $φ_n=(n-1)·Δφ$, where n is the number of the region counting from the centre. In this example, Δφ=30 degrees.

When the device is viewed from the normal, all of the regions will exhibit their maximum level of obstruction and the device will appear uniformly dark. When viewed from an off-axis position, a progressive grayscale effect will be apparent, as described in relation to FIG. 6(c) above. The location of the darkest and lightest regions will depend on the tilt direction and angle. For example, if the device is tiled in the direction TD shown in FIG. 7(a), i.e. perpendicular to $PD_1$, as the tilt angle θ increases, the centre region 51 will exhibit a fast change in darkness. This is because, as shown in FIG. 7(d) (i), the component a of the elongate pattern elements (unit vector b) in the direction perpendicular to the tilt direction TD is at its maximum (a=b·cos 0=b). The second region 52 will also exhibit a variation but of lesser magnitude for the same change in tilt angle (i.e. slower) since the component a of the elongate pattern elements (unit vector b) is smaller (a=b·cos 30=0.86b). Similarly, the third region 53 will also display a change in obstruction level but with a still slower rate of change since the component a of the elongate pattern elements is reduced further (a=b·cos 60=0.5b). Finally, the fourth region will display substantially no change in the level of obstruction exhibited ($ΔD_4$) since the component a of the elongate pattern elements (unit vector b) is zero (a=b·cos 90=0). This is illustrated graphically in the plot of FIG. 7(e) for a device with Q:d ratio of 1:1 and a refractive index of 1.5.

Thus as the device 50 is tilted in the direction TD, the device will first take on a graduated appearance, lightest in the centre and darkest at the outside (e.g. as seen at tilt angle $\theta_1$ shown in FIG. 7(e)), and then as the tilt angle increases, the relative darkness of the three inner regions 51, 52 and 53 will switch (around tilt angle $\theta_2$ shown in FIG. 7(e)). This will give the appearance of a bright ring moving towards or away from the centre of the device as described previously with respect to FIG. 6.

From off-axis viewing positions, the device of FIG. 7 will also exhibit a different dynamic appearance when the tilt direction is changed (i.e. the device is rotated relative to the viewer through an angle $\Delta\varphi$). This is because different ones of the regions 51, 52, 53, 54 will become optimally orientated for maximum rate of change in obstruction level as the tilt direction is changed. For example, as already described, when viewed from a non-zero tilt angle (e.g. $\theta_1$) in the direction TD, the centre region 51 will display the fastest change in darkness of the four regions. However, if tilted in the perpendicular direction, the elongate pattern elements of the centre region will now be parallel to the tilt direction and display no darkness variation (FIG. 7(d) (iv)), appearing dark at all tilt angles $\theta$. Hence as the device is rotated to change the tilt direction, the region of the device with the fastest rate of change of obstruction level will change from one region to the next. This will appear as a dark/light "wave" moving towards or away from the centre of the device in a similar way to that described above, although in this case all regions of the device will take part in the variation.

In some devices, this "rotational" dynamic effect may be more readily observed than motion from tilting alone since, unless a very low Q:d ratio is achieved (giving very "fast" variations upon tilting), typically motion will be apparent upon a smaller change in viewing position (i.e. change in $\varphi$) as compared with tilting the device in a constant direction (i.e. change in $\theta$). Indeed, in embodiments with larger Q:d ratios (e.g. around 2:1 or greater for a device with a refractive index of 1.5), motion may only be visible when the device is rotated and not during tilting alone.

To illustrate this, FIG. 7(f) is a plot showing the change in obstruction level with tilt angle $\theta$ for each of the regions 51, 52, 53 and 54 as the device shown in FIG. 7(a) is tilted in the direction TD, but here assuming a Q:d ratio of 2:1 and a refractive index of 1.5. As before, the centre region 51 exhibits the fastest change in appearance, with regions 52 and 53 showing lesser degrees of change, and the outermost region 54 exhibiting no change. However, for all regions the change in obstruction level is much slower than in the case of the FIG. 7(e) device, with even the centre region 51 not attaining the same level of brightness as in the FIG. 7(e) device, at any tilt angle. Instead, the variation is curtailed by the effects of refraction as described above. Likewise, the variation exhibited by each of regions 52 and 53 is curtailed with each having undergone less change in the obstruction level. Hence at all non-zero tilt angles in the direction TD, the device will have a graded appearance, with region 51 appearing the lightest and region 54 the darkest, with regions 52 and 53 exhibiting intermediate levels. The ranking of the different obstruction levels will not change and hence there will be no "motion" effect upon tilting alone.

However, when the device is rotated, each region in turn will be optimised to display the fastest possible variation with tilt angle (as exemplified by region 51 in FIG. 7(e), and hence the above-described motion effect will be revealed.

In this connection it should be noted that whilst each of regions 51, 52 and 53 appear to reach their lowest possible obstruction level around 80 to 90 degrees in the FIG. 7(f) plot, in fact this only represents a minima viewing position for region 51. The other regions will each exhibit obstruction levels lower than those reached in FIG. 7(f) when the device is tilted in different directions.

The regions can be arranged to form a device with any desired configuration, e.g. one or more lines, geometrical shapes, symbols, letters, numbers or graphics. An example of a device operating on the same principles as that of FIG. 7 is shown in FIG. 8 to illustrate this point. FIG. 8(a) shows the first pattern $P_1$ of the security element 60, and FIG. 8(b) shows the second pattern $P_2$ which will be arranged on the opposite side of the transparent layer 1. Here the regions (of which a selection are labelled 61, 62 . . . 72, 73) are arranged to form a triangular spiral shape. The labelled regions form one "L" shape which is interlocked with two identical but rotated groups of regions. Starting from region 61, the pattern direction of each region (parallel to the depicted line elements) is rotated in each region by a constant amount of 10 degrees (i.e. $\Delta\phi$=10 degrees) relative to the previous region.

The two patterns $P_1$ and $P_2$ are precisely non-complementary (i.e. the pattern elements of one pattern are precisely aligned with those of the other, as shown in FIG. 2(a)), as can be seen from a close comparison of the positions of the lines within each region between FIGS. 8(a) and (b). As a result, when viewed from the normal, the device appears uniformly light (i.e. minimum obstruction level). When tilted in the direction TD shown, regions having a large component of the elongate line elements in the direction perpendicular to TD (e.g. 72, 73, 61, 62) will exhibit a fast change in obstruction level, whilst those with lines approximately parallel to the tilt direction (e.g. 65, 66, 67) will show little change in appearance if any. The regions with intermediate pattern directions will display intermediate darkness levels. Hence, the line of regions forming the "L" shape will have a graduated darkness level and, particularly as the tilt direction is changed, the darkest region will appear to move along the "L" shaped path towards or away from the centre of the triangle. The same will be the case for the two further "L" shaped groups of regions, having the result that a spiral dark/light "wave" appears to move towards the exterior or interior of the triangle.

In the FIGS. 7 and 8 embodiments, it is preferred that the first and second patterns $P_1$ and $P_2$ are either complementary or precisely non-complementary such that either the maximum or minimum obstruction level is exhibited across the device when viewed from the normal. This is not essential and the two patterns could have some other offset. However, this will limit the maximum and/or minimum obstruction levels achievable and hence the dynamic effect will be less distinct. It is also preferred, but not essential, that the offset between the first and second patterns is the same within each region of the device, such that the appearance of all regions is uniform when viewed from the normal.

It should also be noted that more than one region of the device can have the same properties. For example, region 79 labelled on FIG. 8(a) has the same orientation as that of region 66 and hence these two regions will have the same appearance at each viewing position. This provides the appearance of multiple spaced dark/light "waves" moving in synch with one another as the viewing position is changed. This applies to all embodiments: multiple regions of the device can have the same appearance at any one viewing position, but in order to achieve a dynamic effect, at least three of the regions must have different sets of peak viewing positions as discussed above.

FIGS. 9(a) and (b) show a schematic example of a security element 80 in accordance with an eighth embodiment of the invention in which the different maxima viewing positions for each region are obtained through varying the offset between the first and second patterns $P_1$ and $P_2$ on either side of the transparent layer 1, rather than altering the pattern direction. The device of FIG. 9(a) comprises five regions 81, 82, 83, 84 and 85 arranged adjacent to one another along a straight line. Both patterns again comprise line elements spaced by gaps. For clarity, the first pattern $P_1$ is illustrated in dark grey, whilst the elements of the second pattern $P_2$ are shown in light grey. However, in practice there will typically be no such distinction.

In this example, the pattern direction PD is the same in each of the five regions 81 to 85. However, the offset between the first and second patterns $P_1$ and $P_2$ now varies from one region to the next. Thus, as shown in FIG. 9(a), in region 81 the first and second patterns are precisely complementary to one another (as shown in FIG. 3(a)). In the next region 82, the offset is shifted by a quarter of the line width (L/4), such that the pattern elements of the two patterns partially occlude one another. In the next region 83, the offset between the two patterns $P_1$ and $P_2$ is further increased to L/2 such that half of each pattern element of the second pattern $P_2$ is occluded by the corresponding pattern element of the first pattern $P_1$ (and vice versa). In the next region 84, the offset is shifted once more such that the pattern elements of the two patterns $P_1$ and $P_2$ are nearly in alignment (offset=3L/4). Finally, in region 85 the offset is such that the second pattern $P_2$ has been shifted relative to the first pattern $P_1$ by a full line width L and the patterns are precisely non-complementary (as depicted in FIG. 2(a) above).

The variation in offset between the regions gives rise to a different darkness value for each of the regions which is visible when the device is viewed from the normal (as well as at other angles), unlike the embodiments of FIGS. 7 and 8. From the normal viewing position, the first region 81 will exhibit its maximum darkness level, since the complementary pattern elements block the passage of light through the device at all locations. The next region 82 will appear a shade lighter than region 81, since some light is able to be transmitted through the narrow gaps of width L/4 between the pattern elements of the first pattern $P_1$ and those of the second pattern $P_2$. In the next region 83, the lightness will be increased due to the increased gap area and still further in region 84. Finally, region 85 will exhibit its maximum lightness level (minimum obstruction), since here the two patterns are precisely aligned with one another.

When the device is tilted in the direction $TD_1$ (perpendicular to the elongate direction of the pattern elements), the apparent offset between the two patterns in each region is altered due to the spacing between the two patterns achieved by the transparent layer 1. For example, FIG. 9(b) shows the same device 80 viewed from a non-zero tilt angle in the direction $TD_1$ and it will be seen that the gradual change in the darkness of the five regions has reversed in direction. Hence, region 81 now appears the lightest and region 85 the darkest, with regions 82, 83 and 84 exhibiting intermediate levels. In practice, as the device is tilted between the position represented in FIG. 9(a) and that represented in FIG. 9(b), the region exhibiting the maximum darkness (or analogously that showing maximum lightness) will move step-wise along the device from one region to the next, forming a "wave" effect as described above. This is illustrated in FIG. 11, using an exemplary device with a Q:d ratio of 1:2 and a refractive index of 1.5. The solid line 81 represents the change in obstruction level of region 81, and the various dotted and dashed lines provide corresponding information for regions 82, 83, 84 and 85 as labelled. At the normal position ($\Theta_{TD1}$=0), region 81 exhibits its maximum darkness level whilst regions 82 to 85 appear gradually brighter, as described above. On increasing the tilt angle $\Theta$ in the direction $TD_1$, the regions 82, 83, 84 and 85 exhibit their maximum darkness levels in sequence, one after the other.

It will be appreciated that, if the device is tilted in the perpendicular direction $TD_2$, none of the regions will display any significant change in darkness level. This is because the new tilt direction will be parallel to the long axis of the elongate pattern elements and, as such, there will be no apparent change in the offset between the two patterns as tilt occurs. Thus, at angles of tilt away from the normal in direction $TD_2$, the device will retain substantially the same appearance as shown in FIG. 9(a). If the device is tilted in intermediate directions between $TD_1$ and $TD_2$, a variation will be observed akin to that described with respect to FIG. 9(b), but since all of the regions will have their pattern elements arranged at an oblique angle to the tilt direction, the variation will be slower.

Preferably, as in this example, the different regions of the device have a cumulative offset with a constant gain (i.e. the change in offset is equal from one region to the next), so that the rate of movement of the "wave" is constant across the device as tilt occurs. However, it is not essential that an offset change of L/4 between each region is used as in the FIGS. 9(a) and (b) example, but any other fraction of the line width as a proportion of the pitch Q could be used instead, depending on the number of regions desired and the speed of motion to be attained. Generally speaking, any non-zero change in offset up to L/2 could be used.

For example, FIG. 9(c) (ii) depicts a variant of the FIG. 9(a) device in which the change in offset from one region to the next is much smaller. Here, the device 86 comprises 41 regions of which an example 87 is shown alone in FIG. 9(c) (i). In this example, the width of each region (perpendicular to the pattern direction PD) is only twice the pitch Q of the pattern, such that there are only two pattern repeats in each region. The pitch Q is 400 microns and the offset between the patterns is shifted by 5 microns from one region to the next. Thus, from one side of device 86 to the other, the offset changes gradually from non-complementary to complementary. Due to the small size of the regions 87 and the small change in offset from one region to the next (=L/40), the resulting appearance is a smooth gradation from bright to dark, as shown in the Figure. When the device is tilted in the direction $TD_1$, the bright/dark areas will appear to move smoothly along the device in the same way as described above in relation to FIGS. 9(a) and (b). An even smoother result could be achieved if each region had a width corresponding to only a single pattern repeat.

In general, for a device having a total of N regions (N=5 in the embodiment of FIGS. 9(a) and (b), and N=41 in the case of FIG. 9(c)), each region being identified by a region number n starting from and including zero (n=0, 1, 2, 3 . . . ), then to give one light-dark variation (i.e. from minimum obstruction to maximum obstruction) across the device, the cumulative amount of offset shift for each region (relative to region "0") is given by $S_n=(nQ)/(2(N-1))$, where Q is the pitch of the patterns (typically Q=2L, where L is the linewidth). To present multiple light-dark variations across the device, $S_n$ is multiplied by the desired number of variations, so for example if it is desired that the device exhibits a variation in obstruction of light to dark and then dark to light across the device, the cumulative shift needed is $S_n=(nQ)/(N-1)$.

It should also be noted that the direction of offset need not be the same as that in which the apparent motion ultimately occurs. For example, FIG. 10 shows a further embodiment comprising five regions 91, 92, 93, 94 and 95 arranged in a straight line, similar to the FIG. 9 embodiments. However, in this case the pattern direction TD is parallel to the long axis of the overall device 90. As before, the offset is adjusted in the direction perpendicular to the long axes of the linear pattern elements between each region such that, from the normal, region 91 appears darkest and region 95 lightest. Regions 92, 93 and 94 exhibit graduating intermediate shades. When the device is tilted in the direction $TD_3$ (perpendicular to PD), the above-described dark/light "wave" effect will appear to move along the length of the device from one region to the next. Thus, this device configuration provides a particularly counterintuitive security effect since the apparent motion will not be in the same direction as that in which tilt occurs. The variation in darkness of each region 91 to 95 is also represented by the above-described traces in FIG. 11.

In the FIGS. 9 and 10 embodiments, the offset between the two patterns $P_1$ and $P_2$ is implemented by altering the positions of the line elements of only one of the two patterns in each respective region. That is, the first pattern $P_1$ is identical in each of the five regions, with no shift and hence constant periodicity, whilst the elements of the second pattern $P_2$ undergo the above-described shift in offset from one region to the next. However, in other embodiments the change in offset may be implemented in both of the patterns $P_1$ and $P_2$, and an example of such a device is shown in FIG. 12.

Here, the device 100 comprises five regions 101, 102, 103, 104 and 105 arranged in a straight line, perpendicular to the elongate direction of the linear pattern elements, as in the FIG. 9 embodiment. The first region 101 is identical to the first region 81 of the FIG. 9 embodiment, with the elements of the two pattern $P_1$ and $P_2$ in precisely complementary positions to one another. In the next region 102, both patterns $P_1$ and $P_2$ have undergone a shift in opposite directions of magnitude L/4. Thus, the pattern elements of the first pattern $P_1$ have shifted by L/4 to the right of the Figure, whilst the pattern elements of the second pattern $p_2$ have shifted towards the left of the Figure, relative to their respective positions in the first region 101. The result is an apparent total shift of magnitude L/2 with the pattern elements of the two patterns $P_1$ and $P_2$ overlapping one another to the same extent as in region 83 of the FIG. 9(a) embodiment.

In the next region 103, the two patterns $P_1$ and $P_2$ have been shifted again by the same amount L/4 in each direction, resulting in a cumulative total shift of magnitude L as compared with the first region 101 and hence the two sets of pattern elements are now precisely non-complementary, i.e. exactly in alignment with one another as in region 85 of the FIG. 9(a) embodiment. In regions 104 and 105, the shifting of the two patterns continues in the same manner such that in region 105, the pattern elements of the first and second patterns $P_1$ and $P_2$ are once again in complementary positions.

The result of sharing the offset between the two patterns $P_1$ and $P_2$ is that the magnitude of the offset shift between the regions is effectively doubled, which speeds up the motion that will be observed when the device is tilted (i.e. a smaller change in tilt angle is required to perceive the effect). For instance, as depicted in FIG. 12(b), when the device is viewed from the normal, the regions 101 and 105 will exhibit maximum darkness (represented as zero percent transmission T of the incident light I in FIG. 12b), whilst centre region 103 will exhibit maximum lightness, and the intermediate regions 102 and 104 will exhibit the same intermediate darkness level of around 50 percent of the maximum. When the device is tilted in the illustrated tilt direction TD, the location of the darkest region will switch from one region to the next in the same manner as previously described, but since the number of regions between that in which the pattern elements are complementary (region 101) and that in which the regions are precisely non-complementary (region 103) is reduced, the apparent motion of the dark/light "wave" across the device will be faster (i.e. require less tilt) than in the previous embodiments. This has been found to be particularly visually effective.

Sharing the offset between the two patterns $P_1$ and $P_2$ also provides symmetry between certain regions of the device, which form pairs of equal intensity (i.e. level of obstruction/darkness) when the device is viewed normally. For instance, as shown in FIGS. 12(a) and 12(b), the regions 102 and 104 will have the same apparent obstruction level of around 50 percent. However, when the device is tilted in the direction TD, the two regions making up the pair behave oppositely to one another. That is, one that will get darker as the other becomes lighter. This is because the tilt occurs in only one direction which means each region must progress to the state of its neighbour on the same side. For example, when viewed from the normal, region 102 has a dark neighbouring region on its left hand side (region 101), whilst 104, completing the pair, has a light neighbouring region 103 on its left hand side. Thus, when the device is tilted in the direction TD, region 102 will take on the appearance of its left hand neighbour region 101 by becoming dark, whilst region 104 will become light.

For completeness, FIG. 13 shows a cross-section through a portion of the FIG. 12 device, illustrating the pattern elements of the two patterns $P_1$ and $P_2$ in regions 103, 104 and 105. It will be seen that in centre region 103, the elements of the two patterns are precisely aligned (i.e. non-complementary) with one another. In the next region 104, the elements of pattern $P_1$ have been shifted to the right of the Figure by L/4 and those of the second pattern $P_2$ have been shifted to the left of the Figure by the same amount. In region 105, the two patterns have been shifted in the same directions by the same amount L/4 making a cumulative offset of L/2 for each pattern, and a total offset, combining the contributions of both patterns, of L.

Of course, any other value of shift offset between regions could be used instead, e.g. L/3, L/5, L/8 etc.

Embodiments such as these in which the offset is shared between the two patterns have been found to be particularly tolerant to mis-register between the two patterns, which assists in the manufacturing process. For example, tests have shown that the device is tolerant to mis-registration of up to 400 microns in both directions. That is, even with a mis-register of 800 microns, the above described dark/light motion effect will still be perceived.

FIG. 14 shows a further embodiment of a security device operating on the same principles as those described with respect to FIGS. 12 and 13. Here, FIG. 14(a) shows the first pattern $P_1$ and FIG. 14(b) shows the second pattern $P_2$ which will be arranged on opposite sides of the transparent layer 1 to form a security device 110. The device comprises five regions: a centre square or diamond shaped region 111 and four concentric square or diamond shaped ring regions 112, 113, 114 and 115. As in previous embodiments, the regions are delineated with a hairline 116 provided in one of the two patterns (here $P_1$) which may be omitted if preferred. The relative offset between the two patterns is shared between $P_1$ and $P_2$ and although this is less readily perceivable from FIG. 14(a) due to the presence of the hairline, this can be appreciated from a comparison of region 111 in which the centre-most vertical line is white (indicating the absence of a pattern element) whilst in outer region 115, the centre-most vertical line is black (indicating the presence of a pattern element). Thus, the elements of the first pattern $P_1$ have shifted by an amount equal to the line width L between the first region 111 and the outer region 115. The same amount of shift takes place in the second pattern $P_2$ (FIG. 14b), but in the opposite direction. The offset shift between each successive region in any one of the patterns $P_1$ or $P_2$ is L/4 in order to arrive at a cumulative shift of L in four steps (from region 111 to 115), whilst the total shift between each successive region, taking account of contributions from both patterns, is L/2.

From the normal viewing position, the centre-most region 111 and the outer-most region 115 will both display maximum lightness, since here the two patterns are precisely non-complementary. Region 113 will display maximum darkness since here the patterns are precisely complementary, and regions 112 and 114 will display an intermediate value.

As the device is tilted in the direction TD illustrated, the darkest and lightest regions will appear to move through the device causing a "wave" motion towards or away from the centre. If the device is tilted in the perpendicular direction, no such movement will be visible since the tilt direction will be parallel to the long axes of the pattern elements and hence the offset between the two patterns will not appear to change. If the device is rotated relative to the viewer (i.e. angle φ is varied), motion will be visible at certain ranges of rotation angles but not others.

To ensure that motion is visible in the device no matter what the direction of tilt, particularly preferred embodiments include regions in which the pattern direction of the first and second patterns is altered as well as those in which there is a shift in offset. An example of such a device is shown in FIG. 15. Here, FIG. 15(a) shows the first pattern $P_1$ applied to a first side of the transparent layer 1 and FIG. 15(b) shows a second pattern $P_2$ applied to the second side in order to combinedly form a security device 117. It should be noted that the radial banding effects visible in both patterns are due to an artifact of the printing of the Figure and are not present in the patterns themselves. The device comprises two groups of regions 118 and 119, each comprising ten distinct regions 118a to 118j and 119a to 119j. The first group of regions 118 all share a common pattern direction (aligned with the elongate direction of the line elements), $PD_1$. The regions forming the second group 119 share a common pattern direction $PD_2$, which is perpendicular to $PD_1$. Thus, in the orientation shown in the Figure, the line elements of the regions of the first group 118 are approximately horizontal whilst those of the regions from the second group 119 are approximately vertical.

Within each group 118, 119, the offset between patterns $P_1$ and $P_2$ changes in the same manner as described above with reference to FIGS. 9 to 13. Thus, as the device is tilted in the first tilt direction $TD_1$, a dark/light wave motion will appear to move along the first group of regions 118 towards or away from the centre of the device, whilst no motion will be visible in the second group of regions 119. If the device is tilted in the perpendicular direction $TD_2$, the opposite effects will occur, with the first group of regions 118 exhibiting substantially no motion whilst the second group of regions 119 now exhibiting the wave effect. If the device is tilted at some intermediate angle between $TD_1$ and $TD_2$, both groups of regions will display motion simultaneously, although this may be less distinct.

A further embodiment of the security device having regions of different offset as well as regions of different pattern direction is shown in FIGS. 16(a) and (b). FIG. 16(a) shows the device 120 in plan view and it will be seen that the device comprises a central square region 121 and eleven surrounding concentric square rings 122 to 132. It should be noted that in FIG. 16(a) the different shades of grey allocated to certain of the regions here do not represent the appearance of the regions but rather are used to identify particular groups of regions as will now be described.

The regions 121 to 123 are made up of three groups $G_1$, $G_2$ and $G_3$, the members of each group being identified by the depicted shading type. Thus, the first group $G_1$ includes regions 123, 126, 129 and 132, whilst the second group $G_2$ includes regions 122, 125, 128 and 131 and the third group $G_3$ includes the remaining regions 121, 124, 127 and 130. The groups are interleaved with one another to form a number of cycles $C_1$, $C_2$ etc, each cycle including one region from each group. In this example, four cycles $C_1$ to $C_4$ are shown but of course any number of repeats could be used.

As shown best in the enlarged detail of FIG. 16(b), each of the groups comprises regions with a common pattern direction (represented by the schematic line elements shown). Thus, in this example, the regions 123, 126, 129 and 132 making up group $G_1$ each have their line elements arranged with their elongate axes parallel to the X axis, and regions 125, 128 and 131, belonging to group $G_2$, have their line elements arranged in the perpendicular direction, parallel to the Y axis. Regions 124, 127 and 130 of group $G_3$ have a pattern direction at an intermediate angle. Within each group $G_1$, $G_2$ and $G_3$, the regions vary in offset between the first and second patterns $P_1$ and $P_2$ from one region to the next member region of the same group. Thus, region 124, which is a member of group $G_3$, has a smaller offset than region 127, the next member of $G_3$, which in turn has a smaller offset from that of 130, the outer-most member of group $G_3$ in this example. The degree of offset is represented in FIG. 16(b) by the magnitude of the arrow depicted in each region.

Thus, it will be seen that each of the cycles $C_1$, $C_2$ etc. comprises regions of substantially similar offset magnitude, but different pattern direction. Of course, it is not essential that the degree of offset within any one cycle is equal for all of the groups, although this is preferred.

Embodiments such as those shown in FIG. 16 have found to be particularly advantageous since, as compared with embodiments operating solely on changes in offset between regions (such as those of FIGS. 9 to 14), the desired movement effect can be perceived in whichever direction the device is tilted, because at least one of the groups of regions will have a pattern direction optimised (or near optimised) to exhibit a large rate of change in obstruction level as the device is tilted. Further, the inventors have found that in some cases embodiments based solely on changes in pattern direction between the regions (such as those of FIGS. 7 and 8) can involve too many different pattern orientations, which lowers the registration tolerance and reduces the apparent "order" of the design making it more difficult for the eye to follow. In "combined" embodiments making use of both changes in offset and direction, such as that of FIG. 16, the number of different pattern directions (e.g. the number of groups) can be kept low (e.g. around four or less) whilst still providing a sufficient number of pattern directions such that an arbitrary tilt direction will have a sufficiently large component in at least one group's pattern direction to provide movement and thereby allow the design to exhibit movement with any tilt axis. The repeating nature of the groups "spreads" each pattern direction through the design helping to lead the eye along the apparent movement. The offset adds additional order by giving the eye a direct path to follow.

In the present embodiment, since the individual regions are narrow and the groups of regions interleave with one another, the viewer cannot distinguish between groups as the device is tilted. This gives the impression that only one group working on many orientations is present, removing the visual confusion that can be caused if too many different pattern orientations are in fact present.

FIG. 17 shows a further embodiment of a security device which utilises both changes in pattern direction and changes in offset between regions. Here, the device 135 comprises multiple annular rings 136, 137 and 138 etc, each ring being divided into a series of regions. In this case, each concentric ring 136, 137 and 138 etc, represents a group of regions all having the same pattern direction. Within each ring, the different regions (136a, 136b, 136c etc) vary in offset between the two patterns $P_1$ and $P_2$ from one region to the next. The offset between the patterns $P_1$ and $P_2$ may be the same in the adjacent regions of the different groups 136, 137 and 138 etc, or could additionally vary between the groups.

A further embodiment of a security device 140 is shown in FIG. 18. Here, the device comprises a series of regions 141 to 145 identical to those described with respect to FIG. 14 above. These constitute a background area on which is superposed a further region 149, here in the shape of the digit "2". The region 149 has a pattern direction which is not parallel to that of regions 141 to 145 and is preferably substantially perpendicular. Thus, when the device is tilted in direction $TD_1$, the background area made up of regions 141 to 145 will display a moving dark/light wave effect as described previously with reference to FIG. 14. In contrast, region 149 will appear static, thus clearly delineating the outline of the digit "2". When the device is tilted in the perpendicular direction $TD_2$, the background area formed of regions 141 to 145 will appear static (but of graduated darkness levels), whilst region 149 will now display a variation in darkness level, which again is clearly apparent against the static background. Embodiments such as that shown in FIG. 18 provide a particularly effective way of combing the aforementioned movement effect with the ability to convey information such as letters, numbers, symbols and graphics etc.

FIGS. 19 and 20 depicts portions of two exemplary security devices operating on the same principles but formed with a different construction from those discussed above. In FIG. 19, a (first) pattern of elements $P_1$ is provided on one side of the transparent layer 1 using the same techniques as previously discussed. However, there is no second pattern $P_2$ and, in its place, a reflective surface 159 is provided on the opposite side of the transparent layer 1. The reflective surface can take any form but is preferably specularly reflective such that an image of the first pattern $P_1$ is created by the reflective surface 159 so as to form a "virtual" second pattern. Thus, when the device is viewed in reflection, the observer perceives the effects of two overlapping patterns in combination, in much the same way as discussed above with respect to FIGS. 1 to 18. However, since the virtual second pattern is entirely dependent on the first pattern $P_1$, it is not possible to introduce any offset between the first pattern $P_1$ and the virtual pattern reflected by surface 159. Hence, embodiments such as those based on the principles of FIGS. 9 and 12 cannot be formed using this implementation. Nonetheless, embodiments such as those described above with respect to FIGS. 4, 7 and 8 can be formed based on the same principle of providing at least two regions of the device with non-parallel pattern directions.

FIG. 19 shows a portion of the device including sections of two such regions 154 and 155. In region 154, the pattern elements 151, spaced by gaps 152, have their long axes parallel to the Y axis, whilst in region 155, the pattern elements 151 and intervening gaps 152 have their long axes at an angle of approximately 45 degrees from the Y axis. When the device is viewed from the normal (observer $O_1$), both regions 154 and 155 will exhibit their maximum brightness level (i.e. minimum level of obstruction), since the reflected virtual pattern will appear to have its pattern elements aligned precisely with those of the overlying pattern $P_1$. In other words, the two patterns will appear to be precisely non-complementary as described above with reference to FIG. 2(a). As the device is tilted in tilt direction TD (about tilt axis TA) to the position of observer $O_2$, region 154 will exhibit its maximum rate of change in obstruction level as it varies between through maxima and minima in the same manner as described previously. Region 155 will also exhibit a variation in darkness level but with a lesser rate of change since here the pattern direction is not optimised.

Thus, reflective implementations such as that shown in FIG. 19 can be used to implement any device based on the above-described principles of varying the pattern direction from one region to another, including but not limited to those shown in FIGS. 4, 7 and 8. For example, the first pattern of elements P1 can be configured as described with respect to FIG. 7 above. Thus as the device is tilted in the direction TD, the device will first take on a graduated appearance, lightest in the centre and darkest at the outside (e.g. as seen at tilt angle θ1 shown in FIG. 7(e)), and then as the tilt angle increases, the relative darkness of the three inner regions will switch (around tilt angle θ2 shown in FIG. 7(e)). This will give the appearance of a bright ring moving towards or away from the centre of the device as described previously with respect to FIG. 6.

From off-axis viewing positions, the device will also exhibit a different dynamic appearance when the tilt direction is changed (i.e. the device is rotated relative to the viewer through an angle Δφ). This is because different ones of the regions will become optimally orientated for maximum rate of change in obstruction level as the tilt direction is changed. For example, as already described, when viewed from a non-zero tilt angle (e.g. θ1) in the direction TD, the centre region will display the fastest change in darkness of the four regions. However, if tilted in the perpendicular direction, the elongate pattern elements of the centre region will now be parallel to the tilt direction and display no darkness variation (FIG. 7(d)(iv)), appearing dark at all tilt angles θ. Hence as the device is rotated to change the tilt direction, the region of the device with the fastest rate of change of obstruction level will change from one region to the next. This will appear as a dark/light "wave" moving towards or away from the centre of the device in a similar way to that described above, although in this case all regions of the device will take part in the variation.

In some devices, this "rotational" dynamic effect may be more readily observed than motion from tilting alone since, unless a very low Q:d ratio is achieved (giving very "fast" variations upon tilting), typically motion will be apparent upon a smaller change in viewing position (i.e. change in φ) as compared with tilting the device in a constant direction (i.e. change in θ). Indeed, in embodiments with larger Q:d ratios (e.g. around 2:1 or greater for a device with a refractive index of 1.5), motion may only be visible when the device is rotated and not during tilting alone.

FIG. 20 shows a further embodiment 150' making use of a reflective surface 159 but in this case, two patterns of elements $P_1$ and $P_2$ are provided, as in any of the embodiments discussed in relation to FIGS. 1 to 18. Pattern $P_1$ is formed on a first surface of transparent layer 1 and pattern $P_2$ is formed adjacent the other, either on the transparent layer 1 or on reflective surface 159 which is provided alongside the transparent layer 1. In addition to patterns $P_1$ and $P_2$, an observer O will see a reflected version of pattern $P_1$ located a distance behind the actual location of reflective layer 159. Since pattern $P_2$ is positioned against the reflective surface 159, there will be no parallax between its original and reflected image, and pattern $P_2$ alone therefore has no optically variable properties although may appear doubled in optical density.

The device 150' is divided into regions 156, 157, 158 . . . and here the pattern direction is the same in each region although in other cases this may also vary as discussed in relation to FIG. 19. The lateral offset, S, between patterns $P_1$ and $P_2$ however varies from one region to another. In region 156, the pattern elements are precisely non-complementary, corresponding to an offset of zero. In region 157, the elements of pattern $P_2$ have been shifted in the x direction resulting in an offset of L/4 (L=linewidth). In regions 158, the offset is increased to L/2 and 3L/4, respectively.

When viewed from the normal, the device will have an appearance similar to that shown in FIG. 9(b) above, with the left most region 156 appearing bright and the rightmost region relatively dark due to the differing offset. When tilted in the direction TD, the offset variation will cause the appearance to change towards that shown in FIG. 9(a), with the bright/dark regions moving as a "wave" across the device as before. However, this effect will be modulated by a superimposed dark/bright variation due to the interaction between pattern $P_1$ and its reflection $P_1'$. In this case, since there is no variation in pattern direction across the device, this modulation will cause the whole device to appear dark at one or more viewing positions whereas at other positions, the gradation and moving "wave" effect will be visible to a greater or lesser extent. Of course, the nature of the superimposed variation will also depend on factors such as the Q:d ratio of the device and the refractive index, as before.

In other cases, the pattern direction may also vary across the device in which case the superimposed modulation will also move across the device in the manner described in relation to FIG. 19. Particularly complex visual effects can therefore be achieved.

The reflective surface 159 may comprise a reflective layer formed of a suitable material, which may be applied to or positioned to adjacent the surface of transparent layer 1. Examples of suitable reflective materials include vapour deposited metallic coatings (such as vapour deposited aluminium, silver, nickel, gold or copper), metal or metallic-like inks, vapour deposited high refractive index (HRI) dielectric materials (for example, ZnS), vapour deposited thin film interference structures or other reflective optically variable materials or structures. If desired, the layer can be made semi-transparent by applying the material as a thin layer or as a screen, for example. Alternatively, the reflective material itself may be visually transparent but of a sufficiently different refractive index from that of transparent layer 1 such that reflection will occur at the interface. Suitable substances include high refractive index (HRI) materials such as ZnS.

Another embodiment with a similar construction to that of FIG. 19 is shown in FIG. 21. As mentioned previously, in all embodiments the pattern elements can be formed of multiple layers and this embodiment makes particular use of such implementations. FIG. 21(a) shows the security device 220 in plan view, from the perspective of an observer viewing the device along its normal (along the z axis), and FIGS. 21(b) and (c) show a cross-section through a portion of the device along the line Q-Q'. The first pattern $P_1$ comprises an arrangement of line elements 225 spaced by gaps 226, arranged on a transparent layer 1 having a reflective layer 229 on the opposite surface (see FIG. 21(b)). In one example, the line width of the elements 225 may be about 30 microns and the width of the gaps 226 may be similar. In a first region 221 of the device, which here forms the shape of a "heart" symbol, the line elements are aligned along the x axis of the device. In a second region 222 of the device, which here surrounds the first region 221 to appear as a background to the heart symbol, the line elements are aligned with the y axis. Thus, here the pattern elements in the two regions are at 90 degrees to each other, although the two pattern directions could in fact make any non-zero angle (as in previous embodiments).

Each pattern element 225 is formed of multiple layers: in this case, there are two layers but more could be provided if desired. The multiple layers could be formed in various ways. For example, the pattern $P_1$ could be laid down in two or more registered print workings, each working laying down a layer of ink on top of the last. However, in a particularly preferred implementation, the pattern $P_1$ is formed by a demetallisation process. Thus, a transparent layer 230 is coated with a metallic layer 225a, e.g. by vacuum deposition of aluminium, nickel, copper, bronze or any other suitable metal or alloy. The pattern $P_1$ of line elements 225 is then printed onto the metallic layer using a resist material 225b. The resist material is may be opaque or semi-transparent, but has a different appearance from that of the metallic layer. For instance, the resist material may be semi-transparent with a coloured tint, e.g. red. The construction is then demetallised, e.g. in an etchant bath, which removes those areas of the metallic layer which are not covered by resist material. This results in line elements 225 each having a layer of metal 225a and a layer of resist 225b, exactly in register with one another.

To complete the device, in this example the above-described structure is laminated to a second transparent layer 1 using a transparent adhesive layer 231, as shown in FIG. 21(b). On the opposite surface of transparent layer 1, a reflective layer 229 is provided, either applied directly to the surface of the transparent layer 1 or on an adjacent component which is arranged to abut the layer.

When the device 220 is viewed through the transparent layer 230, from the position of observer $O_1$ shown in FIG. 21(c), i.e. along the device normal, the upper, metallic layer 225a of the line elements 225 conceal the presence of the coloured resist layer and the observer sees no contrast between the regions 221 and 222. Since light will be reflected by the surface 229 through all the gaps 226 between line elements 225, at this viewing angle both regions will display their minimum "obstruction" level. As the device is tilted in the direction TD (i.e. about the x axis), to the position of observer $O_2$, the reflected image of the line elements 225 will become visible in the first region due to the same mechanism described above, effectively filling in the gaps 226 from the point of view of the observer. However, since the innermost layer of the line elements 225 (i.e. that facing the reflective layer 229) is coloured resist layer 225b, the reflected image of the pattern P$_1$ will have a different appearance, preferably a different colour, from the "real" pattern P$_1$. For example, where the metallic layer 225a is aluminium and the resist material 225b is a transparent resist with a red tint, the pattern P$_1$ will appear silvery in colour whilst the reflected pattern appears red. Thus, observer O$_2$ will see the heart-shaped region 221 change from silver to red as the device is tilted in direction TD, and if tilting continues the region will display cyclical changes as described in previous embodiments. The background region 222 will meanwhile appear unchanging as the device is tilted in this direction, since here the tilt direction is aligned with the long direction of the line elements 225. As a result the heart-shaped region 221 will be seen to appear in a contrasting colour against the background region 222 at certain angles of tilt. Similarly, when the device is tilted in the opposite direction, about the y axis, the heart-shaped region 221 will now appear static whilst the background region 222 appears to change in colour.

A similar effect could be achieved by forming the multi-layered line elements 225 on transparent layer 230 in the same way as described above, and providing a reflective layer on the opposite side of layer 230 (instead of laminating the construction to layer 1 as depicted). In this case the device would need to be viewed from the resist side 225b of the line elements, so the on-axis appearance would be coloured, and the reflected image would be that of the metallic layer 225a. When the device is tilted, the colour intensity of the active region would be reduced as the reflected pattern becomes visible, again giving rise to a contrast between the regions, albeit of lesser visual impact than that of the construction depicted in FIG. 21.

The resist colour could be the same in both regions 221 and 222 of the device, or could be different. The latter has the advantage that the device will reveal different colours depending on the direction of tilt. For example, if the resist layer 225b is red in heart-shaped region 221, and blue in background region 222, assuming the metallic layer 225a is silver in appearance across both regions, then as the device is tilted away from the normal in direction TD, the heart shaped region 221 will appear to change from silver to red, whilst the background region will remain silver. If the device is tilted away from the normal in the perpendicular direction, the background region 222 will change from silver to blue whilst the heart-shaped region 221 will remain silver.

In a variant of this embodiment, the innermost layer of the multi-layered line elements 225 (e.g. resist layer 225b in FIG. 21) could contain a photo-responsive substance such as a fluorescent material. In this case the observation of the fluorescent response would depend both on the viewing position of the observer and on the presence and position of a suitable excitation source, e.g. UV light. If the device is viewed along its normal, as before, the layer containing the fluorescent material will be obscured and the two regions will not exhibit contrast. When tilted about the x axis, as before the obstruction level of the heart-shaped region 221 will change, depending on the appearance of resist layer 225b. If resist layer 225b is clear and transparent when viewed under only visible light, then under normal lighting conditions tilting the device will produce the same change in darkness level of region 221 as the tilt angle changes. However if the resist layer also contains a UV-responsive fluorescent substance, when an excitation source is directed at the device (from an off-axis position), the resist layer will fluoresce in response to UV radiation received by reflection off surface 229. Thus the reflected image of the line elements will appear to fluoresce and the heart-shaped region 221 will appear fluorescent, presenting a strong contrast against background region 222 which will remain visually static as before. Again, the reverse is true when the device is tilted about the y axis.

In addition, this embodiment permits a change in appearance to be viewed when the viewing angle remains stationary: provided the device is being viewed at an off-axis position (i.e. not along the device normal), moving the excitation source (e.g. UV lamp) relative to the device will produce a change in appearance of one or other of the regions. For instance, if the device 220 is being viewed by observer O$_2$ in FIG. 21(c), the image of pattern P$_1$ is visible in the heart-shaped region 221 but not in background region 222. If the UV source is moved to a position at which the innermost layer 225b of the line elements can receive reflected UV light via the reflective surface 229, the heart-shaped region will appear to fluoresce, whereas if the UV source is moved to a position at which the layer 225b does not receive reflected UV light, there will be no fluorescent response and the same region 221 will not fluoresce.

It should be appreciated that in all implementations of the FIG. 21 embodiment, the direction of the pattern elements 225 in the two regions 221 and 222 need not be perpendicular to each other. However this is preferred since this will produce the strongest contrast upon tilting. In addition, the pattern elements need not be line elements: any other pattern could be used such as a regular dot pattern as discussed further below.

In reflective variants of the security device, such as those shown in FIGS. 19, 20 and 21, the reflective surface can optionally be patterned to form additional indicia. For example, if a vapour deposited metallic layer is used to provide the reflective surface, then parts of this layer can be demetallised to define images. The images themselves may be positive (i.e. be formed from the metallic regions) or negative (i.e. formed from the demetallised regions). The images created by demetallisation can be viewed in reflected light but more preferably in transmitted light.

One way to produce partially metallised/demetallised films in which no metal is present in controlled and clearly defined areas, is to selectively demetallise regions using a resist and etch technique such as is described in U.S. Pat. No. 4,652,015. Other techniques for achieving similar effects include, for example, vacuum depositing a metal such as aluminium through a mask, or a metal (e.g. aluminium) can be selectively removed from a composite strip of a plastic carrier and the metal using an excimer laser. The metallic regions may be alternatively provided by printing a metal effect ink having a metallic appearance such as Metalstar® inks sold by Eckart and in this case the images are formed by patterning the printed layer.

Additional effects could be provided by forming the reflective layer of two or more reflective materials arranged in laterally offset regions from one another, defining for example a spatial pattern, image, text, numbers or the like. For instance, two metals with different appearances (e.g. copper and aluminium) could be deposited alongside one another to define any desired image. The Reflected colour would then vary in accordance with the desired image across the device.

The reflective layer could also be utilised to combine additional security features with the optically variable effect discussed above. For example, the reflective layer could be provided with a diffractive structure such as a diffraction grating or a hologram. In one implementation, an appropriate relief structure could be embossed or cast into the surface of the transparent layer 1 (opposite from that to which pattern $P_1$ is applied), and subsequently metallised or coated with a suitable reflective material, to give rise to a diffraction effect. This may be apparent as a rainbow of different diffracted colours of light or as a holographic image, the replay of which is obstructed to a greater or lesser extent by the pattern(s) $P_1$ (and $P_2$ if present) in the manner described above.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake nickel materials can be used; in addition iron flake materials are suitable. Typical nickel flakes have lateral dimensions in the range 5 to 50 microns and a thickness less than 2 microns. Typical iron flakes have lateral dimensions in the range 10 to 30 microns and a thickness less than 2 microns. Magnetic materials could also or alternatively be provided in the pattern elements making up any of the patterns described.

A further embodiment of a security device 146 will now be described with reference to FIG. 22 which shows one of the patterns $P_1$ forming the device, in plan view. In practice, two patterns of elements $P_1$ and $P_2$ will be provided on either side of a transparent layer in the same way as described above. In this case both patterns comprise line elements arranged parallel to one another. The device has five regions 147a, b, c, d and e, and in pattern $P_1$ as shown, the pattern is laterally shifted in the x direction between each region. The second pattern $P_2$ (not shown) is uniform across the device with no shift between each region. The result is a change in lateral offset between the patterns $P_1$ and $P_2$ in each region in a similar manner as described with respect to FIG. 14 above (although here the offset is achieved via one of the patterns only). When the device is tilted in direction TD, a dark/bright "wave" motion will be exhibited towards and away from the centre of the device as described previously.

As mentioned above, devices of this sort are relatively tolerant to misregister between the first and second patterns, particularly misregister in the x or y directions. For example, if there is a misregister along the x-axis, the location of the darkest and brightest regions will simply be shifted along the device when viewed from the normal, and when tilted the expected motion will be exhibited. This is beneficial in that manufacturing is simplified but also poses less difficulty to the would-be counterfeiter.

The present embodiment therefore includes a number of cut-out zones 148 which act to reduce the tolerance of the device to misregister. Each of the patterns $P_1$, $P_2$, includes matching cut-out zones 148 of the same shape and size (here representing the digit "2"), in registration with one another such that the cut-out zone(s) of each pattern are aligned with those of the other. Each cut-out zone is a gap in the respective pattern $P_1$, $P_2$ into which no pattern elements extend, the periphery of the zone being defined by the pattern.

In a genuine device, the cut-out zones 148 of each pattern will be aligned allowing full transmission of light therethrough (or full reflection if the device is constructed with a reflective layer as discussed with respect to FIGS. 19 to 21). The cut-out zones therefore appear bright to the observer at least when the device is viewed from the normal and generally will remain bright as the device is tilted through a relatively large tilt angle (sufficient to view at least some of the motion effect described above). If however, the correct level of registration is not achieved, for example in a counterfeit device, the visibility of the cut-outs will be reduced or eliminated, since each zone will be overlapped by the other pattern $P_1$ or $P_2$ at least to an extent. Thus the difficulty of producing a good imitation of the device is significantly increased.

To ensure that the device cannot be easily imitated, each cut-out zone should include an area of sufficiently small dimension around the size of the registration tolerance achievable using a professional manufacturing system, and significantly less than that achievable using amateur equipment. For instance, in preferred examples, the cut-out zone has a minimum dimension less than or equal to 5 mm, preferably less than or equal to 3 mm, more preferably less than or equal to 1 mm, still preferably less than or equal to 0.5 mm, most preferably less than or equal to 250 microns. For comparison, typical professional lithographic processes can achieve registration to around 200 microns whilst ink-jet printers of the sort which may be available to would-be counterfeiters may be limited to around +/−1 mm for example.

Preferably, the cut-out zones include one or more lines extending in more than one direction in the plane of the device. This could be achieved for instance via a single line including a bend or corner, or a curved line (e.g. a circular outline), or via at least two spaced straight lines. The line width of each line is preferably within the ranges described above. By providing multiple directions within the cut-out zones, mis-registration in any direction will be detectable since at least one of the lines (or a portion thereof) will have its appearance affected by mis-registration.

In the present example, the minimum dimension of the zones 148 is represented by the linewidth of the digit "2" forming each cut out zone. The cut out zones could take any shape, e.g. fine line patterns, guilloches etc, but preferably represent items of information such as numbers, letters or symbols, for ease of recognition. As in the present case, the cut-out zones themselves could represent only a portion of a larger pattern or item of information: here, only the top half of each digit "2" is defined by the cut-out zones 148 with the bottom half being delimited by an outline 148a which may be extended around the whole of the item. This arrangement draws attention to the feature since it will be readily apparent if the bottom half of each digit "2" is visible and the top half is missing (due to misregistration). The cut-out zones could also be adjoined to an edge of the device (as shown) or could be surrounded on all sides by the patters $P_1$, $P_2$.

In all cases, whilst it is preferred that the whole of each cut-out zone matches the other, in practice this is not essential provided a portion of each cut-out zone is matched by a portion of the other. For example, in the FIG. 22 embodiment, the cut-out zones in pattern $P_1$ may extend beyond the shape of the digit "2" shown (e.g. to include serifs on the digit), whilst those of the second pattern $P_2$ do not. However, the matching portions of the cut-outs (e.g. the portion of the "2" extending between the serifs) will reveal any misalignment.

Cut-out zones of the sort described above can be utilised in any of the preceding embodiments. However, they can also be used to reduce the registration tolerance of any other security device formed of two patterns separated by a transparent layer, such as moiré interference devices. Further examples of devices to which the cut-out zones could be usefully applied are disclosed in our British Patent application no. 1117523.9.

In all of the above examples, to illustrate the mechanisms on which the devices operate, the patterns $P_1$ and $P_2$ have been shown as line patterns. However, as mentioned previously with respect to FIGS. 2(b) and (c), this is not essential and in fact any periodic pattern of elements could be used, provided that the first and second patterns $P_1$ and $P_2$ are able to substantially tessellate with one another when moved to appropriate relative positions (or, in the case of reflective implementations as described with respect to FIGS. 19 to 21, that the pattern $P_1$ is able to self-tessellate with a copy of itself). In the case of line patterns, the tessellation is exact (or nearly exact), meaning that at the viewing position(s) at which the maximum level of obstruction is exhibited, substantially the whole area of the device region in question will obstruct the passage of light therethrough by the presence of a pattern element of the first pattern $P_1$ or of the second pattern $P_2$.

Figure 23A:
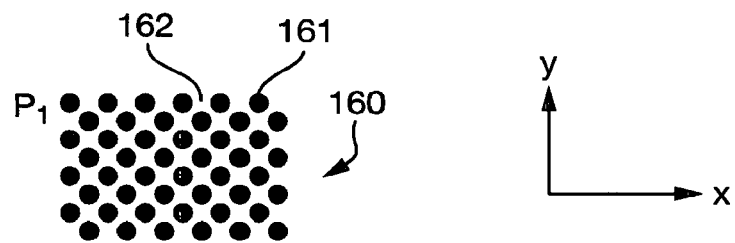
Figure 23B:
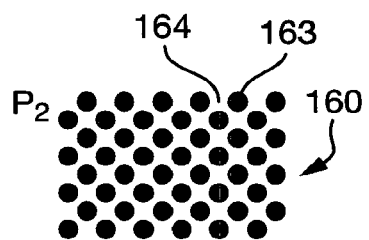
Figure 23C:
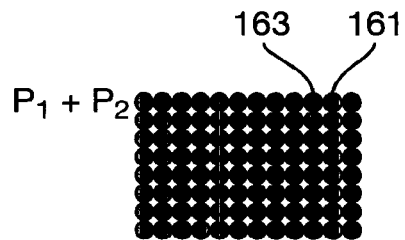
Figure 23D:
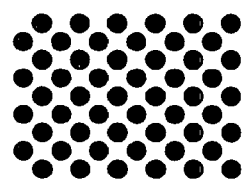

However, it is not essential that the patterns tessellate to such an extent. For example, FIG. 23 depicts exemplary dot patterns which could be used in any of the embodiments. FIG. 23(a) shows a first pattern $P_1$ of dot elements 161 arranged on a close packed grid. The gaps between the dots 161 form a continuum, labelled 162. The second pattern $P_2$ is identical to the first but arranged with the dot elements 163 in opposite positions as compared with pattern $P_1$. The result is that when the two patterns $P_1$ and $P_2$ are viewed together from the normal, as shown in FIG. 23(c), the two sets of dot elements 161 and 163 combine to fill the vast majority of the device, thus presenting a significantly higher level of obstruction than obtained when either one of the patterns $P_1$ and $P_2$ is viewed alone: this is the region's maximum obstruction level. As the device is tilted in the direction X or Y, the two patterns $P_1$ and $P_2$ will appear to move relative to one another until a certain tilt angle at which the dot elements will precisely align with one another (i.e. appear precisely non-complementary): this represents the region's minimum obstruction level. At positions between the normal and that depicted in FIG. 23(d), the two sets of dot elements will overlap one another to a greater or lesser extent, as shown for example in FIG. 23(f), resulting in an intermediate obstruction level.

Figure 23E:
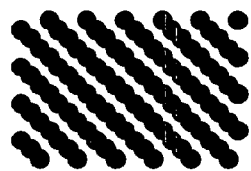
Figure 23F:
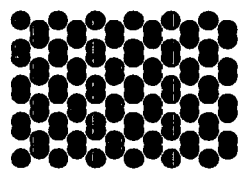
Figure 23G:
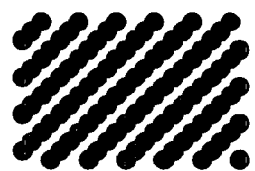

When the device is tilted at an angle between the X and Y axis, different intermediate obstruction levels will be attained as shown for example in FIGS. 23(e) and (g), which show the results of tilting in a direction at approximately +45 degrees and −45 degrees to the Y axis, respectively.

FIG. 24 shows two further examples of patterns of dot elements that could be used in any of the above embodiments. Here, the dot elements are arranged on a regular square grid. In the example depicted in FIGS. 24(a) and (b), the patterns $P_1$ and $P_2$ are precisely non-complementary, with the dot elements 171 of pattern $P_1$ exactly aligned with the dot elements 173 of pattern $P_2$. As such, when the device is viewed from the normal, as shown in FIG. 24(c), the elements 171 of pattern $P_1$ will precisely occlude the elements 173 of pattern $P_2$, and the region will exhibit the minimum level of obstruction. When the device is tilted in the direction $TD_1$, at 45 degrees to the X and Y axes, the elements 173 of pattern $P_2$ will appear in the gaps of the first pattern $P_1$, causing the device to exhibit its maximum level of obstruction.

Figure 24A:
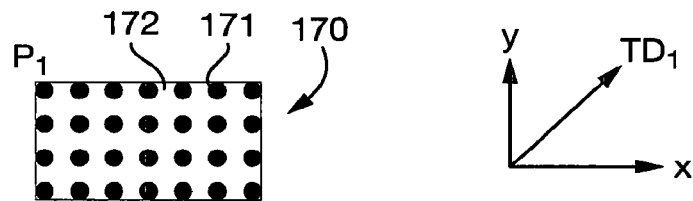
Figure 24B:
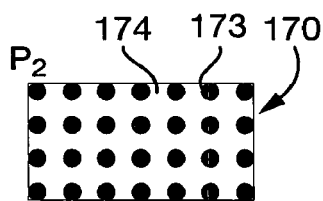
Figure 24C:
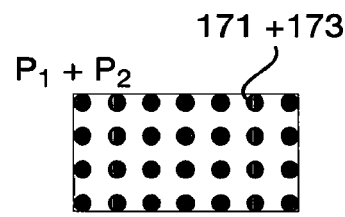
Figure 24D:
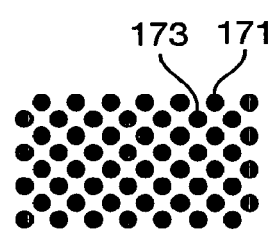
Figure 24E:
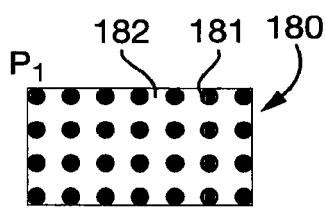
Figure 24F:
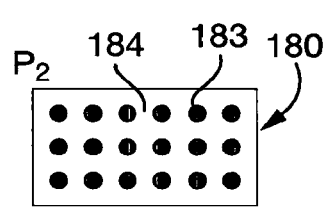
Figure 24G:
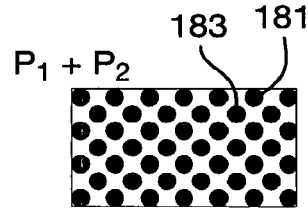
Figure 24H:
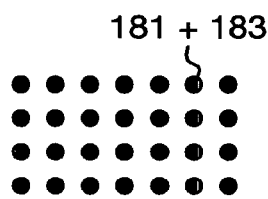

The example depicted in FIGS. 24(e) and (f) provides the opposite result, since here the elements 183 of the second pattern $P_2$ sit in the gaps between the elements 181 of the first pattern $P_1$ when the device is viewed from the normal (FIG. 24(g)), hence resenting the device's maximum obstruction level. When the device is tilted in direction $TD_1$ to a suitably large tilt angle, the two patterns come into alignment with one another such that the device exhibits its minimum level of obstruction.

Figure 24I:
Figure 24J:
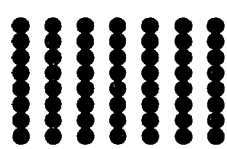
Figure 24K:

When the devices shown in FIGS. 24(a), (b), (e) and (f) are tilted along the X and Y axes, various intermediate levels of obstruction are displayed. For example, when the device of FIGS. 24(a) and (b) is tilted in the X direction, the result is shown in FIG. 24(i) and overall the level of obstruction is increased relative to that perceived when viewed from the normal. Likewise, when the device is tilted in the Y direction, the result is shown in FIG. 24(j), and the same obstruction level occurs. Intermediate obstruction levels will also be obtained when the device is tilted in the $TD_1$ direction by a small amount, as shown in FIG. 24(k).

Of course, the dot elements could take any shape and need not be circular as depicted in the Figures. For example, each dot element could be triangular, square, oval or represent an indicia such as a number, letter or other symbol. The dot elements may also be elongate, for example, arranged to form lines in any desirable direction.

Many other patterns could also be utilised. For example, each pattern could comprise a series of curved lines, zig zag lines or checkerboard patterns formed of squares, triangles, hexagons or any other appropriate shapes. "Line" elements could also contain negative indicia defined by gaps, or could themselves be formed by a series of positive indicia (joined up or not). "Dot" elements could also define negative indicia therewithin. It should also be appreciated that the two patterns $P_1$ and $P_2$ need not be identical to one another. For example, the first pattern $P_1$ may comprise a circular dot pattern such as that shown for example in FIG. 24(a), and the second pattern $P_2$ may comprise an array of annulus-shaped elements, such that at certain viewing angles the dot elements of the first pattern appear to fill the central gap of each annulus of the second pattern.

As noted above, the pattern should be periodic in at least one direction in order that the aforementioned variation in obstruction level will be attained. However, the periodicity of the pattern need not be constant across the whole device. Rather, at any one location across the device, the periodicity of the first pattern $P_1$ should be approximately the same as that of the second pattern $P_2$. For example, the periodicity within one region of the device may be different from that in another. Varying the periodicity of the patterns across the device in this manner may be used to speed up or slow down the apparent rate of motion of the effects described above, since a smaller pitch will decrease the value of the ratio R (=Q/d) described above. Thus, the patterns may be arranged such that for several adjacent regions of the device, the pitch is constant and the motion appears to move at a first pre-determined rate (relative to the angle of tilt), whereas in another series of regions the pitch is lower such that the motion appears to accelerate when the interface between the two sets of regions is reached.

Preferably the two patterns $P_1$ and $P_2$ are sized and orientated relative to one another so as to minimise or preferably eliminate any moiré effects which might otherwise be caused by mis-match between the patterns, since this may otherwise reduce the visual effect of the device. However in other embodiments such mismatch may be purposefully introduced in order to provide an additional moiré effect (e.g. visible as bands). Methods for reducing or eliminating moiré interference between two patterns are well known in the art.

The ratio of the area of each pattern covered by pattern elements to that of the intervening spaces (or secondary elements as mentioned above) may also be varied across the device. Increasing the proportion of the pattern covered by pattern elements will tend to increase the overall obstruction level in the locality, no matter what the angle of tilt. Hence, one or both of the patterns may be formed as a screened image of screen elements, the weight of those elements relative to their surroundings being varied in order to convey information such as text, symbols or graphics. For example, the element weight could be varied, so as to exhibit an image (e.g. a multi-tonal image) across the device. The features forming the image will remain static as the device is tilted whilst the above-described visual effects will be apparent as a background.

The device may optionally be provided with an overlying or underlying graphics layer such as a print, e.g. for adding outlines or defining images on the device, which outlines may or may not align with interfaces between the aforementioned regions.

As already mentioned, in some preferred embodiments the pattern elements are spaced by gaps (i.e. the absence of any pattern elements) and are preferably substantially opaque such that a change in the level of obstruction appears as a change in darkness when the device is viewed in transmitted light (or reflected light in the case of the FIGS. 19, 20 and 21 embodiments). However, the pattern elements could be semi-transparent, e.g. having a coloured tint, in which case the change in level of obstruction would appear as a variation in the tone of the colour from a light shade when the minimum obstruction level is exhibited, to a more intense shade of the same colour when the maximum level of obstruction is exhibited. This essentially amounts to colour mixing between elements of one colour and colourless gaps which will dilute the colour of the elements when visible.

In a variation of this embodiment, the first and second patterns could be formed of different colours, or one could be of opaque elements whilst the other has semi-transparent coloured elements. In this latter case, the change in the level of obstruction would be seen as a change from a light, colourless appearance (e.g. grey) to a coloured appearance of similar darkness level when the opaque elements and coloured elements are viewable along side one another.

As described in relation to FIG. 21 in detail, the pattern elements could be formed of multiple layers, in which case it is preferable that the outermost layer (that facing the observer) and the innermost layer (that facing the interior of the device) are different in appearance, e.g. different colours. Whilst this has been described primarily in relation to a "reflective" embodiment, this is applicable to all embodiments and in embodiments in which the visual effects can be viewed from either side (e.g. FIGS. 1 to 18), has the advantage that, if desired, the colour appearance of the device can be configured to be different when viewed from either side of the device. The colours of the pattern elements (whether multilayered or not) can also be arranged to be different in different regions of the device.

In yet further embodiments, the spaces between the pattern elements could themselves be coloured and thus form "secondary" contrasting pattern elements as described above. For example, where each of the two patterns $P_1$ and $P_2$ comprises yellow and blue alternating semi-transparent stripes (line elements), various shades of yellow, blue and green will be apparent as the device is tilted.

In all cases, the maximum level of obstruction is obtained when the primary elements of the two patterns $P_1$ and $P_2$ appear to be precisely complementary to one another and, in the case of patterns which include secondary elements of the sort described above, this will be the case when the primary elements of one pattern appear aligned with (i.e. occluded by) the secondary elements of the other.

To further enhance the security of the device, some or all of the pattern elements (and/or secondary pattern elements) of the first and/or second pattern could comprise a security substance such as luminescent material, fluorescent material, thermochromic material, UV responsive material, magnetic material, birefringent material or polarising material. This provides an additional feature which can be checked to confirm the device's authenticity. Similarly, the transparent layer could have a coloured tint and/or comprise a security substance such as luminescent material, fluorescent material, thermochromic material, UV responsive material, birefringent material or polarising material. In one preferred example, a transparent magnetic ink such as those described in GB-A-2387812 and GB-A-2387813 may be used to provide the machine readability. Alternatively a machine readable aspect may be provided by the introduction of separate machine-readable layers.

Security devices of the sorts described above can be utilised in many different ways. For example, reflective versions such as those described with respect to FIG. 19, 20 or 21 may be formed as a transfer foil or label and applied as a indication of authenticity to any desired object, such as a document of value but alternatively merchandise such as CD's, computer equipment, clothing etc. Embodiments which operate on the basis of transmission of light from one side of the device to the other are preferably situated in a window, which may for example form part of a tag for attachment to such an object.

Preferably, in some cases the security device forms part of a security article, such as a security thread, patch, foil or strip, for application to or incorporation into a security document. In other examples, the security device may be formed directly on (i.e. integrally with) the security document.

The security device or article can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security device or article may be subsequently incorporated into a paper or polymer base substrate so that it is viewable from both sides of the finished security substrate. Methods of incorporating security elements in such a manner are described in EP-A-1141480 and WO-A-03054297.

In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

FIGS. 25 and 26 provide some examples of security documents 200, such as bank notes, having security devices of the sort described above. FIG. 25a (i) shows a security document 200 in plan view with a security device 190. FIG. 25a (ii) shows the same security document in cross-section. Here, the security document is a polymer bank note, comprising a polymeric substrate 201 which is visually transparent, at least in the region of security device 190. An opacifying coating 202 is applied to either surface of the transparent substrate 201 and may carry printing as well as other optional security features such as holographic labels. The first and second patterns $P_1$ and $P_2$ are applied to either side of the transparent layer 201 in the region of a window which is formed by locally omitting the opacifying layers. The patterns $P_1$ and $P_2$ may be formed through any desirable process such as printing or metallisation, as described above. The patterns $P_1$ and $P_2$ may be applied to the substrate 201 before or after the opacifying coating 202 is applied. Preferably, the patterns $P_1$ and $P_2$ are applied simultaneously, e.g. by lithographic or offset printing, using a Simultan™ press by KBA Giori for instance The same process could be used in respect of any security document comprising a visually transparent integral portion, e.g. an ID card or driver's licence, or a laminated page of a passport booklet.

FIG. 25b (1) shows a security document 200 such as a banknote having a window security thread 192 of which portions 191 are visible. In this example, the security thread 192 comprises a security device formed in the manner described with respect to FIG. 19, 20 or 21, including a reflective layer 9. The thread 192 can be incorporated into a fibrous (e.g. paper) document using the method described in EP-A-0059056 to implant the thread within a single ply in a windowed manner. In this case, items 203 and 204 of FIG. 25(b) represent two portions of the same substrate ply. The effects exhibited by thread 192 are visible when the device is viewed in reflection.

In a variant of this implementation, alternatively, the thread 192 is incorporated into the document between two document plies 203 and 204, formed for example of paper, which are then joined. Document ply 203 comprises apertures which may be formed before or after the two plies are joined. In preferred examples, the apertures are formed by grinding the ply 203 after construction of the multilayer structure. The effects exhibited by thread 192 are visible when the device is viewed in reflection. In a variant of this implementation, the thread 192 could be designed to operate in transmission (e.g. using the embodiments of any FIGS. 1 to 18), with apertures being formed in both plies of the documents 203 and 204, which at least partially overlap one another.

A similar embodiment is shown in FIG. 25(c) where FIG. 25(c) (i) shows a plan view of the security document 200 such as a banknote with a security device 194 formed on a strip 193 embedded into the document. The strip 193 is adhered between plies 205 and 206, each of which contains an aperture leaving a window region in which the device 194 is visible.

A further embodiment is shown in FIG. 26, where FIGS. 26(a) and (b) show the front and rear sides of the document respectively, and FIG. 26(c) is a cross section along line Z-Z'. Security article 195 is a strip or band comprising a security device according to any of the embodiments described above. The security article 195 is formed into a security document 200 comprising a fibrous substrate 211, using a method described in EP-A-1141480. The strip is incorporated into the security document such that it is fully exposed on one side of the document (FIG. 26(a)) and exposed in one or more windows 210 on the opposite side of the document (FIG. 26(b)).

The invention claimed is:

1. A security device comprising a first pattern of elements and a reflective surface spaced by a transparent layer, the reflective surface providing a virtual pattern in the form of a reflected image of the first pattern of elements, the first pattern of elements obstructing the passage of light reflected to a viewer by the device to a varying degree depending on the viewing position, wherein the first pattern of elements is configured to define at least three regions of the device, where each of the at least three regions exhibits a maximum rate of change in the degree of obstruction with tilt angle when the device is tilted relative to the viewer about different respective tilt axes, whereby as the tilt direction is changed relative to the viewer, a different one of the at least three regions of the first group exhibits its maximum degree of obstruction in turn; the first pattern of elements comprising:

a first region that exhibits a maximum rate of change in the degree of obstruction with tilt angle when the device is tilted relative to the viewer about a first tilt axis, and a second region that exhibits a maximum rate of change in the degree of obstruction with tilt angle when the device is tilted relative to the viewer about a second tilt axis which is not parallel to the first tilt axis, wherein the at least three regions are adjacent to each other and comprise the first and second regions, and each respective pattern direction of the at least three adjacent regions makes an angle with a reference direction which successively increases from one region to the next adjacent region in series, whereby as the tilt direction is changed relative to the viewer, the adjacent regions exhibit their maximum or minimum obstruction in sequence; and the first pattern of elements is configured such that upon tilting or rotating the device, the maximum degree of obstruction exhibited by the device appears to move from one region of the at least three adjacent regions to the next adjacent region as a wave across or around the device.

2. A security device according to claim 1, wherein when the device is tilted about the first tilt axis, and the second region of the device exhibits substantially no change in the degree of obstruction.

3. A security device according to claim 1, wherein the first and second tilt axes are substantially perpendicular to one another.

4. A security device according to claim 1, wherein the first and second regions exhibit substantially no contrast between them when the device is viewed from the normal position.

5. A security device according to claim 1, wherein for each region, the tilt axis about which the region exhibits a maximum rate of change in the degree of obstruction exhibited with tilt angle is determined by a pattern direction of the region, lying in the plane of the device, which pattern direction is defined by anisotropy of the first pattern of elements, the pattern direction of the first region being non-parallel to that of the second region.

6. A security device according to claim 5, wherein the pattern direction of the first region makes an angle of between 5 and 90 degrees with that of the second region.

7. A security device according to claim 1, wherein the first and second regions abut one another or are spaced from one another by no more than 1 cm.

8. A security device according to claim 1, wherein the first region or the second region, or both in combination, define one or more items of information selected from the group consisting of a letter, digit, symbol, image, graphic and alphanumerical text.

9. A security device according to claim 1, wherein the first region surrounds at least a part, of the second region.

10. A security device according to claim 1, wherein the first and/or second region comprises a plurality of sub-regions, each sub-region forming part of one region exhibiting the same variation in degree of obstruction as the device is tilted.

11. A security device according to claim 1, wherein the pattern is configured such that, as the viewing position is changed, a respective maxima viewing position or a respective minima viewing position for each of the at least three regions of the first group is reached in the same order as that in which the corresponding regions are arranged spatially across the device in a first continuous direction.

12. A security device according to claim 1, wherein the tilt axes about which each respective region exhibits its maximum rate of change in degree of obstruction with tilt angle lie at angles which successively increase relative to a reference direction from one region to the next adjacent region in series, whereby as the tilt direction is changed relative to the viewer, adjacent regions exhibit their maximum or minimum obstruction in sequence.

13. A security device according to claim 1, wherein at least one of the at least three regions of the first group is located between the first and second regions.

14. A security device according to claim 13, wherein the first group comprises N regions, of which (N−2) regions are located between the first and second regions, the respective tilt axes about which each of the N regions exhibits its maximum rate of change in obstruction with tilt angle being angularly separated from one another by approximately 90/(N−1) degrees.

15. A security device according to claim 14, wherein the angle of the respective tilt axes about which each of the N regions of the first group exhibits its maximum rate of change in obstruction with tilt angle, relative to that of the first region, increases from each region to the next region of the first group towards the second region.

16. A security device according to claim 1, wherein the elements of the first pattern are formed of multiple layers, where the appearance of the outermost layer is different from that of the innermost layer facing the transparent layer.

17. A security device according to claim 1, wherein the reflective surface is specularly reflective.

18. A security device according to claim 1, wherein the reflective surface comprises a reflective layer adjacent the transparent layer.

19. A security article comprising a security device according to claim 1, wherein the security article is a member selected from the group consisting of a security thread, strip, patch, label and transfer foil.

20. A security device comprising a first pattern of elements and a reflective surface spaced by a transparent layer, the reflective surface providing a virtual pattern in the form of a reflected image of the first pattern of elements, the first pattern of elements obstructing the passage of light reflected to a viewer by the device to a varying degree depending on the viewing position, wherein the first pattern of elements is configured to define at least three regions of the device, of which a first region exhibits a maximum rate of change in the degree of obstruction with tilt angle when the device is tilted relative to the viewer about a first tilt axis, and a second region exhibits a maximum rate of change in the degree of obstruction with tilt angle when the device is tilted relative to the viewer about a second tilt axis which is not parallel to the first tilt axis, wherein the first pattern of elements is configured such that upon tilting or rotating the device, the maximum degree of obstruction exhibited by the device appears to move from one region to the next as a wave across or around the device, wherein
the elements of the first pattern are formed of multiple layers, where the appearance of the outermost layer is different from that of the innermost layer facing the transparent layer, and
the appearance of the innermost layer of the elements of the first patterns is different in the first region of the device from that in the second region of the device.

21. A security document comprising a security article according to claim 19, wherein the security article is located in a transparent window region of the document, or is inserted as a window thread, or is affixed to a surface of the document.

22. A security document according to claim 21, wherein the security document is any of: currency, an identification document, an identification card, a passport, a license, a certificate of authenticity, a cheque, a stamp or any other document of value.

23. A security document comprising a security device according to claim 1, the security document comprising a transparent substrate forming the transparent layer of the security device.

24. A security document according to claim 23, wherein the security document is any of: currency, an identification document, an identification card, a passport, a license, a certificate of authenticity, a cheque, a stamp or any other document of value.

* * * * *